(12) United States Patent
Arita et al.

(10) Patent No.: US 12,345,858 B2
(45) Date of Patent: Jul. 1, 2025

(54) IMAGING OPTICAL SYSTEM AND DEVICE

(71) Applicant: BEIJING XIAOMI MOBILE SOFTWARE CO., LTD., Beijing (CN)

(72) Inventors: Shinichi Arita, Tokyo (JP); Xianchang Hou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 564 days.

(21) Appl. No.: 17/897,044

(22) Filed: Aug. 26, 2022

(65) Prior Publication Data

US 2022/0413266 A1  Dec. 29, 2022

Related U.S. Application Data

(63) Continuation of application No. PCT/CN2021/079394, filed on Mar. 5, 2021.

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
None
See application file for complete search history.

(56) References Cited

U.S. PATENT DOCUMENTS

| 9,927,607 B2 | 3/2018 | Kobayashi et al. |
| 10,962,742 B2 | 3/2021 | Zhou et al. |
| 2012/0120505 A1 | 5/2012 | Nakai et al. |
| 2017/0219820 A1 | 8/2017 | Kobayashi et al. |
| 2019/0121098 A1 | 4/2019 | Zhou et al. |

FOREIGN PATENT DOCUMENTS

| CN | 102466860 A | 5/2012 | |
| CN | 107015348 A | 8/2017 | |
| CN | 107678140 A | 2/2018 | |
| CN | 109683282 A | 4/2019 | |
| CN | 209433111 U | 9/2019 | |
| CN | 110632744 A | * 12/2019 | ............... G02B 1/00 |
| CN | 111007621 A | 4/2020 | |
| CN | 112099205 A | * 12/2020 | ............... G02B 1/00 |
| CN | 112305725 A | 2/2021 | |
| JP | 2017142363 A | 8/2017 | |

\* cited by examiner

*Primary Examiner* — Phu Vu
(74) *Attorney, Agent, or Firm* — Arch & Lake LLP; Hao Tan; Shen Wang

(57) ABSTRACT

An optical system includes: a first lens and a second lens, each has a negative refractive power and a concave image-side surface; a third lens of a positive refractive power having a concave image-side surface; a fourth lens of a positive refractive power having a convex image-side surface; a fifth lens of a positive refractive power having a concave object-side surface and a convex image-side surface; a sixth lens of a negative refractive power having a concave object-side surface and a convex image-side surface; a seventh lens of a positive refractive power having a convex image-side surface and an aspherical object-side surface having a convex center portion and at least one inflection point at a periphery portion; and an eighth lens having a concave object-side surface and an aspherical image-side surface having a concave center portion and at least one inflection point at a periphery portion.

20 Claims, 11 Drawing Sheets

IMAGING OPTICAL SYSTEM AND DEVICE

CROSS-REFERENCE TO RELATED APPLICATION

This application is a continuation application of International Application No. PCT/CN2021/079394, filed Mar. 5, 2021, the entire content of which is incorporated herein by reference for all purposes.

TECHNICAL FIELD

The present disclosure relates to an imaging optical system including a plurality of lenses, and an imaging optical device including the imaging optical system.

BACKGROUND

Imaging devices are widely used in more and more fields, such as vehicle applications, identifier recognition, entertainment applications, and artificial intelligence (AI) assisted applications for home appliances, which contribute to developments of science and technology. Mobile terminals are very important projects especially for civil use.

SUMMARY

An imaging optical system of the present disclosure includes: a first lens of a negative refractive power having a concave image-side surface; a second lens of a negative refractive power having a concave image-side surface; a third lens of a positive refractive power having a concave image-side surface; a fourth lens of a positive refractive power having a convex image-side surface; a fifth lens of a positive refractive power having a concave object-side surface and a convex image-side surface; a sixth lens of a negative refractive power having a concave object-side surface and a convex image-side surface; a seventh lens having a convex image-side surface and an object-side surface, the object-side surface of the seventh lens being an aspherical surface having a convex center portion and at least one inflection point at a periphery of the center portion; and an eighth lens having a concave object-side surface and an image-side surface, the image-side surface of the eighth lens being an aspherical surface having a concave center portion and at least one inflection point at a periphery of the center portion; the first lens, the second lens, the third lens, the fourth lens, the fifth lens, the sixth lens, the seventh lens and the eighth lens are arranged in that order in a direction from an object side to an image side; the imaging optical system satisfies: $|f1/f2|<6$; $|f12/f3|<0.5$; $0<T67/T34<1.0$; where $f1$ represents a focal length of the first lens, $f2$ represents a focal length of the second lens, $f3$ represents a focal length of the third lens, $f12$ represents a combined focal length of the first lens and the second lens, $T34$ represents a distance along an optical axis from the image-side surface of the third lens to an object-side surface of the fourth lens, and $T67$ represents a distance along the optical axis from the image-side surface of the sixth lens to the object-side surface of the seventh lens.

The present disclosure further provides an imaging optical system, including: a first lens of a negative refractive power; a second lens having a concave image-side surface; a third lens having a concave image-side surface; a fourth lens having a convex image-side surface; a fifth lens of a positive refractive power having a convex image-side surface; a sixth lens of a negative refractive power having a concave object-side surface and a convex image-side surface; a seventh lens of a positive refractive power having an object-side surface, the object-side surface of the seventh lens being an aspherical surface having a convex center portion and at least one inflection point at a periphery of the center portion; and an eighth lens having an image-side surface being an aspherical surface having a concave center portion and at least one inflection point at a periphery of the center portion; the first lens, the second lens, the third lens, the fourth lens, the fifth lens, the sixth lens, the seventh lens and the eighth lens are arranged in that order in a direction from an object side to an image side; the imaging optical system satisfies: $0.3<f/(CT7+T78+CT8)<3.5$, $1.0<CT7/CT8<2.0$, $|f1/f2|<6$, $|f12/f3|<0.5$, where $f1$ represents a focal length of the first lens, $f2$ represents a focal length of the second lens, $f3$ represents a focal length of the third lens, $f12$ represents a combined focal length of the first lens and the second lens, $f$ represents a focal length of the imaging optical system comprising the first to eighth lenses, $CT7$ represents a thickness of the seventh lens along an optical axis, $T78$ represents a distance along the optical axis from an image-side surface of the seventh lens to an object-side surface of the eighth lens, and $CT8$ represents a thickness of the eighth lens along the optical axis.

The present disclosure further provides an imaging optical system, including: a first lens of a negative refractive power; a second lens having a concave image-side surface; a third lens having a convex object-side surface; a fourth lens having a convex object-side surface; a fifth lens of a positive refractive power; a sixth lens of a negative refractive power having a concave object-side surface and a convex image-side surface; a seventh lens of a positive refractive power having a convex image-side surface; an eighth lens having an image-side surface being an aspherical surface having a concave center portion and at least one inflection point at a periphery of the center portion; the first lens, the second lens, the third lens, the fourth lens, the fifth lens, the sixth lens, the seventh lens and the eighth lens are arranged in that order in a direction from an object side to an image side; the imaging optical system satisfies: $0.5<CT1/CT8<1.5$, where $CT1$ represents a thickness of the first lens along an optical axis, and $CT8$ represents a thickness of the eighth lens along the optical axis.

The present disclosure further provides an imaging optical device, which includes: any imaging optical system as described above; a drive component configured to drive all or part of the first lens, the second lens, the third lens, the fourth lens, the fifth lens, the sixth lens, the seventh lens, and the eighth lens of the imaging optical system; and a photoelectric conversion element located on an imaging surface of the imaging optical system.

DETAILED DESCRIPTION

Figure 1:
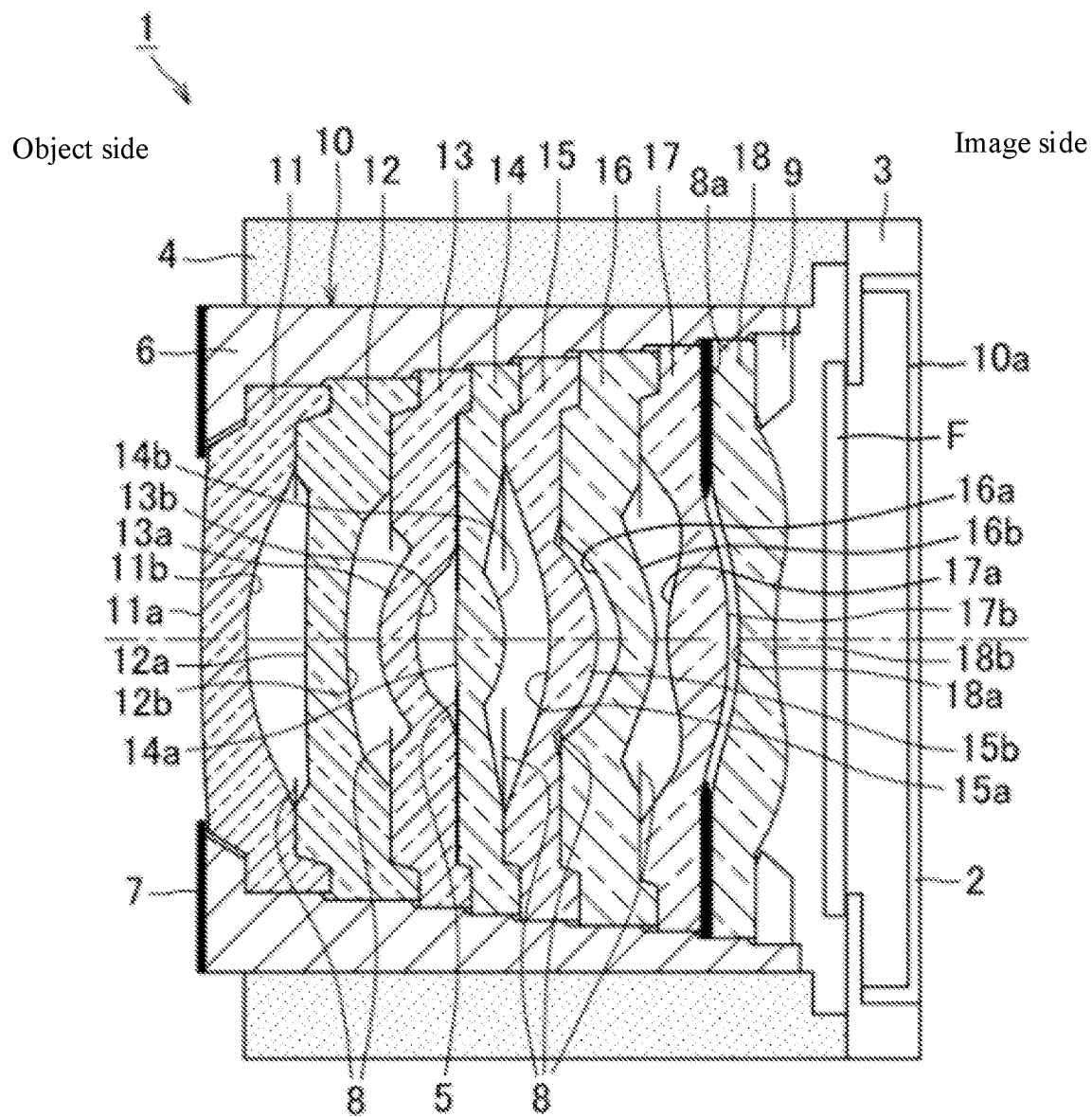
FIG. 1 is a schematic diagram illustrating an imaging optical device according to an example of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

In recent years, the mobile terminal is generally equipped with three or more imaging devices.

For example, a camera lens (an imaging optical system) with a common zoom mechanism is a lens assembly, which is equipped with an optical zoom lens that satisfies all field of view from wide angle to telephoto. In the zoom lens, a ratio of a focal length of a widest wide-angle end to a focal length of a farthest telephoto end is referred to as a zoom magnification, which is an important parameter for the zoom lens.

However, the optical zoom lens is generally provided therein with two or more lens members (or lens groups) that are movable in an optical axis direction, so the optical zoom lens itself has a larger size. Therefore, in order to ensure the movable space, it is impractical to mount the optical zoom lens to the mobile terminal.

Therefore, the imaging device mounted on the mobile terminal is equipped with a plurality of imaging units including single focus lenses (optical systems) with different focal lengths, such as an imaging unit dedicated to a super wide angle, an imaging unit dedicated to a standard field of view and an imaging unit dedicated to telephoto. By combining images output from the imaging units, a same zooming effect as that of the optical zoom lens is achieved electronically.

In the mobile terminal, like the general-purpose camera lens, it is a market demand to expand the zoom magnification. For this, a lens with a longer focal length is mounted to a special telephoto lens by companies.

On the one hand, a wide-angle lens is loaded with a lens having a field of view (hereinafter referred to as "FOV") of about 120°. For the wide-angle lens, various proposals are proposed by different companies.

For example, patent document 1 (CN107577031A) and patent document 2 (CN107305274A) propose an ultra-wide-angle lens with an FOV of 130° or more for a surveillance camera or action close-up.

Those are so-called retro-telephoto type (retro-focus type/reverse telephoto type) optical systems, in which a meniscus lens with a large negative refractive power is arranged at an object side (front end) of the optical system, a lens with a positive refractive power is arranged at an image side of the optical system, an aperture stop is arranged in a middle of the optical system, and spherical glass lenses are widely used. In this type of optical system, the field of view is widened, and pupil magnification may be easily enlarged, thereby ensuring a large amount of periphery lights. However, it is necessary to extend an overall length and a back focal length of the lens (optical system), so the size of the optical system becomes larger, and it is difficult to mount the optical system to the mobile terminal or the like.

On the other hand, patent document 3 (CN108732716A) and patent document 4 (CN107957621A) propose a wide-angle lens which has a FOV of about 120° and may be mounted on a mobile terminal. Those are so-called telephoto type optical systems, which are generally used in mobile terminals. This type of telephoto type wide-angle lens uses a large number of aspherical lenses to eliminate the aberration and shorten the back focal length, so as to reduce an overall length and ensure sufficient imaging performance.

However, unlike the retro-telephoto optical system that uses the pupil magnification to compensate for reduction of the periphery light amount caused by Cos 4 power law, in this optical system, with the FOV is further enlarged, it is necessary to provide such a structure that uses a light concentration caused by the distortion aberration to compensate for reduction of the periphery light volume. In this case, in the lenses of the present proposal, since a periphery portion of each of the lenses L1, L4, L5 and L6 farther from the optical axis needs to be greatly changed in shape as compared with the respective center portions, the forming of these lenses is difficult, which results in not only a decrease in productivity but also difficulty in ensuring imaging performance.

An object of the present disclosure is to provide an imaging optical system which has a small size but maintains good imaging performance, and has a large field of view, and to provide an imaging optical device including such imaging optical system.

Solutions to the Problems

The imaging optical system of the present disclosure includes:
 a first lens of a negative refractive power having a concave image-side surface;
 a second lens of a negative refractive power having a concave image-side surface;
 a third lens of a positive refractive power having a concave image-side surface;
 a fourth lens of a positive refractive power having a convex image-side surface;
 a fifth lens of a positive refractive power having a concave object-side surface and a convex image-side surface;
 a sixth lens of a negative refractive power having a concave object-side surface and a convex image-side surface;
 a seventh lens having a convex image-side surface and an object-side surface, the object-side surface of the seventh lens being an aspherical surface having a convex center portion and at least one inflection point at a periphery of the center portion; and
 an eighth lens having a concave object-side surface and an image-side surface, the image-side surface of the eighth lens being an aspherical surface having a concave center portion and at least one inflection point at a periphery of the center portion;
 the first lens, the second lens, the third lens, the fourth lens, the fifth lens, the sixth lens, the seventh lens and the eighth lens are arranged in that order in a direction from an object side to an image side;

the imaging optical system satisfies:

$|f1/f2|<6;$ $|f12/f3|<0.5;$ $0<T67/T34<1.0;$ where f1 represents a focal length of the first lens, f2 represents a focal length of the second lens, f3 represents a focal length of the third lens, f12 represents a combined focal length of the first lens and the second lens, T34 represents a distance along an optical axis from the image-side surface of the third lens to an object-side surface of the fourth lens, and T67 represents a distance along the optical axis from the image-side surface of the sixth lens to the object-side surface of the seventh lens.

In some examples, the imaging optical system further includes an aperture stop located between the third lens and the fourth lens;
 the imaging optical system satisfies:

$TL/\mathrm{Img}H<3,$ where TL represents a distance along the optical axis from an object-side surface of the first lens to an imaging surface, and ImgH represents a maximum image height.

In some examples, the imaging optical system satisfies:

$0<(R7+R8)/(R7-R8)<1.0,$ where R7 represents a radius of curvature of the object-side surface of the fourth lens, and R8 represents a radius of curvature of the image-side surface of the fourth lens.

In some examples, the imaging optical system satisfies:

$0<T12/T23<3.0,$ $0<T23/T34<2.0,$ where T12 represents a distance along the optical axis from the image-side surface of the first lens to an object-side surface of the second lens, T23 represents a distance along the optical axis from the image-side surface of the second lens to an object-side surface of the third lens, and T34 represents the distance along the optical axis from the image-side surface of the third lens to the object-side surface of the fourth lens.

In some examples, the imaging optical system satisfies:

$2.0<\tan(\mathrm{HFOV}),$ $1.4<Fno<3.0,$ where HFOV represents a half of a maximum field of view, and Fno is an aperture value.

In some examples, the imaging optical system satisfies:

$0.8<Y11/Y82<1.5,$ where Y11 represents a maximum effective radius of an object-side surface of the first lens, and Y82 represents a maximum effective radius of the image-side surface of the eighth lens.

In some examples, the imaging optical system satisfies:

$0<V6/V7<0.50,$ where V6 represents a dispersion coefficient of the sixth lens, and V7 represents a dispersion coefficient of the seventh lens.

In some examples, the imaging optical system satisfies:

$$0<(f/f4)-(f/f5)<2.0,$$

where f represents a focal length of the imaging optical system, f4 represents a focal length of the fourth lens, and f5 represents a focal length of the fifth lens.

In some examples, the imaging optical system satisfies:

$$T67/CT7<0.50,$$

$$T78/CT8<0.70,$$

where T67 represents the distance along the optical axis from the image-side surface of the sixth lens to the object-side surface of the seventh lens, CT7 represents a thickness of the seventh lens along the optical axis, T78 represents a distance along the optical axis from the image-side surface of the seventh lens to the object-side surface of the eighth lens, and CT8 represents a thickness of the eighth lens along the optical axis.

In some examples, the imaging optical system satisfies:

$$2.0<(|R13|+|R16|)/(CT7+T78+CT8)<4.5,$$

$$0.6<|R14/R15|<1.3,$$

$$2.0<TL/f<4.0,$$

where R13 represents a radius of curvature of the object-side surface of the seventh lens, R14 represents a radius of curvature of the image-side surface of the seventh lens, R15 represents a radius of curvature of the object-side surface of the eighth lens, R16 represents a radius of curvature of the image-side surface of the eighth lens, CT7 represents a thickness of the seventh lens along the optical axis, T78 represents a distance along the optical axis from the image-side surface of the seventh lens to the object-side surface of the eighth lens, CT8 represents a thickness of the eighth lens along the optical axis, TL represents a distance along the optical axis from an object-side surface of the first lens to an imaging surface, and f represents a focal length of the imaging optical system.

In some examples, the imaging optical system satisfies:

$$|Sag11/Sag31|<5.0,$$

where Sag11 represents a displacement along the optical axis from an intersection of an object-side surface of the first lens with the optical axis to a position where a maximum effective radius of the object-side surface of the first lens is located, and Sag31 represents a displacement along the optical axis from an intersection of an object-side surface of the third lens with the optical axis to a position where a maximum effective radius of the object-side surface of the third lens is located.

In some examples, the imaging optical system satisfies:

$$|DST1.0/FOV|<0.5(\%/degree),$$

$$|DST1.0/DST0.7|<10,$$

where DST1.0 represents a distortion aberration at a maximum image height, DST0.7 represents a distortion aberration at 70% of the maximum image height, and FOV represents a maximum field of view.

The present disclosure further provides an imaging optical system, including:
a first lens of a negative refractive power;
a second lens having a concave image-side surface;
a third lens having a concave image-side surface;
a fourth lens having a convex image-side surface;
a fifth lens of a positive refractive power having a convex image-side surface;
a sixth lens of a negative refractive power having a concave object-side surface and a convex image-side surface;
a seventh lens of a positive refractive power having an object-side surface, the object-side surface of the seventh lens being an aspherical surface having a convex center portion and at least one inflection point at a periphery of the center portion; and
an eighth lens having an image-side surface being an aspherical surface having a concave center portion and at least one inflection point at a periphery of the center portion;
the first lens, the second lens, the third lens, the fourth lens, the fifth lens, the sixth lens, the seventh lens and the eighth lens are arranged in that order in a direction from an object side to an image side;
the imaging optical system satisfies:

$$0.3<f/(CT7+T78+CT8)<3.5,$$

$$1.0<CT7/CT8<2.0,$$

$$|f1/f2|<6,$$

$$|f12/f3|<0.5,$$

where f1 represents a focal length of the first lens, f2 represents a focal length of the second lens, f3 represents a focal length of the third lens, f12 represents a combined focal length of the first lens and the second lens, f represents a focal length of the imaging optical system comprising the first to eighth lenses, CT7 represents a thickness of the seventh lens along an optical axis, T78 represents a distance along the optical axis from an image-side surface of the seventh lens to an object-side surface of the eighth lens, and CT8 represents a thickness of the eighth lens along the optical axis.

In some examples, in the imaging optical system, the first lens has a concave image-side surface, and the imaging optical system satisfies:

$$2.0<(|R13|+|R16|)/(CT7+T78+CT8)<4.5,$$

$$0.6<|R14/R15|<1.3,$$

where R13 represents a radius of curvature of the object-side surface of the seventh lens, R14 represents a radius of curvature of the image-side surface of the seventh lens, R15 represents a radius of curvature of the object-side surface of the eighth lens, R16 represents a radius of curvature of the image-side surface of the eighth lens, CT7 represents the thickness of the seventh lens along the optical axis, T78 represents the distance along the optical axis from the image-side surface of the seventh lens to the object-side surface of the eighth lens, and CT8 represents the thickness of the eighth lens along the optical axis.

In some examples, the imaging optical system satisfies:

$$0.3<|f/f12|+|f/f3|<1.5.$$

In some examples, the imaging optical system satisfies:

$$0.5<f12/f6<1.5,$$

where f6 represents a focal length of the sixth lens.

In some examples, the imaging optical system further includes an aperture stop; and
the imaging optical system satisfies:

$$0.45 < SD/TD < 0.65,$$

$$0.8 < Y11/Y82 < 1.5,$$

where SD represents a distance along the optical axis from the aperture stop to the image-side surface of the eighth lens, TD represents a distance along the optical axis from an object-side surface of the first lens to the image-side surface of the eighth lens, Y11 represents a maximum effective radius of the object-side surface of the first lens, and Y82 represents a maximum effective radius of the image-side surface of the eighth lens.

In some examples, the imaging optical system satisfies:

$$0.45 < Yc82/f < 0.75,$$

where Yc82 represents a distance between a maximum inflection point of the image-side surface of the eighth lens and the optical axis in a direction orthogonal to the optical axis.

In some examples, the imaging optical system satisfies:

$$|DST1.0/FOV| < 0.5 (\%/degree),$$

$$|DST1.0/DST0.7| < 10,$$

where DST1.0 represents a distortion aberration at a maximum image height, DST0.7 represents a distortion aberration at 70% of the maximum image height, and FOV represents a maximum field of view.

The present disclosure further provide an imaging optical system, including:
a first lens of a negative refractive power;
a second lens having a concave image-side surface;
a third lens having a convex object-side surface;
a fourth lens having a convex object-side surface;
a fifth lens of a positive refractive power;
a sixth lens of a negative refractive power having a concave object-side surface and a convex image-side surface;
a seventh lens of a positive refractive power having a convex image-side surface;
an eighth lens having an image-side surface being an aspherical surface having a concave center portion and at least one inflection point at a periphery of the center portion;
the first lens, the second lens, the third lens, the fourth lens, the fifth lens, the sixth lens, the seventh lens and the eighth lens are arranged in that order in a direction from an object side to an image side;
the imaging optical system satisfies:

$$0.5 < CT1/CT8 < 1.5,$$

where CT1 represents a thickness of the first lens along an optical axis, and CT8 represents a thickness of the eighth lens along the optical axis.

In some examples, the imaging optical system satisfies:

$$0.8 < |f5/f12| < 2.5,$$

where f12 represents a combined focal length of the first lens and the second lens, and f5 represents a focal length of the fifth lens.

In some examples, the imaging optical system satisfies:

$$|Sag11/Sag31| < 5.0,$$

where Sag11 represents a displacement along the optical axis from an intersection of an object-side surface of the first lens with the optical axis to a position where a maximum effective radius of the object-side surface of the first lens is located, and Sag31 represents a displacement along the optical axis from an intersection of the object-side surface of the third lens with the optical axis to a position where a maximum effective radius of the object-side surface of the third lens is located.

In some examples, the imaging optical system satisfies:

$$(T12+T23+T67+T78)/(T34+T45+T56) < 1.5,$$

where T12 represents a distance along the optical axis from an image-side surface of the first lens to an object-side surface of the second lens, T23 represents a distance along the optical axis from the image-side surface of the second lens to the object-side surface of the third lens, T34 represents a distance along the optical axis from an image-side surface of the third lens to the object-side surface of the fourth lens, T45 represents a distance along the optical axis from an image-side surface of the fourth lens to an object-side surface of the fifth lens, T56 represents a distance along the optical axis from an image-side surface of the fifth lens to the object-side surface of the sixth lens, T67 represents a distance along the optical axis from the image-side surface of the sixth lens to an object-side surface of the seventh lens, and T78 represents a distance along the optical axis from the image-side surface of the seventh lens to an object-side surface of the eighth lens.

In some examples, the imaging optical system satisfies:

$$1.60 < Nmax < 1.72,$$

where Nmax represents a maximum of refractive indices of the first lens, the second lens, the third lens, the fourth lens, the fifth lens, the sixth lens, the seventh lens and the eighth lens.

The present disclosure further provide an imaging optical device, which includes: any imaging optical system as described above; a drive component configured to drive all or part of the first lens, the second lens, the third lens, the fourth lens, the fifth lens, the sixth lens, the seventh lens, and the eighth lens of the imaging optical system; and a photoelectric conversion element located on an imaging surface of the imaging optical system.

As shown in FIG. 1, an imaging optical device 1 (hereinafter referred to as "imaging device" for short) according to examples of the present disclosure includes an imaging optical system 10 (hereinafter referred to as "optical system" for short) and a photoelectric conversion element 2 located on an imaging surface 10a of the optical system 10. Specifically, the imaging device 1 includes the optical system 10 having a plurality of lenses 11 to 18; a sensor holder 3 for holding the photoelectric conversion element 2; and a drive component 4 for driving the optical system 10. The imaging device 1 according to examples of the present disclosure further includes an IR cutoff filter F located between the optical system 10 and the photoelectric conversion element 2.

The sensor holder 3 holds the photoelectric conversion element 2 to enable the photoelectric conversion element 2 to be located on the imaging surface 10a of the optical system 10. Specifically, the sensor holder 3 holds the photoelectric conversion element 2, such that a light-receiving surface of the photoelectric conversion element 2 is orthogonal to an optical axis of the optical system 10. The photoelectric conversion element 2 is configured to convert an image composed of incident visible lights into an electrical signal, and transmit (output) the electrical signal to an image processor in a rear section (not shown). The photoelectric conversion element 2 in examples of the present disclosure is an image sensor such as a CMOS (complementary metal oxide semiconductor) image sensor, and may be bonded and fixed to the sensor holder 3 after a posture of the sensor holder 3 or the optical system 10 with respect to the optical axis is adjusted.

In addition, the sensor holder 3 is further used to fix the IR cutoff filter F. The IR cutoff filter F is configured to remove lights in an infrared region unnecessary for imaging from lights passing through the optical system 10, and only let lights in a visible light region to pass. Specifically, the IR cutoff filter F has a transmittance of 50% (half value) to any light in a wavelength range of 380 nm to 430 nm, a transmittance of 80% or more to any light in a wavelength range of 500 nm to 600 nm, and a transmittance of 10% or less to any light in a wavelength range of 730 nm to 800 nm. The IR cutoff filter F is formed by applying a multi-layer coating that includes alternately stacked $TiO_2$ film and $SiO_2$ film on a surface of an infrared absorbing glass base. Since both sides of the IR cutoff filter F are substantially flat, the IR cutoff filter F, even disposed between the optical system 10 and the photoelectric conversion element 2, does not affect the imaging of lights.

In addition, the IR cutoff filter may also be formed by coating an infrared absorbing ink on a common transparent glass baseplate (such as D263Teco manufactured by SCHOTT A G, etc.) and applying an AR coating for anti-reflection above the coated infrared absorbing ink layer. This IR cutoff filter is also able to achieve the same transmittance performances as the above-mentioned IR cutoff filter F.

The drive component 4 is a driver such as a voice coil motor (VCM), and is configured to drive the optical system 10 in a direction (optical axis direction) substantially perpendicular to the light-receiving surface of the photoelectric conversion element 2.

The optical system 10 includes: a lens assembly including a plurality of lenses; an aperture stop 5 located between the lenses; and a lens holding member (lens barrel) 6 for holding the lens assembly. In addition, the optical system 10 includes: a light-shielding member 7 located at an end portion at an object side (light incident side); at least one light-shielding sheet 8 located between the lenses; and a lens clamp ring 9 configured to push and press against the lens assembly with respect to the lens holding member 6.

The lens assembly includes a first lens 11, a second lens 12, a third lens 13, a fourth lens 14, a fifth lens 15, a sixth lens 16, a seventh lens 17 and an eighth lens 18 arranged in that order in a direction from an object side to an image side. A total number of lenses in the lens assembly of the present disclosure is eight, and the fourth lens 14 to the sixth lens 16 constitute a main lens group that determines the imaging performance of the optical system 10.

Each of the first lens 11 to the seventh lens 17 has a laminated structure with a slope at a peripheral portion thereof. When the first lens 11 to the seventh lens 17 are held by the lens holding member 6, the adjacent lenses fit with each other through the laminated structures to configure the first lens 11 to the seventh lens 17 at their arrangement positions with high accuracy. That is, the lens position accuracy may be obtained with high accuracy. In addition, between the seventh lens 17 and the eighth lens 18, a spacer 8a is provided for light shielding and space adjusting, which has a function of cutting off unnecessary interference lights, and is used to adjust a curvature of image. In actual mass production, due to various tolerances and errors, image quality deterioration caused by the curvature of image occurs. In order to correct the curvature of image, a space between the seventh lens 17 and the eighth lens 18 in the optical axis direction is adjusted by changing a thickness of the spacer 8a, thereby eliminating the generated curvature of image. In addition, the first lens 11 to the eighth lens 18 will be described in detail below.

The lens holding member 6 is a cylindrical member, and is configured to hold the first lens 11 to the eighth lens 18 therein. Specifically, the lens holding member 6 is configured to hold the first lens 11, the light-shielding sheet 8, the second lens 12, the light-shielding sheet 8, the third lens 13, the aperture stop 5, the fourth lens 14, the light-shielding sheet 8, the fifth lens 15, the light-shielding sheet 8, the sixth lens 16, the light-shielding sheet 8, the seventh lens 17, the spacer 8a, and the eighth lens 18, which are arranged in that order from the object side to the image side. In the lens holding member 6 according to examples of the present disclosure, after the first lens 11 to the eighth lens 18, the light-shielding sheets 8, and the spacer 8a are inserted inside the lens holding member 6 in the order described above, these members are restricted by the lens clamp ring 9 under an appropriate pressure, and fixed to the lens holding member 6 with an adhesive such as a UV curable resin.

The aperture stop 5 arranged between the third lens 13 and the fourth lens 14 is configured to determine an aperture value of the whole optical system 10. In addition, the light-shielding member 7 is mounted on a portion having an opening in the front (i.e., at the object side) of the cylindrical lens holding member 6, thereby preventing unnecessary lights in the peripheral portion of the image from entering the optical system 10.

The light-shielding sheet 8 is disposed at a peripheral portion between the lenses to remove unnecessary lights (i.e., shield interference lights), which are from interior reflection of a peripheral structure of an effective portion of the lens. In this way, the quality of the image captured by the imaging device 1 is improved. The optical system 10 has at least one light-shielding sheet 8. The optical system 10 in examples of the present disclosure includes a plurality of very thin light-shielding sheets 8. For example, in the example as shown in FIG. 1, the optical system 10 includes five light-shielding sheets 8. Specifically, the light-shielding sheets 8 are disposed between the first lens 11 and the second lens 12, between the second lens 12 and the third lens 13, between the fourth lens 14 and the fifth lens 15, between the fifth lens 15 and the sixth lens 16, and between the sixth lens 16 and the seventh lens 17, respectively.

In the following, the first lens 11 to the eighth lens 18 will be described in detail.

The first lens 11 and the second lens 12 each have a negative refractive power. Through a total of four lens interfaces 11a, 11b, 12a, and 12b provided by the first lens 11 and the second lens 12, in the optical system 10 (the imaging device 1), a field of view of 130° or more is secured, and a desired distortion aberration shape is obtained. If the first lens 11 and the second lens 12 are replaced by a single lens with a negative refractive power, since there are only two lens interfaces, it is difficult to obtain a desired distortion aberration corresponding to the field of view of lights incident on the optical system 10.

The object-side surface (lens interface) 11a of the first lens 11 is a surface dedicated to adjusting the field of view. In the optical system 10 according to examples of the present disclosure, the generated distortion aberration is balanced by the surface (lens interface) closer to the image side than the object-side surface 11a of the first lens 11.

In addition, both the image-side surface 11b of the first lens 11 and the image-side surface 12b of the second lens 12 are concave surfaces (surfaces recessed towards the object side). In this way, by adjusting negative distortion aberrations generated on the image-side surfaces 11b and 12b with respect to respective incident angles, it is possible to achieve miniaturization of the optical system 10 and adjust the distortion (perspective distortion) of a three-dimensional object.

The object-side surface 12a of the second lens 12 is able to adjust the aberration according to a space between the first lens 11 and the second lens 12. Specifically, in the case where the first lens 11 and the second lens 12 are each composed of a lens having a negative refractive power, an overall size of the optical system 10 (the imaging device 1) is increased. However, by making the shape of the object-side surface 12a of the second lens 12 have a certain freedom, the generation of the aberration may be suppressed even if the space between the first lens 11 and the second lens 12 is small.

The third lens 13 has a positive refractive power, and has a convex object-side surface 13a and a concave image-side surface 13b. The third lens 13 converges lights of a wide field of view passing through the first lens 11 and the second lens 12 in the optical system 10 to assist in the miniaturization of the optical system 10 (the imaging device 1).

The convex object-side surface 13a of the third lens 13 is easy to receive lights of a wide field of view in the optical system 10. In addition, when lights reflected by the image-side surface 13b of the third lens 13 travel backward on the object-side surface 13a, total reflection may occur. However, by making the object-side surface 13a of the third lens 13 convex, the unnecessary total reflection lights may be eliminated.

In addition, in the optical system 10, by making the image-side surface 13b of the third lens 13 concave, an aberration correction ability obtained after the fourth lens 14 and an aberration correction ability of the whole optical system 10 may be balanced appropriately. As a result, the imaging quality of the optical system 10 is improved, and the imaging is more vivid.

The fourth lens 14 has a positive refractive power, and has a convex object-side surface 14a and a convex image-side surface 14b. The fourth lens 14 shares the positive refractive power with the fifth lens 15 in order to avoid excessive aberration or stray lights caused by the overlarge surface curvature of the fourth lens 14. In addition, by making the image-side surface 14b of the fourth lens 14 convex, the generation of aberration is suppressed in the fourth lens 14, and the symmetry in the optical system 10 is improved.

The fifth lens 15 has a positive refractive power, and has a concave object-side surface 15a and a convex image-side surface 15b. The fifth lens 15 collaborates with the fourth lens 14 to ensure a sufficient light collecting power. In addition, by making the image-side surface 15b of the fifth lens 15 convex, a sufficient light-collecting power is obtained at a peripheral portion of the field of view of the optical system 10. As a result, the light amount at the peripheral portion of the large field of view of the optical system 10 is easily ensured.

The sixth lens 16 has a negative refractive power, and has a concave object-side surface 16a and a convex image-side surface 16b. The sixth lens 16 is made of a highly dispersive material, thereby well correcting the chromatic aberration (lateral chromatic aberration) of a portion with a high image height. In addition, in the sixth lens 16, by making the object-side surface 16a concave and the image-side surface 16b convex, the sixth lens 16 becomes an advantageous structure for non-axial aberrations such as astigmatism.

The seventh lens 17 has a positive refractive power, and has a convex image-side surface 17b and an object-side surface 17a. The object-side surface 17a of the seventh lens 17 has a convex center portion (a portion near the center) 171a. In addition, the object-side surface 17a is an aspheric surface which has at least one inflection point at a periphery 172a of the center portion 171a. The seventh lens 17 collaborates with the eighth lens 18 to adjust the astigmatism.

Figure 3:
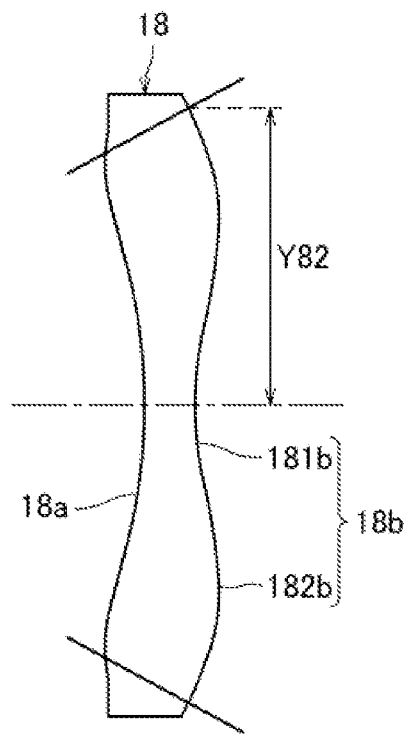
FIG. 3 is a schematic diagram illustrating a parameter Y82 of an eighth lens of an optical system according to an example of the present disclosure.

The eighth lens 18 has a negative refractive power, and has a concave object-side surface 18a and an image-side surface 18b. The image-side surface 18b of the eighth lens 18 has a concave center portion (a portion near the center) 181b. In addition, as shown in FIG. 3, the image-side surface 18b is an aspheric surface which has at least one inflection point at a periphery 182b of the center portion 181b. The eighth lens 18 collaborates with the seventh lens 17 to adjust the astigmatism.

With the seventh lens 17 and the eighth lens 18, the adjustment of the astigmatism is shared by the seventh lens 17 and the eighth lens 18, so that a shape of each of the seventh lens 17 and the eighth lens 18 may be uniformly formed easily, and thus the seventh lens 17 and the eighth lens 18 have good formability. In addition, with an air lens formed between the image-side surface 17b of the seventh lens 17 and the object-side surface 18a of the eighth lens 18, the curvature of image, the aberration and the distortion aberration may be adjusted, so that a vivid image may be obtained.

Furthermore, with the aspherical image-side surface 18b of the eighth lens 18 as described above, a chief ray angle (CRA) of lights reaching the photoelectric conversion element 2 from the seventh lens 17 may be optimized. In addition, by adjusting the distortion aberration generated in the eighth lens 18 and the distortion aberration generated in the first lens 11 and the second lens 12, a back focal length of the imaging device 1 may be optimized, and the whole imaging device 1 may be miniaturized.

In addition, in the optical system 10, with the aperture stop 5 located between the third lens 13 and the fourth lens 14, the symmetry in the optical system 10 is improved.

In some examples, the optical system 10 satisfies:

$$|f1/f2|<6,$$

where f1 represents a focal length of the first lens 11, and f2 represents a focal length of the second lens 12.

Under this condition, the first lens 11 and the second lens 12 share the negative refractive power, such that the field of view is expanded and the generation amount of distortion aberration is optimized. Furthermore, a shape of the large-sized first lens 11 may be smoothed, thereby improving the productivity of the first lens 11.

In some examples, the optical system 10 satisfies:

$$|f12/f3|<0.5,$$

where f12 represents a combined focal length of the first lens 11 and the second lens 12, and f3 represents a focal length of the third lens 13.

In some examples, the optical system 10 satisfies:

$$|f12/f3|<0.3.$$

By satisfying the above conditions, the negative refractive power obtained by the first lens 11 and the second lens 12 is sufficiently increased, so as to obtain a sufficient field of view (FOV) in the optical system 10.

In some examples, the optical system 10 satisfies:

$$0 < T67/T34 < 1.0,$$

where T34 represents a distance along the optical axis from the image-side surface 13b of the third lens 13 to the object-side surface 14a of the fourth lens 14, and T67 represents a distance along the optical axis from the image-side surface 16b of the sixth lens 16 to the object-side surface 17a of the seventh lens 17.

In some examples, the optical system 10 satisfies:

$$0 < T67/T34 < 0.6.$$

By satisfying the above conditions, a spatial arrangement in the optical system 10 is optimized, and a correction ability of the curvature of image and the aberration is improved. In this way, a vivid image can be obtained even at the peripheral portion of the image.

In some examples, the optical system 10 satisfies:

$$0.3 < f/(CT7+T78+CT8) < 3.5,$$

$$1.0 < CT7/CT8 < 2.0,$$

where f represents a focal length of the optical system 10, CT7 represent a thickness of the seventh lens 17 along the optical axis, T78 represents a distance along the optical axis from the image-side surface of the seventh lens to the object-side surface of the eighth lens, and CT8 represents a thickness of the eighth lens along the optical axis.

In some examples, the optical system 10 satisfies:

$$0.8 < f/(CT7+T78+CT8) < 3.2,$$

$$1.2 < CT7/CT8 < 1.8.$$

In some examples, the optical system 10 satisfies:

$$1.5 < f/(CT7+T78+CT8) < 2.8,$$

$$1.4 < CT7/CT8 < 1.6,$$

Under these conditions, by optimizing the shapes of the seventh lens 17 and the eighth lens 18, the astigmatism is effectively suppressed. In some examples, the formability in mass production is also improved.

In some examples, the optical system 10 satisfies:

$$0.5 < CT1/CT8 < 1.5,$$

where CT1 represents a thickness of the first lens 11 along the optical axis, and CT8 represents a thickness of the eighth lens 18 along the optical axis.

By satisfying the condition, the thicknesses of the lens (the first lens 11) closest to the object side and the thicknesses of the lens (the eighth lens 18) closest to the image side of the optical system 10 are optimized, so the astigmatism is reduced, thereby improving the stability of the imaging device 1.

In some examples, the optical system 10 satisfies:

$$TL/\mathrm{ImgH} < 3,$$

where TL represents a distance along the optical axis from the object-side surface 11a of the first lens 11 to the imaging surface 10a, and ImgH represents a maximum image height of the optical system 10.

In some examples, the optical system 10 satisfies:

$$1.8 < TL/\mathrm{ImgH} < 2.6.$$

By satisfying these conditions, the miniaturization of the optical system 10 (the imaging device 1) is achieved. In some examples, on the basis of obtaining a wide-angle imaging range, the image quality is improved by increasing peripheral light beams.

In some examples, the optical system 10 satisfies:

$$0 < (R7+R8)/(R7-R8) < 1.0,$$

where R7 represents a radius of curvature of the object-side surface 14a of the fourth lens 14, and R8 represents a radius of curvature of the image-side surface 14b of the fourth lens 14.

In some examples, the optical system 10 satisfies:

$$0 < (R7+R8)/(R7-R8) < 0.5.$$

Under these conditions, by optimizing the curvature radiuses of the fourth lens 14, shape symmetry of the whole optical system 10 is realized, thereby reducing the generation of the spherical aberration, and improving the image quality.

In some examples, the optical system 10 satisfies:

$$0 < T12/T23 < 3.0, \text{ and } 0 < T23/T34 < 2.0,$$

where T12 represents a distance along the optical axis from the image-side surface 11b of the first lens 11 to the object-side surface 12a of the second lens 12, T23 represents a distance along the optical axis from the image-side surface 12b of the second lens 12 to the object-side surface 13a of the third lens 13, and T34 represents a distance along the optical axis from the image-side surface 13b of the third lens 13 to the object-side surface 14a of the fourth lens 14.

In some examples, the optical system 10 satisfies:

$$0.8 < T12/T23 < 2.2, \text{ and } 0.5 < T23/T34 < 1.2.$$

Under these conditions, the distance along the optical axis from the image-side surface 11b of the first lens 11 to the object-side surface 12a of the second lens 12, and the distance along the optical axis from the image-side surface 12b of the second lens 12 to the object-side surface 13a of the third lens 13 are optimized, so that the effective radius of the first lens 11 and that of the second lens 12 are reduced, thereby optimizing the size of the optical system 10.

In some examples, the optical system 10 satisfies:

$$2.0 < \tan(\mathrm{HFOV}),$$

where HFOV represents a half of a maximum field of view.

In some examples, the optical system 10 satisfies:

$$3.0 < \tan(\mathrm{HFOV}).$$

By satisfying these conditions, the optical system 10 obtains a wide photographing (imaging) range that is a characteristic of a wide-angle lens.

In some examples, the optical system 10 satisfies:

$$1.4 < Fno < 3.0,$$

where Fno represents an aperture value.

Under this condition, by optimizing the amount of lights incident on the photoelectric conversion element 2, it is possible to obtain a sufficient amount of lights while restricting the interference lights caused by the excess light amount.

In some examples, the optical system 10 satisfies:

$$2.4 < Fno < 3.0.$$

By satisfying this condition, a depth of field is increased. Therefore, a structure (drive component 4) for driving the lens in the optical axis direction may be eliminated, such that the photoelectric conversion element 2 may be fixed to the optical system 10.

Figure 2:
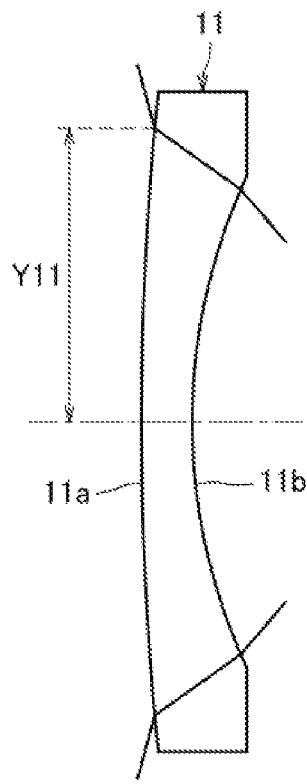
FIG. 2 is a schematic diagram illustrating a parameter Y11 of a first lens of an optical system included in an imaging optical device according to an example of the present disclosure.

In some examples, as shown in FIG. 2 and FIG. 3, the optical system 10 satisfies:

$$0.8<Y11/Y82<1.5,$$

where Y11 represents a maximum effective radius of the object-side surface 11a of the first lens 11, and Y82 represents a maximum effective radius of the image-side surface 18b of the eighth lens 18.

In some examples, the optical system 10 satisfies:

$$0.9<Y11/Y82<1.3.$$

By satisfying these conditions, it is possible to suppress unevenness in size between a part at the object side and a part at the image side in the optical system 10, and to achieve miniaturization of the entire optical system 10. In some examples, in a case where the value of Y11/Y82 is beyond (below) the above-mentioned lower limit, the curvature of the aspherical shape of the object-side surface 18a increases, so the formability deteriorates, which results in the deterioration of the distortion aberration and the decrease in the amount of peripheral lights. On the other hand, in a case where the value of Y11/Y82 exceeds (is higher than) the above-mentioned upper limit, the optical system 10 becomes too large in size.

In some examples, the optical system 10 satisfies:

$$0<V6/V7<0.50,$$

where V6 represents a dispersion coefficient of the sixth lens 16, and V7 represents a dispersion coefficient of the seventh lens 17.

By satisfying this condition, it is possible to reduce the lateral chromatic aberration of the optical system 10, thereby reducing a shift of image signals when combining three-color or four-color image sensor signals.

In some examples, the optical system 10 satisfies:

$$0<(f/f4)-(f/f5)<2.0,$$

where f represents the focal length of the optical system 10, f4 represents a focal length of the fourth lens 14, and f5 represents a focal length of the fifth lens 15.

In some examples, the optical system 10 satisfies:

$$0.3<(f/f4)-(f/f5)<1.0.$$

Under these conditions, a difference in refractive power of the fourth lens 14 and the fifth lens 15 is suppressed, so as to suppress an increase in coma aberration.

In some examples, the optical system 10 satisfies:

$$T67/CT7<0.50,$$

$$T78/CT8<0.70,$$

where T67 represents a distance along the optical axis from the image-side surface 16b of the sixth lens 16 to the object-side surface 17a of the seventh lens 17, CT7 represents a thickness of the seventh lens 17 along the optical axis, T78 represents a distance along the optical axis from the image-side surface of the seventh lens to the object-side surface of the eighth lens, and CT8 represents a thickness of the eighth lens along the optical axis.

In some examples, the optical system 10 satisfies:

$$T67/CT7<0.30,$$

$$T78/CT8<0.40.$$

By satisfying these conditions, a space at the image side of the optical system 10 is appropriately utilized, so that the seventh lens 17 and the eighth lens 18 arranged at the image side may be miniaturized.

In some examples, the optical system 10 satisfies:

$$2.0<(|R13|+|R16|)/(CT7+T78+CT8)<4.5,$$

where R13 represents a radius of curvature of the object-side surface 17a of the seventh lens 17, R16 represents a radius of curvature of the image-side surface 18b of the eighth lens 18, CT7 represents a thickness (center thickness) of the seventh lens 17 along the optical axis, T78 represents a distance along the optical axis from the image-side surface of the seventh lens to the object-side surface of the eighth lens, and CT8 represents a thickness of the eighth lens along the optical axis.

Under this condition, a combined shape of the seventh lens 17 and the eighth lens 18 is optimized, so that an ability for correcting the astigmatism and the curvature of image caused by the seventh lens 17 and the eighth lens 18 is optimized.

In some examples, the optical system 10 satisfies:

$$0.6<|R14/R15|<1.3,$$

where R14 represents a radius of curvature of the image-side surface 17b of the seventh lens 17, and R15 represents a radius of curvature of the object-side surface 18a of the eighth lens 18.

Under this condition, a shape of an air lens between the seventh lens 17 and the eighth lens 18 is optimized, so that an ability for correcting the astigmatism and the curvature of image is optimized in the seventh lens 17 and the eighth lens 18, especially in their peripheral portions.

In some examples, the optical system 10 satisfies:

$$2.0<TL/f<4.0,$$

where TL represents a distance along the optical axis from the object-side surface 11a of the first lens 11 to the imaging surface 10a, and f represents the focal length of the optical system 10.

By satisfying this condition, the optical system 10 is thinned in the optical axis direction while achieving the optimization of the size and wide-angle characteristic of the optical system 10.

Figure 4:
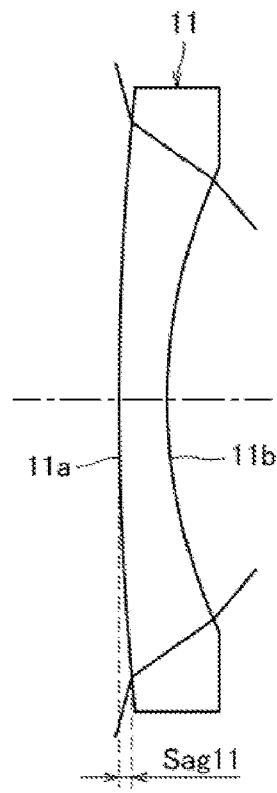
FIG. 4 is a schematic diagram illustrating a parameter Sag11 of a first lens of an optical system according to an example of the present disclosure.
Figure 5:
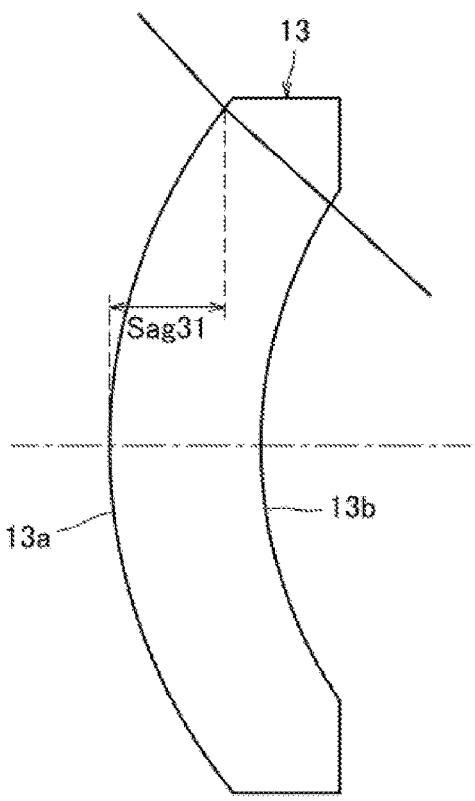
FIG. 5 is a schematic diagram illustrating a parameter Sag31 of a third lens of an optical system according to an example of the present disclosure.

In some examples, as shown in FIG. 4 and FIG. 5, the optical system 10 satisfies:

$$|Sag11/Sag31|<5.0,$$

where Sag11 represents a displacement along the optical axis from an intersection of the object-side surface 11a of the first lens 11 with the optical axis to a position where a maximum effective radius of the object-side surface 11a of the first lens 11 is located, and Sag31 represents a displacement along the optical axis from an intersection of the object-side surface 13a of the third lens 13 with the optical axis to a position where a maximum effective radius of the object-side surface 13a of the third lens 13 is located.

In some examples, the optical system 10 satisfies:

$$|Sag11/Sag31|<3.0.$$

In some examples, the optical system 10 satisfies:

$$|Sag11/Sag31|<2.0.$$

Under these conditions, an opening size for the lens at the object side of the optical system 10 is optimized, and a burden in structure of a lens barrel is reduced.

In some examples, the optical system 10 satisfies:

$$|DST1.0/FOV|<0.5 (\%/degree); \text{ and}$$

$$|DST1.0/DST0.7|<10,$$

where DST1.0 represents a distortion aberration at the maximum image height, DST0.7 represents a distortion aberration at 70% of the maximum image height, and FOV represents the maximum field of view.

By satisfying this condition, it is possible to suppress a decrease in the light amount at the peripheral portion of the image, and suppress a deformation (perspective distortion) of a three-dimensional object, which commonly are problems of a wide-angle lens.

In some examples, the optical system 10 satisfies:

$$0.3<|f/f12|+|f/f3|<1.5,$$

where f represents the focal length of the optical system 10, f12 represents the combined focal length of the first lens 11 and the second lens 12, and f3 represents the focal length of the third lens 13.

In some examples, the optical system 10 satisfies:

$$0.5<|f/f12|+|f/f3|<1.3.$$

In some examples, the optical system 10 satisfies:

$$0.7<|f/f12|+|f/f3|<1.1.$$

By satisfying these conditions, a sufficient refractive power is obtained at the object side of the optical system 10, thereby ensuring a large field of view.

In some examples, the optical system 10 satisfies:

$$0.5<f12/f6<1.5,$$

where f12 represents the combined focal length of the first lens 11 and the second lens 12, and f6 represents a focal length of the sixth lens 16.

Under this condition, by optimizing the distribution of the negative refractive power in the object side and the image side of the optical system 10, a small-sized wide-angle lens (optical system 10) is obtained.

In some examples, the optical system 10 satisfies:

$$0.45<SD/TD<0.65,$$

where SD represents a distance along the optical axis from the aperture stop 5 to the image-side surface 18b of the eighth lens 18, and TD represents a distance along the optical axis from the object-side surface 11a of the first lens 11 to the image-side surface 18b of the eighth lens 18.

By satisfying this condition, it is possible to increase a transmission range of the lights occupying the entire optical system 10, thereby miniaturizing the optical system 10 and optimizing the optical performance.

Figure 6:
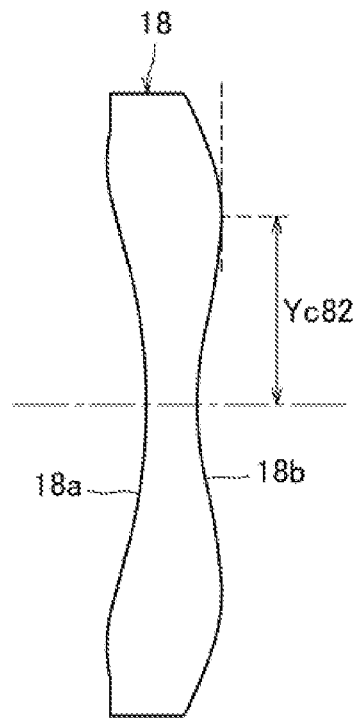
FIG. 6 is a schematic diagram illustrating a parameter Yc782 of an eighth lens of an optical system according to an example of the present disclosure.

In some examples, as shown in FIG. 6, the optical system 10 satisfies:

$$0.45<Yc82/f<0.75,$$

where Yc82 represents a distance between a maximum inflection point of the image-side surface 18b of the eighth lens 18 and the optical axis in a direction orthogonal to the optical axis, and f represents the focal length of the optical system 10.

By satisfying this condition, it is possible to appropriately set an angle of lights incident on the photoelectric conversion element 2, thereby suppressing the occurrence of astigmatism.

In some examples, the optical system 10 satisfies:

$$0.8<|f5/f12|<2.5,$$

where f12 represents the combined focal length of the first lens 11 and the second lens 12, and f5 represents the focal length of the fifth lens 15.

In some examples, the optical system 10 satisfies:

$$1.0<|f5/f12|<2.0.$$

Under these conditions, the image quality may be improved by appropriately assigning the refractive power (a negative component) of the first lens 11 and the second lens 12 and the refractive power (a positive component) of the fifth lens 15.

In some examples, the optical system 10 satisfies:

$$(T12+T23+T67+T78)/(T34+T45+T56)<1.5,$$

where T12 represents a distance along the optical axis from the image-side surface 11b of the first lens 11 to the object-side surface 12a of the second lens 12, T23 represents a distance along the optical axis from the image-side surface 12b of the second lens 12 to the object-side surface 13a of the third lens 13, T34 represents a distance along the optical axis from the image-side surface 13b of the third lens 13 to the object-side surface 14a of the fourth lens 14, T45 represents a distance along the optical axis from the image-side surface 14b of the fourth lens 14 to the object-side surface 15a of the fifth lens 15, T56 represents a distance along the optical axis from the image-side surface 15b of the fifth lens 15 to the object-side surface 16a of the sixth lens 16, T67 represents a distance along the optical axis from the image-side surface 16b of the sixth lens 16 to the object-side surface 17a of the seventh lens 17, and T78 represents a distance along the optical axis from the image-side surface of the seventh lens to an object-side surface of the eighth lens.

By satisfying this condition, it is possible to effectively correct an interval of T12+T23+T67+T78 which dominates the configuration of the field of view, the reduction of the curvature of image and the aberration and the appropriate configuration of the distortion aberration, and an interval of T34+T45+T56 which dominates the reduction of the spherical aberration and the coma aberration that affect the imaging performance.

In some examples, the optical system 10 satisfies:

$$1.60<Nmax<1.72,$$

where Nmax represents a maximum of refractive indices of the first lens 11, the second lens 12, the third lens 13, the fourth lens 14, the fifth lens 15, the sixth lens 16, the seventh lens 17, and the eighth lens 18.

By satisfying this condition, the lenses of the entire optical system 10 may be balanced, and easily formed lens shapes may be realized while reducing the aberration.

In some examples, the lenses 11 to 18 of the optical system 10 may be made of a plastic or glass. When the lenses are made of the plastic, the production cost is reduced due to the low material cost, the excellent processability, and the short processing time. In addition, when the lenses are made of glass, as the refractive index of the glass is generally higher than that of the plastic, the design freedom of the lenses is improved, and higher degrees of fineness or miniaturization may be achieved.

In some examples, the object-side surfaces 11a to 18a and the image-side surfaces 11b to 18b of the lenses 11 to 18 of the optical system 10 are aspherical surfaces, which have a significantly greater degree of freedom than spherical surfaces, such that the aberration is reduced, a captured image has a higher degree of fineness, or the entire optical system 10 is miniaturized.

According to the above-mentioned optical system 10 and the imaging device 1 including the optical system 10, it is possible to realize the miniaturization, maintain the sufficient imaging performance, and obtain a large field of view. Regarding the field of view, it can be greatly expanded to for example about 150 degrees for a wide-angle lens which commonly has a field of view of about 120 degree. Details will be provided below.

Using a structure in which both the first lens 11 and the second lens 12 are concave lenses, and the third lens 13 is a convex lens (i.e., a concave-concave-convex structure) in the optical system 10, it is possible to realize incidence of lights in an ultra-wide-angle range (i.e., form a wide-angle converter), and a desired distortion aberration can also be ensured even if a full field of view is about 150 degrees.

Furthermore, in the optical system 10, the fourth lens 14 to the sixth lens 16 constitute a main lens group that determines the imaging performance of the optical system 10 (lenses). In addition, through the configurations where the fourth lens 14 is a convex lens, the fifth lens 15 is a convex lens, the sixth lens 16 is a concave lens, and the image-side surface 14b of the fourth lens 14, the image-side surface 15b of the fifth lens 15 and the image-side surface 16b of the sixth lens 16 are convex surfaces relative to the photoelectric conversion element 2, the spherical aberration and coma aberration of the optical system 10 are well corrected.

In addition, when the sixth lens 16 is made of a highly dispersive material, it is possible to well correct the chromatic aberration (lateral chromatic aberration) of a portion with a high image height. In addition, in the sixth lens 16, the object-side surface 16a is concave and the image-side surface 16b is convex, such that the sixth lens 16 becomes an advantageous structure for non-axial aberrations such as astigmatism.

In addition, by making the seventh lens 17 be a convex lens and the eighth lens 18 be a concave lens, it is possible to adjust the astigmatism by the cooperation between the seventh lens 17 and the eighth lens 18. With the seventh lens 17 and the eighth lens 18, the adjustment of the astigmatism is shared by the seventh lens 17 and the eighth lens 18, so that a shape of each of the seventh lens 17 and the eighth lens 18 may be uniformly formed easily, and thus the seventh lens 17 and the eighth lens 18 have good formability. In addition, with the air lens formed between the image-side surface 17b of the seventh lens 17 and the object-side surface 18a of the eighth lens 18, the curvature of image, the aberration and the distortion aberration may be adjusted, so that a vivid image may be obtained.

Further, by making the image-side surface 18b (specifically, the center portion 181b) of the eighth lens 18 concave, the chief ray angle (CRA) of the lights reaching the photoelectric conversion element 2 from the seventh lens 17 may be optimized. In addition, by adjusting the distortion aberration generated in the eighth lens 18 and the distortion aberration generated in the first lens 11 and the second lens 12, a back focal length of the imaging device 1 may be optimized, and the whole imaging device 1 may be miniaturized.

In addition, in the optical system 10 and the imaging device 1 according to examples of the present disclosure, a same field of view as an imaging device (e.g., product name GoPro (registered trademark)) for action close-up and a size that enables the optical system 10 or the imaging device 1 to be mounted on a mobile terminal can be achieved, so that with the expansion of the recent 5G environment, it is possible to transmit ultra-wide-angle images in real time from the mobile terminal, like that for action close-up, and to expand the application of the mobile terminal.

In the following, the imaging optical device of the present disclosure will be described with reference to Example 1 to Example 7. Common structure will be described prior to the detailed description of individual examples.

[Common Structure]

The imaging optical devices of Example 1 to Example 7 each have a same basic structure as the imaging optical device 1 descried in above examples. Specifically, the imaging optical device of individual examples includes an optical system, a drive component, an IR cutoff filter, and a photoelectric conversion element.

The optical system includes eight lenses. Specifically, the optical system includes a first lens, a second lens, a third lens, an aperture stop, a fourth lens, a fifth lens, a sixth lens, a seven lens and an eighth lens arranged in that order in a direction from an object side to an image side. Through the IR cutoff filter, the optical system of each example images information (lights from the object side) of an object at the object side on a surface (light-receiving surface) of the photoelectric conversion element that is used as an imaging surface.

Example 1

Figure 7:
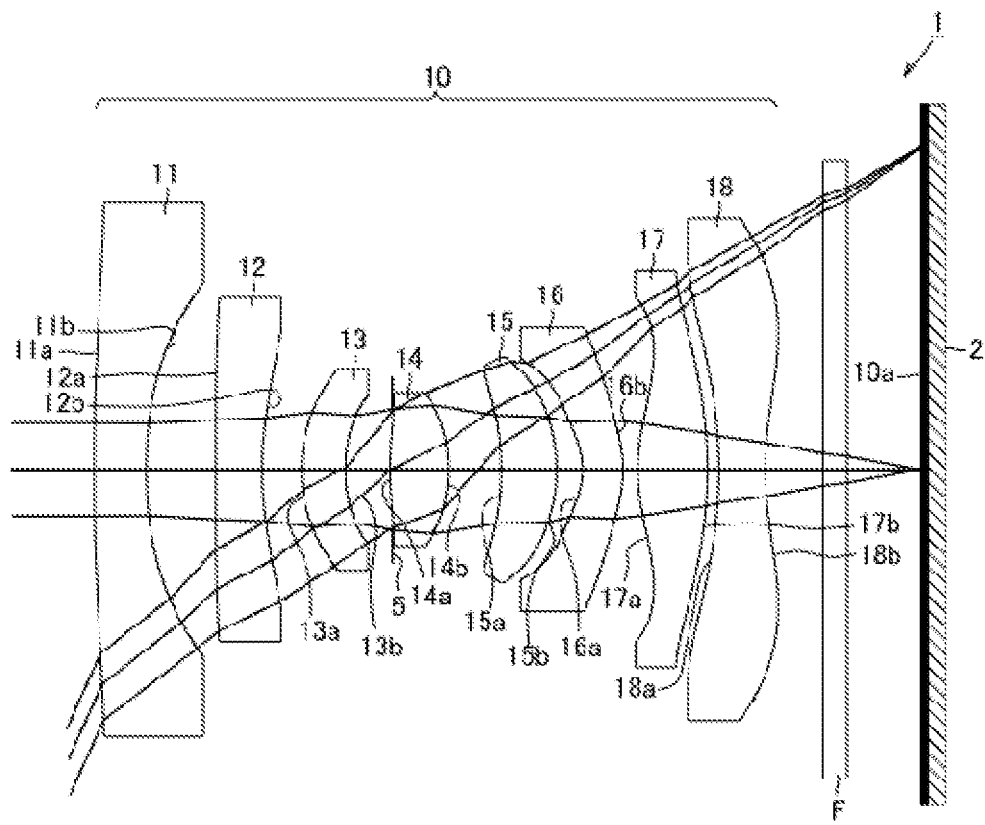
FIG. 7 is a schematic diagram illustrating an imaging optical device in Example 1 of the present disclosure.
Figure 8:
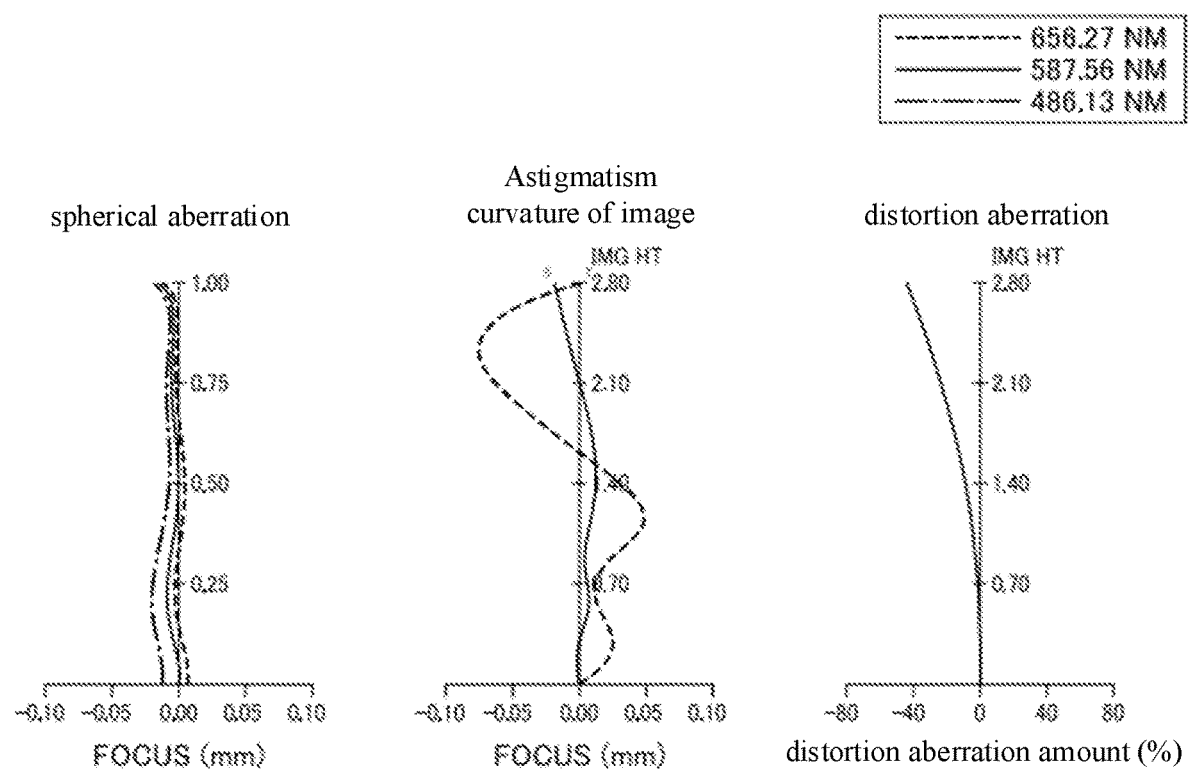
FIG. 8 is a schematic diagram illustrating spherical aberration, astigmatism, and distortion aberration of the imaging optical device in Example 1 of the present disclosure.

FIG. 7 is a schematic diagram illustrating an imaging optical device 1 in Example 1 of the present disclosure. FIG. 8 is a schematic diagram illustrating spherical aberration, astigmatism, and distortion (distortion aberration) of the optical system 10 of Example 1 in order from left to right.

The optical system 10 of Example 1 is described as follows.

The first lens 11 has a negative refractive power and is made of a plastic material. In the first lens 11, an object-side surface 11a is a convex surface, and an image-side surface 11b is a concave surface. Both the object-side surface 11a and the image-side surface 11b of the first lens 11 are aspherical surfaces.

The second lens 12 has a negative refractive power and is made of a plastic material. In the second lens 12, an object-side surface 12a is a concave surface, and an image-side surface 12b is a concave surface. Both the object-side surface 12a and the image-side surface 12b of the second lens 12 are aspherical surfaces.

The third lens 13 has a positive refractive power and is made of a plastic material. In the third lens 13, an object-side surface 13a is a convex surface, and an image-side surface 13b is a concave surface. Both the object-side surface 13a and the image-side surface 13b of the third lens 13 are aspherical surfaces.

The fourth lens 14 has a positive refractive power and is made of a plastic material. In the fourth lens 14, an object-side surface 14a is a convex surface, and an image-side surface 14b is a convex surface. Both the object-side surface 14a and the image-side surface 14b of the fourth lens 14 are aspherical surfaces.

The fifth lens 15 has a positive refractive power and is made of a plastic material. In the fifth lens 15, an object-side surface 15a is a concave surface, and an image-side surface 15b is a convex surface. Both the object-side surface 15a and the image-side surface 15b of the fifth lens 15 are aspherical surfaces.

The sixth lens 16 has a negative refractive power and is made of a plastic material. In the sixth lens 16, an object-side surface 16a is a concave surface, and an image-side surface 16b is a convex surface. Both the object-side surface 16a and the image-side surface 16b of the sixth lens 16 are aspherical surfaces.

The seventh lens 17 has a positive refractive power and is made of a plastic material. In the seventh lens 17, an object-side surface 17a is a convex surface, and an image-side surface 17b is a convex surface. Both the object-side surface 17a and the image-side surface 17b of the seventh lens 17 are aspherical surfaces.

The eighth lens 18 has a negative refractive power and is made of a plastic material. In the eighth lens 18, an object-side surface 18a is a concave surface, and an image-side surface 18b is a concave surface. Both the object-side surface 18a and the image-side surface 18b of the eighth lens 18 are aspherical surfaces.

An aspherical formula of the first lens 11 to the eighth lens 18 included in the optical system 10 of Example 1 is as follows.

$$z = \frac{cr^2}{1+\sqrt{1-(1+k)c^2r^2}} + AR1r + AR2r^2 + AR3r^3 + \ldots\ldots + ARnr^n + \ldots\ldots$$

z: SAG amount (sag height) of an aspheric surface parallel to an optical axis c: curvature at a vertex of a surface (reciprocal of R value)

r: distance in a direction vertical to the optical axis ($\sqrt{(x^2+y^2)}$)

k: conic factor

AR1 to ARn: first order aspheric coefficient to $n^{th}$ order aspheric coefficient In addition, in calculation of values in tables of Example 1, terms of the $15^{th}$ order or higher (n≥15) of the formula (1) are taken as 0.

In addition, Table 1 lists actual numerical values for the structure of each lens. Table 2 lists actual numerical values of aspheric coefficients of each lens. Table 3 lists actual numerical values of conditional formulas of the present disclosure.

TABLE 1

| f = 2.26 mm, Fno = 2.8, HFOV = 65.8 ※reference wavelength: 587.56 nm | | | | | | | |
|---|---|---|---|---|---|---|---|
| surface number | name | radius of curvature | surface definition | thickness/ space | material | refractive index | dispersion value | focal length |
| 0 | object surface | plane | | Infinity | | | | |
| 1 | first lens | 20.250 | aspherical | 0.450 | resin | 1.544 | 55.9 | −8.04 |
| 2 | | 3.567 | aspherical | 0.603 | | | | |
| 3 | second lens | −54.031 | aspherical | 0.400 | resin | 1.544 | 55.9 | −4.69 |
| 4 | | 2.686 | aspherical | 0.340 | | | | |
| 5 | third lens | 1.293 | aspherical | 0.380 | resin | 1.661 | 20.4 | 13.87 |
| 6 | | 1.329 | aspherical | 0.391 | | | | |
| 7 | aperture stop | plane | | 0.000 | | | | |
| 8 | fourth lens | 3.136 | aspherical | 0.501 | resin | 1.544 | 55.9 | 1.86 |
| 9 | | −1.413 | aspherical | 0.456 | | | | |
| 10 | fifth lens | −2.653 | aspherical | 0.480 | resin | 1.544 | 55.9 | 4.88 |
| 11 | | −1.412 | aspherical | 0.225 | | | | |
| 12 | sixth lens | −0.620 | aspherical | 0.350 | resin | 1.680 | 18.4 | −2.93 |
| 13 | | −1.105 | aspherical | 0.128 | | | | |
| 14 | seventh lens | 1.555 | aspherical | 0.600 | resin | 1.544 | 55.9 | 2.15 |
| 15 | | −4.044 | aspherical | 0.103 | | | | |
| 16 | eighth lens | −3.869 | aspherical | 0.400 | resin | 1.544 | 55.9 | −2.89 |
| 17 | | 2.746 | aspherical | 0.500 | | | | |
| 18 | IR cutoff filter | plane | | 0.210 | glass | 1.517 | 64.2 | |
| 19 | | plane | | 0.639 | | | | |
| 20 | imaging surface | plane | | — | | | | |

TABLE 2

| ASP coefficient | s1 | s2 | s3 | s4 | s5 |
|---|---|---|---|---|---|
| K | 0.0000E+00 | 2.1348E+00 | 5.8950E+01 | −1.0181E+00 | −2.3650E+00 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 |
| AR4 | −9.2407E−04 | 7.2644E−03 | 2.7341E−02 | −1.1928E−01 | 2.6128E−02 |
| AR5 | 0.0000E+00 | 0.0000E+00 | 0.0000E+00 | 0.0000E+00 | 0.0000E+00 |
| AR6 | −1.3344E−04 | 2.1978E−03 | −1.2794E−02 | 9.3134E−02 | 1.3163E−01 |
| AR7 | 0.0000E+00 | 0.0000E+00 | 0.0000E+00 | 0.0000E+00 | 0.0000E+00 |
| AR8 | 6.3745E−06 | −7.3135E−04 | 2.9222E−03 | −3.6583E−02 | 4.4597E−02 |
| AR9 | 0.0000E+00 | 0.0000E+00 | 0.0000E+00 | 0.0000E+00 | 0.0000E+00 |
| AR10 | −1.0134E−06 | −1.7465E−04 | −8.2331E−04 | −2.5579E−03 | −1.0024E−01 |
| AR11 | 0.0000E+00 | 0.0000E+00 | 0.0000E+00 | 0.0000E+00 | 0.0000E+00 |
| AR12 | 0.0000E+00 | 0.0000E+00 | 2.7506E−04 | 4.7629E−03 | −2.6190E−02 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s6 | s8 | s9 | s10 | s11 |
|---|---|---|---|---|---|
| K | 2.2505E+00 | −1.0827E+02 | −9.1710E−01 | 0.0000E+00 | −4.3274E−02 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | −9.7985E−06 | 1.4598E−02 | −1.6539E−01 | −2.0594E−01 |
| AR4 | −2.2835E−02 | 3.7483E−01 | −3.5842E−01 | 1.6126E+00 | 1.9659E+00 |
| AR5 | 0.0000E+00 | −4.7557E−01 | 1.0977E+00 | −9.8369E+00 | −1.0051E+01 |
| AR6 | −1.8143E−01 | −3.3130E+00 | −4.0899E+00 | 3.2342E+01 | 2.9456E+01 |
| AR7 | 0.0000E+00 | 1.3865E+01 | 9.5168E+00 | −6.1618E+01 | −4.6494E+01 |
| AR8 | 1.6631E+00 | −2.7286E+01 | −1.5046E+01 | 6.8180E+01 | 3.7780E+01 |
| AR9 | 0.0000E+00 | 2.7410E+01 | 1.4201E+01 | −4.0347E+01 | −1.4242E+01 |
| AR10 | −4.2508E+00 | −1.2000E+01 | −6.4755E+00 | 9.8848E+00 | 1.7332E+00 |
| AR11 | 0.0000E+00 | 0.0000E+00 | 0.0000E+00 | 0.0000E+00 | 0.0000E+00 |
| AR12 | 2.9948E+00 | 0.0000E+00 | 0.0000E+00 | 0.0000E+00 | 0.0000E+00 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s12 | s13 | s14 | s15 | s16 | s17 |
|---|---|---|---|---|---|---|
| K | −9.3599E−01 | −6.6023E−01 | −1.3050E+00 | 0.0000E+00 | 0.0000E+00 | −1.0335E+00 |
| AR1 | 0.0000E+00 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 | 0.0000E+00 |
| AR4 | 1.2148E+00 | 5.0293E−01 | −2.6784E−01 | 2.1065E−03 | 1.2938E−02 | −9.7807E−02 |
| AR5 | 0.0000E+00 | 0.0000E+00 | 0.0000E+00 | 0.0000E+00 | 0.0000E+00 | 0.0000E+00 |
| AR6 | −1.3009E+00 | −3.7688E−01 | 1.4205E−01 | 2.9842E−03 | 2.0442E−04 | 2.2888E−02 |
| AR7 | 0.0000E+00 | 0.0000E+00 | 0.0000E+00 | 0.0000E+00 | 0.0000E+00 | 0.0000E+00 |
| AR8 | 4.7208E−02 | 1.3014E−01 | −6.4500E−02 | −1.6845E−05 | 1.8694E−04 | −4.8354E−03 |
| AR9 | 0.0000E+00 | 0.0000E+00 | 0.0000E+00 | 0.0000E+00 | 0.0000E+00 | 0.0000E+00 |
| AR10 | 6.2889E−01 | −1.1642E−02 | 1.8262E−02 | −2.9258E−05 | 4.6275E−05 | 6.4503E−04 |
| AR11 | 0.0000E+00 | 0.0000E+00 | 0.0000E+00 | 0.0000E+00 | 0.0000E+00 | 0.0000E+00 |
| AR12 | −4.7633E−01 | 4.3943E−03 | −3.1729E−03 | 3.6764E−06 | 4.8330E−06 | −4.5655E−05 |
| AR13 | 0.0000E+00 | 0.0000E+00 | 0.0000E+00 | 0.0000E+00 | 0.0000E+00 | 0.0000E+00 |
| AR14 | 1.1222E−01 | −2.1874E−03 | 1.6333E−04 | 1.1110E−05 | −2.5818E−06 | 1.8597E−06 |

TABLE 3

| | | | |
|---|---|---|---|
| f | 2.26 | (|R13| + |R16|)/(CT7 + T78 + CT8) | 3.900 |
| HFOV | 65.8 | |R14/R15| | 1.045 |
| |f1/f2| | 1.713 | TL/f | 3.166 |
| |f12/f3| | 0.201 | |sag11/sag31| | 0.277 |
| T67/T34 | 0.328 | |DST1.0/FOV| | 0.337 |
| TL/ImagH | 2.556 | |DST1.0/DST0.7| | 2.173 |
| (R7 + R8)/(R7 − R8) | 0.379 | f/(CT7 + T78 + CT8) | 2.049 |
| T12/T23 | 1.774 | CT7/CT8 | 1.500 |
| T23/T34 | 0.871 | |f/f12| + |f/f3| | 0.973 |
| tan(HFOV) | 2.228 | f12/f6 | 0.953 |
| Fno | 2.80 | SD/TD | 0.558 |
| Y11/Y82 | 1.066 | Yc82/f | 0.524 |
| V6/V7 | 0.329 | CT1/CT8 | 1.125 |
| (f/f4) − (f/f5) | 0.750 | |f5/f12| | 1.749 |
| T67/CT7 | 0.214 | (T12 + T23 + T67 + T78)/(T34 + T45 + T56) | 1.097 |
| T78/CT8 | 0.257 | Nmax | 1.680 |

Relationships between each numerical value in Table 3 and the respective conditional formula of the present disclosure are as follow.

In Table 3, |f1/f2|=1.713, and it satisfies |f1/f2|<6.

In Table 3, |f12/f3|=0.201, and it satisfies |f12/f3|<0.5.

In Table 3, T67/T34=0.328, and it satisfies 0<T67/T34<1.0.

In Table 3, TL/ImgH=2.556, and it satisfies TL/ImgH<3.

In Table 3, (R7+R8)/(R7−R8)=0.379, and it satisfies 0<(R7+R8)/(R7−R8)<1.0.

In Table 3, T12/T23=1.774, and it satisfies 0<T12/T23<3.0.

In Table 3, T23/T34=0.871, and it satisfies 0<T23/T34<2.0.

In Table 3, tan(HFOV)=2.228, and it satisfies 2.0<tan(HFOV).

In Table 3, Fno=2.80, and it satisfies 1.4<Fno<3.0.

In Table 3, Y11/Y82=1.066, and it satisfies 0.8<Y11/Y82<1.5.

In Table 3, V6/V7=0.329, and it satisfies 0<V6/V7<0.50.

In Table 3, (f/f4)−(f/f5)=0.750, and it satisfies 0<(f/f4)−(f/f5)<2.0.

In Table 3, T67/CT7=0.214, and it satisfies T67/CT7<0.50.

In Table 3, T78/CT8=0.257, and it satisfies T78/CT8<0.70.

In Table 3, (|R13|+|R16|)/(CT7+T78+CT8)=3.900, and it satisfies 2.0<(|R13|+|R16|)/(CT7+T78+CT8)<4.5.

In Table 3, |R14/R15|=1.045, and it satisfies 0.6<|R14/R15|<1.3.

In Table 3, TL/f=3.166, and it satisfies 2.0<TL/f<4.0.

In Table 3, |Sag11/Sag31|=0.277, and it satisfies |Sag11/Sag31|<5.0.

In Table 3, |DST1.0/FOV|=0.337, and it satisfies |DST1.0/FOV|<0.5.

In Table 3, |DST1.0/DST0.7|=2.173, and it satisfies |DST1.0/DST0.7|<10.

In Table 3, f/(CT7+T78+CT8)=2.049, and it satisfies 0.3<f/(CT7+T78+CT8)<3.5.

In Table 3, CT7/CT8=1.500, and it satisfies 1.0<CT7/CT8<2.0.

In Table 3, |f/f12|+|f/f3|=0.973, and it satisfies 0.3<|f/f12|+|f/f3|<1.5.

In Table 3, f12/f6=0.953, and it satisfies 0.5<f12/f6<1.5.

In Table 3, SD/TD=0.558, and it satisfies 0.45<SD/TD<0.65.

In Table 3, Yc82/f=0.524, and it satisfies 0.45<Yc82/f<0.75.

In Table 3, CT1/CT8=1.125, and it satisfies 0.5<CT1/CT8<1.5.

In Table 3, |f5/f12|=1.749, and it satisfies 0.8<|f5/f12|<2.5.

In Table 3, (T12+T23+T67+T78)/(T34+T45+T56)=1.097, and it satisfies (T12+T23+T67+T78)/(T34+T45+T56)<1.5.

In Table 3, Nmax=1.680, and it satisfies 1.60<Nmax<1.72.

Based on the above, it can be confirmed that each numerical value in Table 3 with respect to the optical system 10 of Example 1 satisfies the respective conditional formula of the present disclosure.

Example 2

Figure 9:
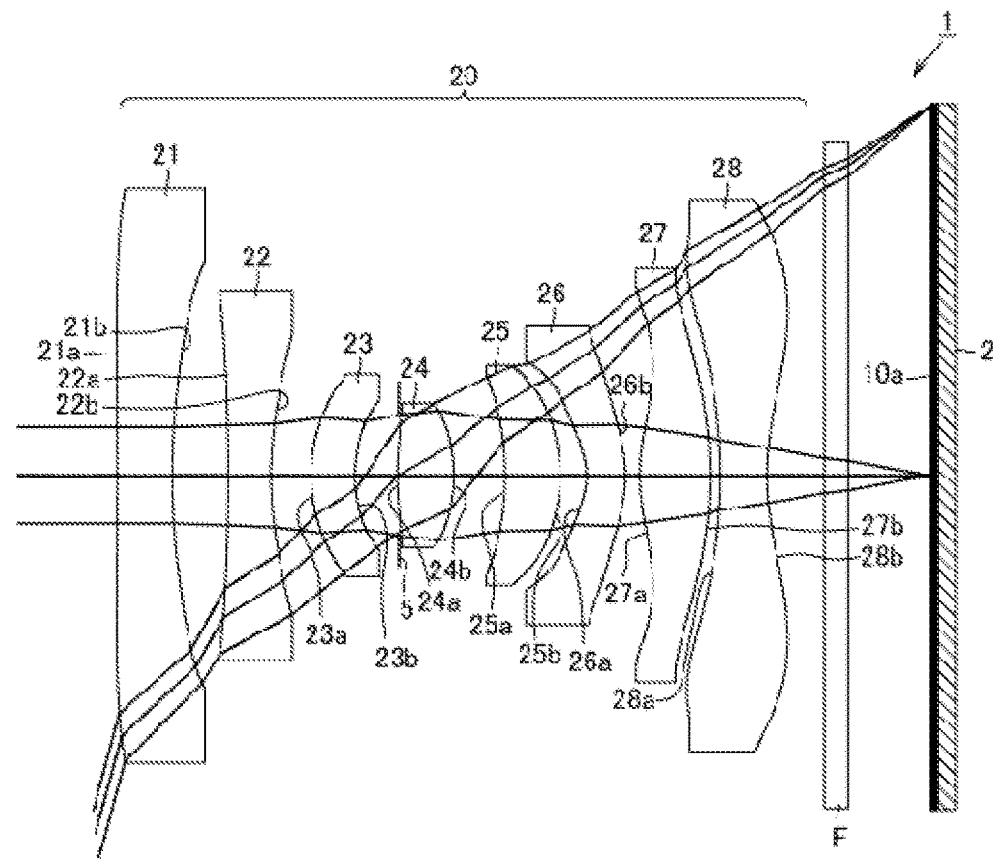
FIG. 9 is a schematic diagram illustrating an imaging optical device in Example 2 of the present disclosure.
Figure 10:
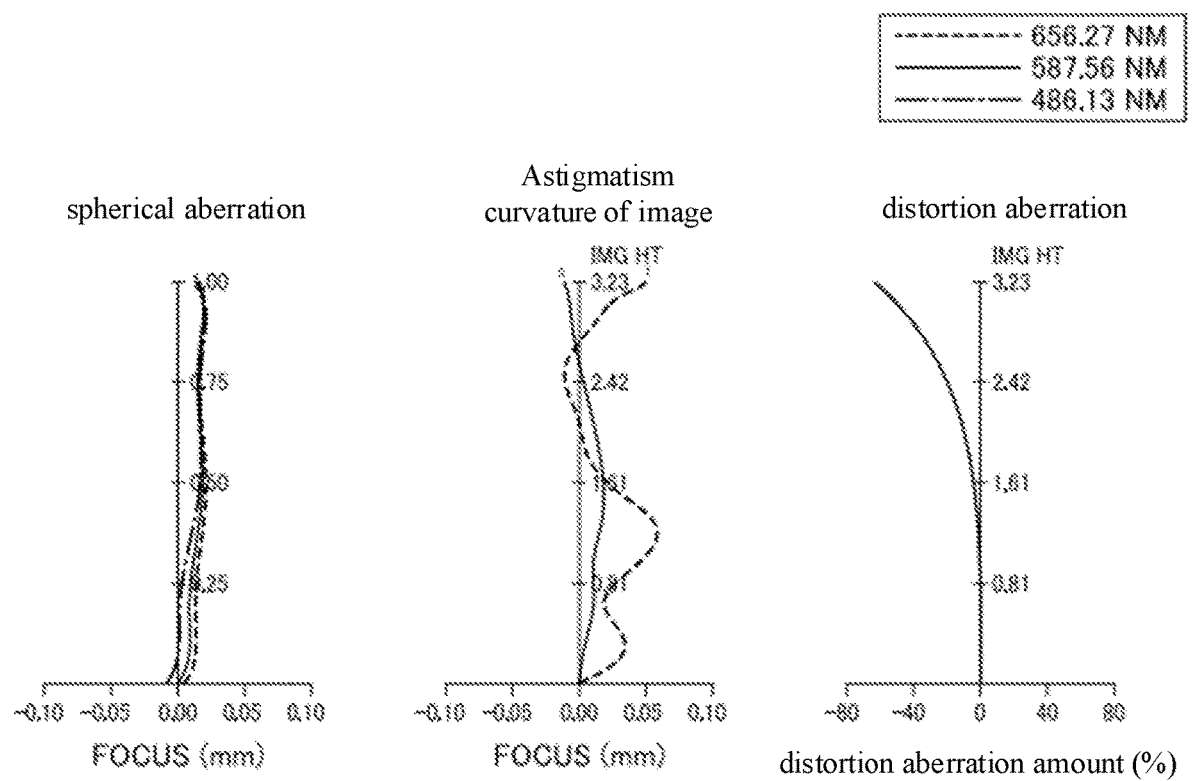
FIG. 10 is a schematic diagram illustrating spherical aberration, astigmatism, and distortion aberration of the imaging optical device in Example 2 of the present disclosure.

FIG. 9 is a schematic diagram illustrating an imaging optical device 1 in Example 2 of the present disclosure. FIG. 10 is a schematic diagram illustrating spherical aberration, astigmatism, and distortion (distortion aberration) of an optical system 20 of Example 2 in order from left to right.

The optical system 20 of Example 2 is described as follows.

The first lens 21 has a negative refractive power and is made of a plastic material. In the first lens 21, an object-side surface 21a is a concave surface, and an image-side surface 21b is a concave surface. Both the object-side surface 21a and the image-side surface 21b of the first lens 21 are aspherical surfaces.

The second lens 22 has a negative refractive power and is made of a plastic material. In the second lens 22, an object-side surface 22a is a concave surface, and an image-side surface 22b is a concave surface. Both the object-side surface 22a and the image-side surface 22b of the second lens 22 are aspherical surfaces.

The third lens 23 has a positive refractive power and is made of a plastic material. In the third lens 23, an object-side surface 23a is a convex surface, and an image-side surface 23b is a concave surface. Both the object-side surface 23a and the image-side surface 23b of the third lens 23 are aspherical surfaces.

The fourth lens 24 has a positive refractive power and is made of a plastic material. In the fourth lens 24, an object-side surface 24a is a convex surface, and an image-side surface 24b is a convex surface. Both the object-side surface 24a and the image-side surface 24b of the fourth lens 24 are aspherical surfaces.

The fifth lens 25 has a positive refractive power and is made of a plastic material. In the fifth lens 25, an object-side surface 25a is a concave surface, and an image-side surface 25b is a convex surface. Both the object-side surface 25a and the image-side surface 25b of the fifth lens 25 are aspherical surfaces.

The sixth lens 26 has a negative refractive power and is made of a plastic material. In the sixth lens 26, an object-side surface 26a is a concave surface, and an image-side surface 26b is a convex surface. Both the object-side surface 26a and the image-side surface 26b of the sixth lens 26 are aspherical surfaces.

The seventh lens 27 has a positive refractive power and is made of a plastic material. In the seventh lens 27, an object-side surface 27a is a convex surface, and an image-side surface 27b is a convex surface. Both the object-side surface 27a and the image-side surface 27b of the seventh lens 27 are aspherical surfaces.

The eighth lens 28 has a negative refractive power and is made of a plastic material. In the eighth lens 28, an object-side surface 28a is a concave surface, and an image-side surface 28b is a concave surface. Both the object-side surface 28a and the image-side surface 28b of the eighth lens 28 are aspherical surfaces.

An aspherical formula of the first lens 21 to the eighth lens 28 included in the optical system 20 of Example 2 is the same as the aspherical formula (1) in Example 1. In addition, in calculation of values in tables of Example 2, terms of the $15^{th}$ order or higher (n≥15) of the formula (1) are taken as 0.

In addition, Table 4 lists actual numerical values for the structure of each lens. Table 5 lists actual numerical values of aspheric coefficients of each lens. Table 6 lists actual numerical values of conditional formulas of the present disclosure.

TABLE 4

| surface number | name | radius of curvature | surface definition | thickness/ space | material | refractive index | dispersion value | focal length |
|---|---|---|---|---|---|---|---|---|
| \multicolumn{9}{c}{f = 2.35 mm, Fno = 2.8, HFOV = 75.0 X-reference wavelength: 587.56 nm} |
| 0 | object surface | plane | | Infinity | | | | |
| 1 | first lens | −233.631 | aspherical | 0.480 | resin | 1.544 | 55.9 | −10.84 |
| 2 | | 6.052 | aspherical | 0.489 | | | | |

TABLE 4-continued f = 2.35 mm, Fno = 2.8, HFOV = 75.0 X reference wavelength: 587.56 nm

| surface number | name | radius of curvature | surface definition | thickness/ space | material | refractive index | dispersion value | focal length |
|---|---|---|---|---|---|---|---|---|
| 3 | second lens | −14.596 | aspherical | 0.370 | resin | 1.544 | 55.9 | −4.38 |
| 4 | | 2.875 | aspherical | 0.351 | | | | |
| 5 | third lens | 1.327 | aspherical | 0.383 | resin | 1.661 | 20.4 | 17.87 |
| 6 | | 1.323 | aspherical | 0.370 | | | | |
| 7 | aperture stop | | plane | 0.000 | | | | |
| 8 | fourth lens | 3.256 | aspherical | 0.490 | resin | 1.544 | 55.9 | 1.97 |
| 9 | | −1.509 | aspherical | 0.448 | | | | |
| 10 | fifth lens | −3.215 | aspherical | 0.480 | resin | 1.544 | 55.9 | 4.21 |
| 11 | | −1.407 | aspherical | 0.228 | | | | |
| 12 | sixth lens | −0.641 | aspherical | 0.343 | resin | 1.680 | 18.4 | −3.04 |
| 13 | | −1.131 | aspherical | 0.122 | | | | |
| 14 | seventh lens | 1.640 | aspherical | 0.612 | resin | 1.544 | 55.9 | 2.15 |
| 15 | | −3.533 | aspherical | 0.095 | | | | |
| 16 | eighth lens | −4.209 | aspherical | 0.400 | resin | 1.544 | 55.9 | −2.65 |
| 17 | | 2.260 | aspherical | 0.500 | | | | |
| 18 | IR cutoff filter | | plane | 0.210 | glass | 1.517 | 64.2 | |
| 19 | | | plane | 0.712 | | | | |
| 20 | imaging surface | | plane | — | | | | |

TABLE 5

| ASP coefficient | s1 | s2 | s3 | s4 | s5 |
|---|---|---|---|---|---|
| K | 0.0000E+00 | −5.2564E+00 | 5.8950E+01 | 1.3691E−01 | −2.5773E+00 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 |
| AR4 | −8.8895E−04 | −8.5271E−03 | 1.7134E−02 | −1.0930E−01 | −1.0434E−04 |
| AR5 | 0.0000E+00 | 0.0000E+00 | 0.0000E+00 | 0.0000E+00 | 0.0000E+00 |
| AR6 | 5.9307E−04 | 2.3313E−03 | −1.0750E−02 | 9.5779E−02 | 1.1980E−01 |
| AR7 | 0.0000E+00 | 0.0000E+00 | 0.0000E+00 | 0.0000E+00 | 0.0000E+00 |
| AR8 | −4.6121E−06 | −1.4865E−05 | 4.2509E−03 | −3.7214E−02 | 8.8965E−02 |
| AR9 | 0.0000E+00 | 0.0000E+00 | 0.0000E+00 | 0.0000E+00 | 0.0000E+00 |
| AR10 | −2.5043E−06 | 5.2100E−05 | −1.1001E−03 | −2.4258E−03 | −1.0080E−01 |
| AR11 | 0.0000E+00 | 0.0000E+00 | 0.0000E+00 | 0.0000E+00 | 0.0000E+00 |
| AR12 | 0.0000E+00 | 0.0000E+00 | 1.4507E−04 | 3.0564E−03 | −4.1390E−02 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s6 | s8 | s9 | s10 | s11 |
|---|---|---|---|---|---|
| K | 2.2505E+00 | −1.0827E+02 | −9.1973E−01 | 0.0000E+00 | −4.3274E−02 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | −2.0958E−02 | 1.4636E−02 | −1.7268E−01 | −2.0556E−01 |
| AR4 | −5.1322E−02 | 4.6553E−01 | −3.5833E−01 | 1.6094E+00 | 1.9662E+00 |
| AR5 | 0.0000E+00 | −6.0984E−01 | 1.0978E+00 | −9.8775E+00 | −1.0051E+01 |
| AR6 | −2.0072E−01 | −3.3340E+00 | −4.0897E+00 | 3.2335E+01 | 2.9456E+01 |
| AR7 | 0.0000E+00 | 1.4219E+01 | 9.5171E+00 | −6.1614E+01 | −4.6494E+01 |
| AR8 | 1.7061E+00 | −2.7062E+01 | −1.5046E+01 | 6.8146E+01 | 3.7780E+01 |
| AR9 | 0.0000E+00 | 2.6503E+01 | 1.4200E+01 | −4.0414E+01 | −1.4242E+01 |
| AR10 | −3.8567E+00 | −1.1619E+01 | −6.4774E+00 | 9.9521E+00 | 1.7330E+00 |
| AR11 | 0.0000E+00 | 0.0000E+00 | 0.0000E+00 | 0.0000E+00 | 0.0000E+00 |
| AR12 | 2.4405E+00 | 0.0000E+00 | 0.0000E+00 | 0.0000E+00 | 0.0000E+00 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s12 | s13 | s14 | s15 | s16 | s17 |
|---|---|---|---|---|---|---|
| K | −9.5596E−01 | −6.6023E−01 | −1.3050E+00 | 0.0000E+00 | 0.0000E+00 | −9.5083E−01 |
| AR1 | 0.0000E+00 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 | 0.0000E+00 |
| AR4 | 1.2033E+00 | 5.0275E−01 | −2.8326E−01 | 8.0098E−03 | 7.3002E−03 | −1.0007E−01 |
| AR5 | 0.0000E+00 | 0.0000E+00 | 0.0000E+00 | 0.0000E+00 | 0.0000E+00 | 0.0000E+00 |

TABLE 5-continued

| AR6 | −1.2597E+00 | −3.7689E−01 | 1.4527E−01 | 3.3612E−03 | −1.4024E−03 | 2.5217E−02 |
| AR7 | 0.0000E+00 | 0.0000E+00 | 0.0000E+00 | 0.0000E+00 | 0.0000E+00 | 0.0000E+00 |
| AR8 | 3.5689E−02 | 1.3012E−01 | −6.1431E−02 | −6.6426E−04 | 2.6707E−04 | −5.1462E−03 |
| AR9 | 0.0000E+00 | 0.0000E+00 | 0.0000E+00 | 0.0000E+00 | 0.0000E+00 | 0.0000E+00 |
| AR10 | 6.4839E−01 | −1.1659E−02 | 1.8374E−02 | −2.8111E−05 | 1.5405E−04 | 6.1569E−04 |
| AR11 | 0.0000E+00 | 0.0000E+00 | 0.0000E+00 | 0.0000E+00 | 0.0000E+00 | 0.0000E+00 |
| AR12 | −4.6143E−01 | 4.3976E−03 | −3.5133E−03 | 5.0301E−05 | 3.0743E−05 | −3.8514E−05 |
| AR13 | 0.0000E+00 | 0.0000E+00 | 0.0000E+00 | 0.0000E+00 | 0.0000E+00 | 0.0000E+00 |
| AR14 | 1.1304E−01 | −2.1682E−03 | 3.8104E−04 | 4.7067E−06 | −9.8050E−06 | 1.3225E−06 |

TABLE 6

| f | 2.35 | (|R13| + |R16|)/(CT7 + T78 + CT8) | 3.522 |
| HFOV | 75.0 | |R14/R15| | 0.839 |
| |f1/f2| | 2.473 | TL/f | 3.010 |
| |f12/f3| | 0.167 | |sag11/sag31| | 0.216 |
| T67/T34 | 0.331 | |DST1.0/FOV| | 0.422 |
| TL/ImagH | 2.195 | |DST1.0/DST0.7| | 4.125 |
| (R7 + R8)/(R7 − R8) | 0.367 | f/(CT7 + T78 + CT8) | 2.126 |
| T12/T23 | 1.391 | CT7/CT8 | 1.531 |
| T23/T34 | 0.951 | |f/f12| + |f/f3| | 0.920 |
| tan(HFOV) | 3.723 | f12/f6 | 0.982 |
| Fno | 2.80 | SD/TD | 0.569 |
| Y11/Y82 | 1.042 | Yc82/f | 0.610 |
| V6/V7 | 0.329 | CT1/CT8 | 1.200 |
| (f/f4) − (f/f5) | 0.637 | |f5/f12| | 1.410 |
| T67/CT7 | 0.200 | (T12 + T23 + T67 + T78)/(T34 + T45 + T56) | 1.012 |
| T78/CT8 | 0.238 | Nmax | 1.680 |

Relationships between each numerical value in Table 6 and the respective conditional formula of the present disclosure are as follow.

In Table 6, |f1/f2|=2.473, and it satisfies |f1/f2|<6.

In Table 6, |f12/f3|=0.167, and it satisfies |f12/f3|<0.5.

In Table 6, T67/T34=0.331, and it satisfies 0<T67/T34<1.0.

In Table 6, TL/ImgH=2.195, and it satisfies TL/ImgH<3.

In Table 6, (R7+R8)/(R7−R8)=0.367, and it satisfies 0<(R7+R8)/(R7−R8)<1.0.

In Table 6, T12/T23=1.391, and it satisfies 0<T12/T23<3.0.

In Table 6, T23/T34=0.951, and it satisfies 0<T23/T34<2.0.

In Table 6, tan(HFOV)=3.723, and it satisfies 2.0<tan(HFOV).

In Table 6, Fno=2.80, and it satisfies 1.4<Fno<3.0.

In Table 6, Y11/Y82=1.042, and it satisfies 0.8<Y11/Y82<1.5.

In Table 6, V6/V7=0.329, and it satisfies 0<V6/V7<0.50.

In Table 6, (f/f4)−(f/f5)=0.637, and it satisfies 0<(f/f4)−(f/f5)<2.0.

In Table 6, T67/CT7=0.200, and it satisfies T67/CT7<0.50.

In Table 6, T78/CT8=0.238, and it satisfies T78/CT8<0.70.

In Table 6, (|R13|+|R16|)/(CT7+T78+CT8)=3.522, and it satisfies 2.0<(|R13|+|R16|)/(CT7+T78+CT8)<4.5.

In Table 6, |R14/R15|=0.839, and it satisfies 0.6<|R14/R15|<1.3.

In Table 6, TL/f=3.010, and it satisfies 2.0<TL/f<4.0.

In Table 6, |Sag11/Sag31|=0.216, and it satisfies |Sag11/Sag31|<5.0.

In Table 6, |DST1.0/FOV|=0.422, and it satisfies |DST1.0/FOV|<0.5.

In Table 6, |DST1.0/DST0.7|=4.125, and it satisfies |DST1.0/DST0.7|<10.

In Table 6, f/(CT7+T78+CT8)=2.126, and it satisfies 0.3<f/(CT7+T78+CT8)<3.5.

In Table 6, CT7/CT8=1.531, and it satisfies 1.0<CT7/CT8<2.0.

In Table 6, |f/f12|+|f/f3|=0.920, and it satisfies 0.3<|f/f12|+|f/f3|<1.5.

In Table 6, f12/f6=0.982, and it satisfies 0.5<f12/f6<1.5.

In Table 6, SD/TD=0.569, and it satisfies 0.45<SD/TD<0.65.

In Table 6, Yc82/f=0.610, and it satisfies 0.45<Yc82/f<0.75.

In Table 6, CT1/CT8=1.200, and it satisfies 0.5<CT1/CT8<1.5.

In Table 6, |f5/f12|=1.410, and it satisfies 0.8<|f5/f12|<2.5.

In Table 6, (T12+T23+T67+T78)/(T34+T45+T56)=1.012, and it satisfies (T12+T23+T67+T78)/(T34+T45+T56)<1.5.

In Table 6, Nmax=1.680, and it satisfies 1.60<Nmax<1.72.

Based on the above, it can be confirmed that each numerical value in Table 6 with respect to the optical system 20 of Example 2 satisfies the respective conditional formula of the present disclosure.

Example 3

Figure 11:
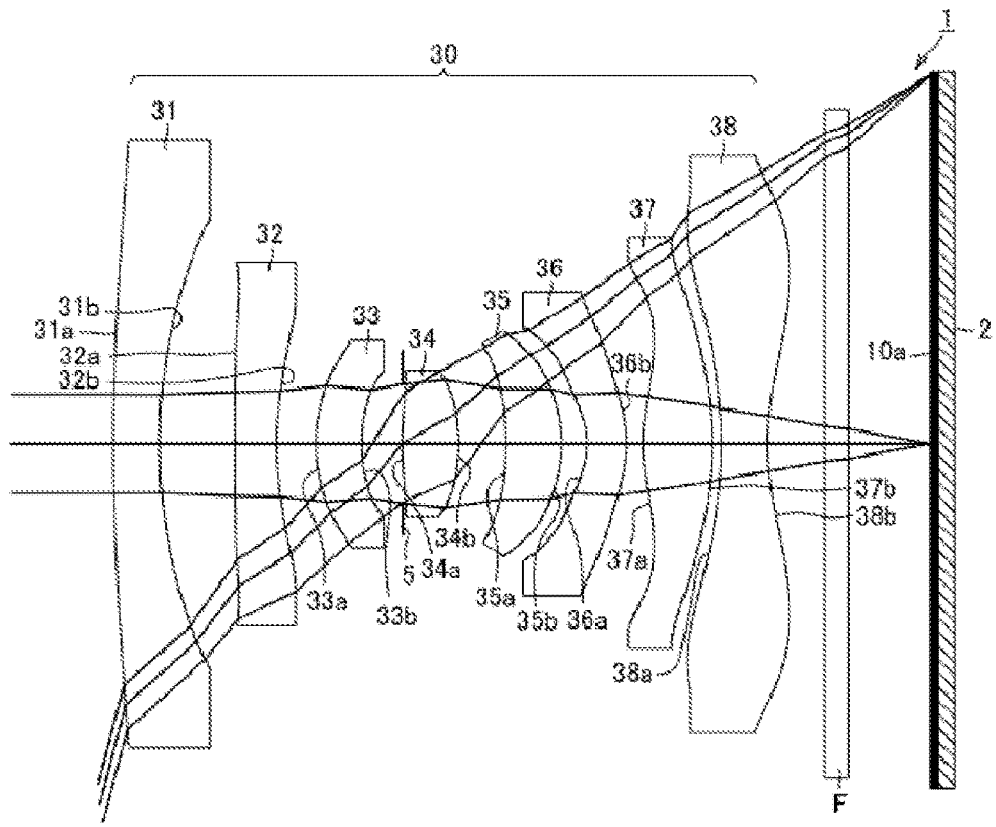
FIG. 11 is a schematic diagram illustrating an imaging optical device in Example 3 of the present disclosure.
Figure 12:
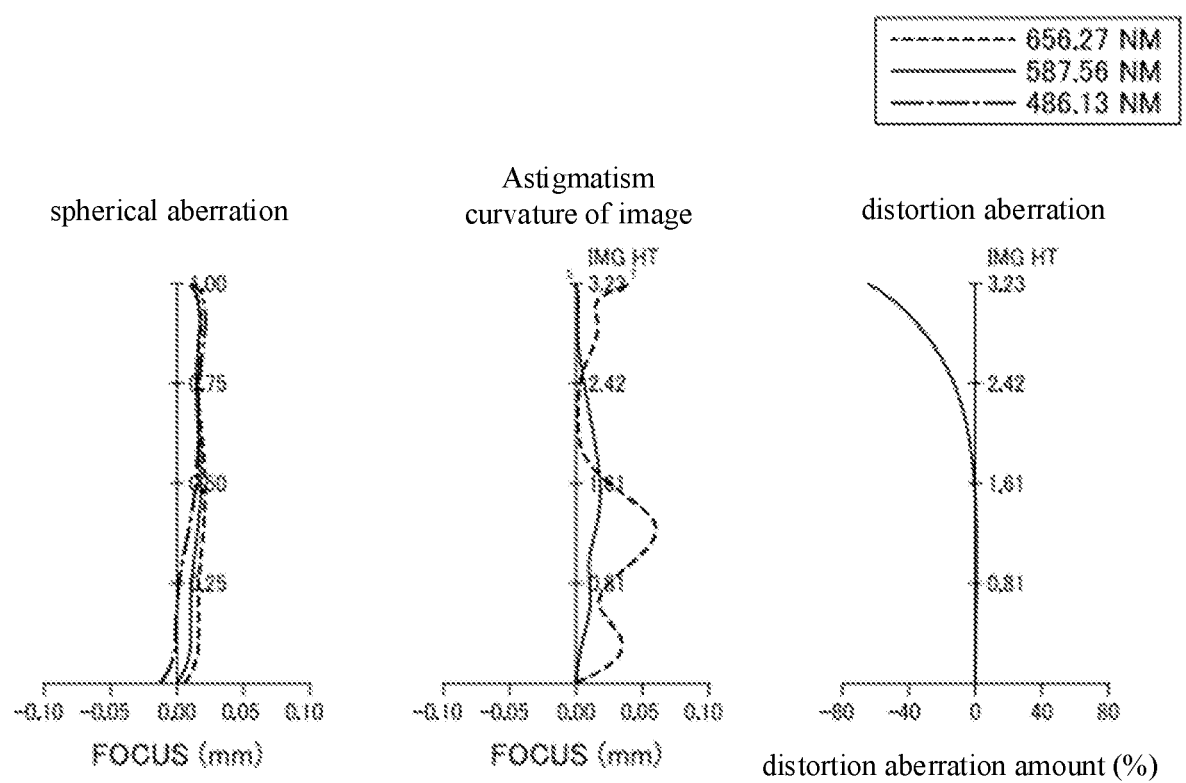
FIG. 12 is a schematic diagram illustrating spherical aberration, astigmatism, and distortion aberration of the imaging optical device in Example 3 of the present disclosure.

FIG. 11 is a schematic diagram illustrating an imaging optical device 1 in Example 3 of the present disclosure. FIG. 12 is a schematic diagram illustrating spherical aberration, astigmatism, and distortion (distortion aberration) of an optical system 30 of Example 3 in order from left to right.

The optical system 30 of Example 3 is described as follows.

The first lens 31 has a negative refractive power and is made of a plastic material. In the first lens 31, an object-side surface 31a is a convex surface, and an image-side surface 31b is a concave surface. Both the object-side surface 31a and the image-side surface 31b of the first lens 31 are aspherical surfaces.

The second lens 32 has a negative refractive power and is made of a plastic material. In the second lens 32, an object-side surface 32a is a convex surface, and an image-side surface 32b is a concave surface. Both the object-side surface 32a and the image-side surface 32b of the second lens 32 are aspherical surfaces.

The third lens 33 has a positive refractive power and is made of a plastic material. In the third lens 33, an object-side surface 33a is a convex surface, and an image-side surface 33b is a concave surface. Both the object-side surface 33a and the image-side surface 33b of the third lens 33 are aspherical surfaces.

The fourth lens 34 has a positive refractive power and is made of a plastic material. In the fourth lens 34, an object-side surface 34a is a convex surface, and an image-side surface 34b is a convex surface. Both the object-side surface 34a and the image-side surface 34b of the fourth lens 34 are aspherical surfaces.

The fifth lens 35 has a positive refractive power and is made of a plastic material. In the fifth lens 35, an object-side surface 35a is a concave surface, and an image-side surface 35b is a convex surface. Both the object-side surface 35a and the image-side surface 35b of the fifth lens 35 are aspherical surfaces.

The sixth lens 36 has a negative refractive power and is made of a plastic material. In the sixth lens 36, an object-side surface 36a is a concave surface, and an image-side surface 36b is a convex surface. Both the object-side surface 36a and the image-side surface 36b of the sixth lens 36 are aspherical surfaces.

The seventh lens 37 has a positive refractive power and is made of a plastic material. In the seventh lens 37, an object-side surface 37a is a convex surface, and an image-side surface 37b is a convex surface. Both the object-side surface 37a and the image-side surface 37b of the seventh lens 37 are aspherical surfaces.

The eighth lens 38 has a negative refractive power and is made of a plastic material. In the eighth lens 38, an object-side surface 38a is a concave surface, and an image-side surface 38b is a concave surface. Both the object-side surface 38a and the image-side surface 38b of the eighth lens 38 are aspherical surfaces.

An aspherical formula of the first lens 31 to the eighth lens 38 included in the optical system 30 of Example 3 is the same as the aspherical formula (1) in Example 1. In addition, in calculation of values in tables of Example 3, terms of the $15^{th}$ order or higher (n≥15) of the formula (1) are taken as 0.

In addition, Table 7 lists actual numerical values for the structure of each lens. Table 8 lists actual numerical values of aspheric coefficients of each lens. Table 9 lists actual numerical values of conditional formulas of the present disclosure.

TABLE 7

| | | | f = 2.42 mm, Fno = 2.8, HFOV = 75.0 ✗ reference wavelength: 587.56 nm | | | | |
|---|---|---|---|---|---|---|---|
| surface number | name | radius of curvature | surface definition | thickness/ space | material | refractive index | dispersion value | focal length |
| 0 | object surface | | plane | Infinity | | | | |
| 1 | first lens | 20.654 | aspherical | 0.400 | resin | 1.544 | 55.9 | −11.67 |
| 2 | | 4.823 | aspherical | 0.661 | | | | |
| 3 | second lens | 463.303 | aspherical | 0.360 | resin | 1.544 | 55.9 | −4.83 |
| 4 | | 2.612 | aspherical | 0.344 | | | | |
| 5 | third lens | 1.294 | aspherical | 0.394 | resin | 1.671 | 19.2 | 13.85 |
| 6 | | 1.319 | aspherical | 0.360 | | | | |
| 7 | aperture stop | | plane | 0.000 | | | | |
| 8 | fourth lens | 3.705 | aspherical | 0.488 | resin | 1.544 | 55.9 | 2.08 |
| 9 | | −1.552 | aspherical | 0.420 | | | | |
| 10 | fifth lens | −2.968 | aspherical | 0.480 | resin | 1.544 | 55.9 | 3.78 |
| 11 | | −1.285 | aspherical | 0.227 | | | | |
| 12 | sixth lens | −0.617 | aspherical | 0.340 | resin | 1.680 | 18.4 | −2.99 |
| 13 | | −1.083 | aspherical | 0.142 | | | | |
| 14 | seventh lens | 1.638 | aspherical | 0.600 | resin | 1.544 | 55.9 | 2.13 |
| 15 | | −3.434 | aspherical | 0.087 | | | | |
| 16 | eighth lens | −3.828 | aspherical | 0.400 | resin | 1.544 | 55.9 | −2.55 |
| 17 | | 2.252 | aspherical | 0.500 | | | | |
| 18 | IR cutoff filter | | plane | 0.210 | glass | 1.517 | 64.2 | |
| 19 | | | plane | 0.713 | | | | |
| 20 | imaging surface | | plane | — | | | | |

TABLE 8

| ASP coefficient | s1 | s2 | s3 | s4 | s5 |
|---|---|---|---|---|---|
| K | −4.8715E+00 | −1.5968E−01 | 5.8950E+01 | −7.1466E−01 | −2.6253E+00 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 |
| AR4 | −2.5332E−04 | −1.5149E−03 | 3.0077E−02 | −1.1768E−01 | −8.9112E−03 |
| AR5 | 0.0000E+00 | 0.0000E+00 | 0.0000E+00 | 0.0000E+00 | 0.0000E+00 |
| AR6 | −1.1212E−04 | 1.1947E−03 | −1.3210E−02 | 9.6131E−02 | 9.8798E−02 |
| AR7 | 0.0000E+00 | 0.0000E+00 | 0.0000E+00 | 0.0000E+00 | 0.0000E+00 |
| AR8 | 3.9273E−06 | −1.0641E−04 | 2.7425E−03 | −3.7319E−02 | 8.1497E−02 |
| AR9 | 0.0000E+00 | 0.0000E+00 | 0.0000E+00 | 0.0000E+00 | 0.0000E+00 |

TABLE 8-continued

| | | | | | |
|---|---|---|---|---|---|
| AR10 | 5.3014E−07 | 5.7829E−06 | −9.9463E−04 | −3.8667E−03 | −4.5692E−02 |
| AR11 | 0.0000E+00 | 0.0000E+00 | 0.0000E+00 | 0.0000E+00 | 0.0000E+00 |
| AR12 | 0.0000E+00 | 0.0000E+00 | 9.7572E−05 | 3.0533E−03 | −9.4097E−02 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s6 | s8 | s9 | s10 | s11 |
|---|---|---|---|---|---|
| K | 2.2505E+00 | −1.0827E+02 | −9.1973E−01 | 0.0000E+00 | −4.3274E−02 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | −2.3778E−02 | 1.4429E−02 | −1.7523E−01 | −2.0556E−01 |
| AR4 | −5.1322E−02 | 3.6933E−01 | −3.5512E−01 | 1.5818E+00 | 1.9662E+00 |
| AR5 | 0.0000E+00 | −4.1655E−01 | 1.1042E+00 | −9.8695E+00 | −1.0051E+01 |
| AR6 | −2.0072E−01 | −3.2006E+00 | −4.0855E+00 | 3.2305E+01 | 2.9456E+01 |
| AR7 | 0.0000E+00 | 1.3936E+01 | 9.5118E+00 | −6.1654E+01 | 4.6494E+01 |
| AR8 | 1.7061E+00 | −2.7399E+01 | −1.5062E+01 | 6.8156E+01 | 3.7780E+01 |
| AR9 | 0.0000E+00 | 2.7146E+01 | 1.4201E+01 | −4.0351E+01 | −1.4242E+01 |
| AR10 | −3.8567E+00 | −1.1511E+01 | −6.3548E+00 | 9.8896E+00 | 1.7330E+00 |
| AR11 | 0.0000E+00 | 0.0000E+00 | 0.0000E+00 | 0.0000E+00 | 0.0000E+00 |
| AR12 | 2.4405E+00 | 0.0000E+00 | 0.0000E+00 | 0.0000E+00 | 0.0000E+00 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s12 | s13 | s14 | s15 | s16 | s17 |
|---|---|---|---|---|---|---|
| K | −9.5434E−01 | −6.6023E−01 | −1.3050E+00 | 0.0000E+00 | 0.0000E+00 | −7.4974E−01 |
| AR1 | 0.0000E+00 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 | 0.0000E+00 |
| AR4 | 1.2321E+00 | 5.0127E−01 | −2.8998E−01 | 2.2517E−03 | 8.6727E−03 | −9.5179E−02 |
| AR5 | 0.0000E+00 | 0.0000E+00 | 0.0000E+00 | 0.0000E+00 | 0.0000E+00 | 0.0000E+00 |
| AR6 | −1.3000E+00 | −3.7804E−01 | 1.3832E−01 | 3.0007E−03 | 3.3038E−04 | 2.2837E−02 |
| AR7 | 0.0000E+00 | 0.0000E+00 | 0.0000E+00 | 0.0000E+00 | 0.0000E+00 | 0.0000E+00 |
| AR8 | 7.8729E−02 | 1.2969E−01 | −6.3402E−02 | −1.0344E−05 | 2.7743E−04 | −4.8845E−03 |
| AR9 | 0.0000E+00 | 0.0000E+00 | 0.0000E+00 | 0.0000E+00 | 0.0000E+00 | 0.0000E+00 |
| AR10 | 6.5818E−01 | −1.1787E−02 | 1.8981E−02 | −2.8207E−05 | 6.6040E−05 | 6.3515E−04 |
| AR11 | 0.0000E+00 | 0.0000E+00 | 0.0000E+00 | 0.0000E+00 | 0.0000E+00 | 0.0000E+00 |
| AR12 | −4.6629E−01 | 4.3976E−03 | −2.9183E−03 | 3.5253E−06 | 5.8203E−06 | −4.6375E−05 |
| AR13 | 0.0000E+00 | 0.0000E+00 | 0.0000E+00 | 0.0000E+00 | 0.0000E+00 | 0.0000E+00 |
| AR14 | 1.1263E−01 | −2.1682E−03 | 2.5649E−04 | 1.0943E−05 | −3.5394E−06 | 1.8285E−06 |

TABLE 9

| | | | |
|---|---|---|---|
| f | 2.42 | (|R13| + |R16|)/(CT7 + T78 + CT8) | 3.581 |
| HFOV | 75.0 | |R14/R15| | 0.897 |
| |f1/f2| | 2.416 | TL/f | 2.941 |
| |f12/f3| | 0.235 | |sag11/sag31| | 0.439 |
| T67/T34 | 0.395 | |DST1.0/FOV| | 0.429 |
| TL/ImgH | 2.208 | |DST1.0/DST0.7| | 7.363 |
| (R7 + R8)/(R7 − R8) | 0.409 | f/(CT7 + T78 + CT8) | 2.229 |
| T12/T23 | 1.923 | CT7/CT8 | 1.500 |
| T23/T34 | 0.954 | |f/f12| + |f/f3| | 0.919 |
| tan(HFOV) | 3.721 | f12/f6 | 1.089 |
| Fno | 2.80 | SD/TD | 0.558 |
| Y11/Y82 | 1.051 | Yc82/f | 0.616 |
| V6/V7 | 0.329 | CT1/CT8 | 1.000 |
| (f/f4) − (f/f5) | 0.525 | |f5/f12| | 1.162 |
| T67/CT7 | 0.237 | (T12 + T23 + T67 + T78)/(T34 + T45 + T56) | 1.225 |
| T78/CT8 | 0.216 | Nmax | 1.680 |

Relationships between each numerical value in Table 9 and the respective conditional formula of the present disclosure are as follow.

In Table 9, |f1/f2|=2.416, and it satisfies |f1/f2|<6.

In Table 9, |f12/f3|=0.235, and it satisfies |f12/f3|<0.5.

In Table 9, T67/T34=0.395, and it satisfies 0<T67/T34<1.0.

In Table 9, TL/ImgH=2.208, and it satisfies TL/ImgH<3.

In Table 9, (R7+R8)/(R7−R8)=0.409, and it satisfies 0<(R7+R8)/(R7−R8)<1.0.

In Table 9, T12/T23=1.923, and it satisfies 0<T12/T23<3.0.

In Table 9, T23/T34=0.954, and it satisfies 0<T23/T34<2.0.

In Table 9, tan(HFOV)=3.721, and it satisfies 2.0<tan(HFOV).

In Table 9, Fno=2.80, and it satisfies 1.4<Fno<3.0.

In Table 9, Y11/Y82=1.051, and it satisfies 0.8<Y11/Y82<1.5.

In Table 9, V6/V7=0.329, and it satisfies 0<V6/V7<0.50.

In Table 9, (f/f4)−(f/f5)=0.525, and it satisfies 0<(f/f4)−(f/f5)<2.0.

In Table 9, T67/CT7=0.237, and it satisfies T67/CT7<0.50.

In Table 9, T78/CT8=0.216, and it satisfies T78/CT8<0.70.

In Table 9, (|R13|+|R16|)/(CT7+T78+CT8)=3.581, and it satisfies 2.0<(|R13|+|R16|)/(CT7+T78+CT8)<4.5.

In Table 9, |R14/R15|=0.897, and it satisfies 0.6<|R14/R15|<1.3.

In Table 9, TL/f=2.941, and it satisfies 2.0<TL/f<4.0.

In Table 9, |Sag11/Sag31|=0.439, and it satisfies |Sag11/Sag31|<5.0.

In Table 9, |DST1.0/FOV|=0.429, and it satisfies |DST1.0/FOV|<0.5.

In Table 9, |DST1.0/DST0.7|=7.363, and it satisfies |DST1.0/DST0.7|<10.

In Table 9, f/(CT7+T78+CT8)=2.229, and it satisfies 0.3<f/(CT7+T78+CT8)<3.5.

In Table 9, CT7/CT8=1.500, and it satisfies 1.0<CT7/CT8<2.0.

In Table 9, |f/f12|+|f/f3|=0.919, and it satisfies 0.3<|f/f12|+|f/f3|<1.5.

In Table 9, f12/f6=1.089, and it satisfies 0.5<f12/f6<1.5.

In Table 9, SD/TD=0.558, and it satisfies 0.45<SD/TD<0.65.

In Table 9, Yc82/f=0.616, and it satisfies 0.45<Yc82/f<0.75.

In Table 9, CT1/CT8=1.000, and it satisfies 0.5<CT1/CT8<1.5.

In Table 9, |f5/f12|=1.162, and it satisfies 0.8<|f5/f12|<2.5.

In Table 9, (T12+T23+T67+T78)/(T34+T45+T56)=1.225, and it satisfies (T12+T23+T67+T78)/(T34+T45+T56)<1.5.

In Table 9, Nmax=1.680, and it satisfies 1.60<Nmax<1.72.

Based on the above, it can be confirmed that each numerical value in Table 9 with respect to the optical system 30 of Example 3 satisfies the respective conditional formula of the present disclosure.

Example 4

Figure 13:
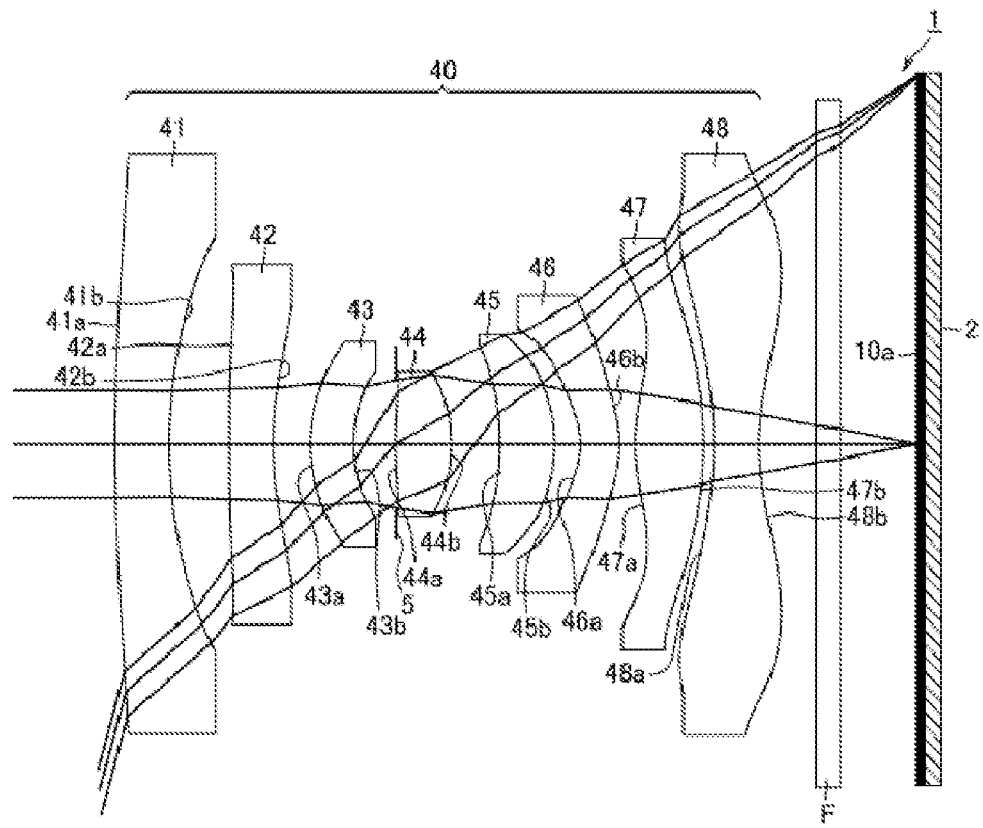
FIG. 13 is a schematic diagram illustrating an imaging optical device in Example 4 of the present disclosure.
Figure 14:
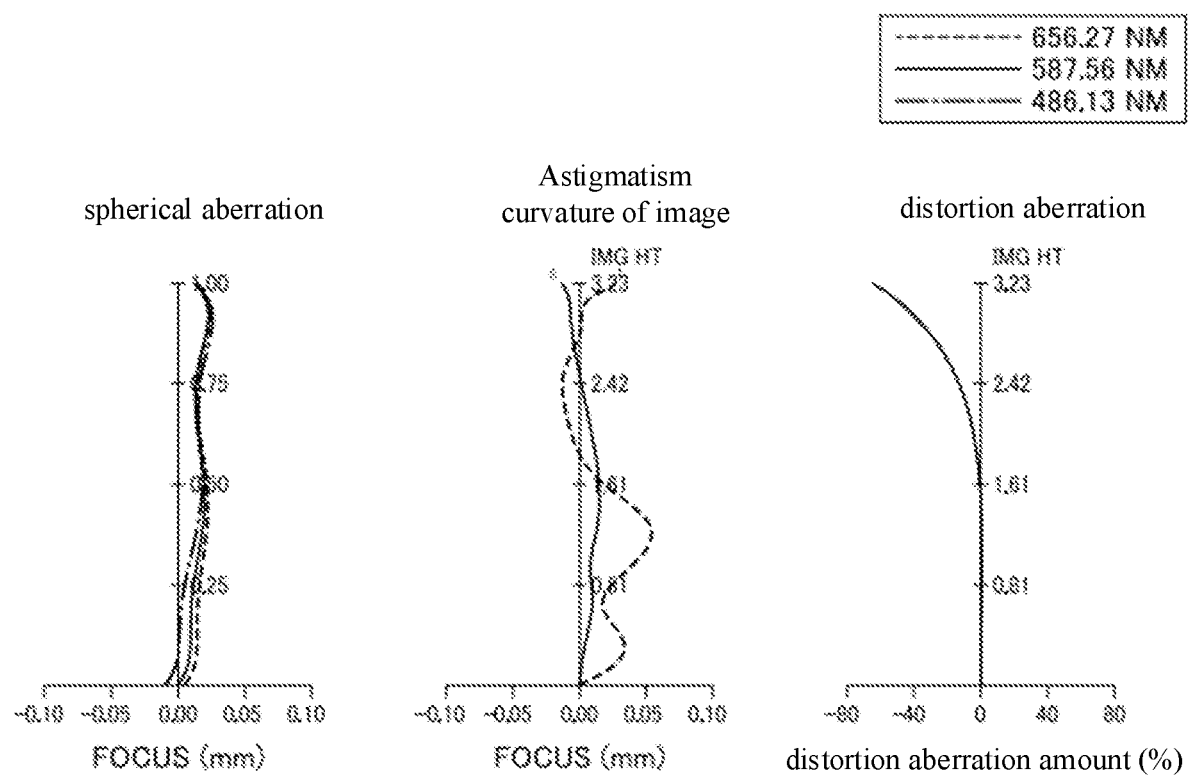
FIG. 14 is a schematic diagram illustrating spherical aberration, astigmatism, and distortion aberration of the imaging optical device in Example 4 of the present disclosure.

FIG. 13 is a schematic diagram illustrating an imaging optical device 1 in Example 4 of the present disclosure. FIG. 14 is a schematic diagram illustrating spherical aberration, astigmatism, and distortion (distortion aberration) of an optical system 40 of Example 4 in order from left to right.

The optical system 40 of Example 4 is described as follows.

The first lens 41 has a negative refractive power and is made of a plastic material. In the first lens 41, an object-side surface 41a is a convex surface, and an image-side surface 41b is a concave surface. Both the object-side surface 41a and the image-side surface 41b of the first lens 41 are aspherical surfaces.

The second lens 42 has a negative refractive power and is made of a plastic material. In the second lens 42, an object-side surface 42a is a convex surface, and an image-side surface 42b is a concave surface. Both the object-side surface 42a and the image-side surface 42b of the second lens 42 are aspherical surfaces.

The third lens 43 has a positive refractive power and is made of a plastic material. In the third lens 43, an object-side surface 43a is a convex surface, and an image-side surface 43b is a concave surface. Both the object-side surface 43a and the image-side surface 43b of the third lens 43 are aspherical surfaces.

The fourth lens 44 has a positive refractive power and is made of a plastic material. In the fourth lens 44, an object-side surface 44a is a convex surface, and an image-side surface 44b is a convex surface. Both the object-side surface 44a and the image-side surface 44b of the fourth lens 44 are aspherical surfaces.

The fifth lens 45 has a positive refractive power and is made of a plastic material. In the fifth lens 45, an object-side surface 45a is a concave surface, and an image-side surface 45b is a convex surface. Both the object-side surface 45a and the image-side surface 45b of the fifth lens 45 are aspherical surfaces.

The sixth lens 46 has a negative refractive power and is made of a plastic material. In the sixth lens 46, an object-side surface 46a is a concave surface, and an image-side surface 46b is a convex surface. Both the object-side surface 46a and the image-side surface 46b of the sixth lens 46 are aspherical surfaces.

The seventh lens 47 has a positive refractive power and is made of a plastic material. In the seventh lens 47, an object-side surface 47a is a convex surface, and an image-side surface 47b is a convex surface. Both the object-side surface 47a and the image-side surface 47b of the seventh lens 47 are aspherical surfaces.

The eighth lens 48 has a negative refractive power and is made of a plastic material. In the eighth lens 48, an object-side surface 48a is a concave surface, and an image-side surface 48b is a concave surface. Both the object-side surface 48a and the image-side surface 48b of the eighth lens 48 are aspherical surfaces.

An aspherical formula of the first lens 41 to the eighth lens 48 included in the optical system 40 of Example 4 is the same as the aspherical formula (1) in Example 1. In addition, in calculation of values in tables of Example 4, terms of the $15^{th}$ order or higher (n≥15) of the formula (1) are taken as 0.

In addition, Table 10 lists actual numerical values for the structure of each lens. Table 11 lists actual numerical values of aspheric coefficients of each lens. Table 12 lists actual numerical values of conditional formulas of the present disclosure.

TABLE 10

| f = 2.41 mm, Fno = 2.6, HFOV = 75.0°, reference wavelength: 587.56 nm | | | | | | | |
|---|---|---|---|---|---|---|---|
| surface number | name | radius of curvature | surface definition | thickness/ space | material | refractive index | dispersion value | focal length |
| 0 | object surface | | plane | Infinity | | | | |
| 1 | first lens | 19.303 | aspherical | 0.479 | resin | 1.544 | 55.9 | −11.45 |
| 2 | | 4.668 | aspherical | 0.527 | | | | |
| 3 | second lens | 80.687 | aspherical | 0.379 | resin | 1.544 | 55.9 | −4.95 |
| 4 | | 2.603 | aspherical | 0.330 | | | | |
| 5 | third lens | 1.333 | aspherical | 0.380 | resin | 1.661 | 20.4 | 18.44 |
| 6 | | 1.327 | aspherical | 0.365 | | | | |
| 7 | aperture stop | | plane | 0.000 | | | | |
| 8 | fourth lens | 3.603 | aspherical | 0.491 | resin | 1.544 | 55.9 | 1.98 |
| 9 | | −1.464 | aspherical | 0.427 | | | | |
| 10 | fifth lens | −2.842 | aspherical | 0.480 | resin | 1.544 | 55.9 | 4.22 |

TABLE 10-continued f = 2.41 mm, Fno = 2.6, HFOV = 75.0 °, reference wavelength: 587.56 nm

| surface number | name | radius of curvature | surface definition | thickness/ space | material | refractive index | dispersion value | focal length |
|---|---|---|---|---|---|---|---|---|
| 11 | | −1.346 | aspherical | 0.230 | | | | |
| 12 | sixth lens | −0.624 | aspherical | 0.340 | resin | 1.680 | 18.4 | −3.08 |
| 13 | | −1.084 | aspherical | 0.138 | | | | |
| 14 | seventh lens | 1.607 | aspherical | 0.600 | resin | 1.544 | 55.9 | 2.11 |
| 15 | | −3.510 | aspherical | 0.087 | | | | |
| 16 | eighth lens | −3.798 | aspherical | 0.400 | resin | 1.544 | 55.9 | −2.57 |
| 17 | | 2.300 | aspherical | 0.500 | | | | |
| 18 | IR cutoff filter | | plane | 0.210 | glass | 1.517 | 64.2 | |
| 19 | | | plane | 0.677 | | | | |
| 20 | imaging surface | | plane | — | | | | |

TABLE 11

| ASP coefficient | s1 | s2 | s3 | s4 | s5 |
|---|---|---|---|---|---|
| K | 0.0000E+00 | 1.4431E−01 | 5.8950E+01 | −7.3276E−01 | −2.7809E+00 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 |
| AR4 | −7.3583E−04 | −1.2901E−03 | 2.8520E−02 | −1.1764E−01 | −1.1601E−02 |
| AR5 | 0.0000E+00 | 0.0000E+00 | 0.0000E+00 | 0.0000E+00 | 0.0000E+00 |
| AR6 | −1.6394E−04 | 1.5966E−03 | −1.3144E−02 | 9.4560E−02 | 1.0868E−01 |
| AR7 | 0.0000E+00 | 0.0000E+00 | 0.0000E+00 | 0.0000E+00 | 0.0000E+00 |
| AR8 | 5.2855E−06 | −1.6796E−04 | 2.7025E−03 | −3.7555E−02 | 7.7205E−02 |
| AR9 | 0.0000E+00 | 0.0000E+00 | 0.0000E+00 | 0.0000E+00 | 0.0000E+00 |
| AR10 | 1.3705E−06 | 1.5242E−05 | −1.0228E−03 | −3.7074E−03 | −5.8557E−02 |
| AR11 | 0.0000E+00 | 0.0000E+00 | 0.0000E+00 | 0.0000E+00 | 0.0000E+00 |
| AR12 | 0.0000E+00 | 0.0000E+00 | 1.1512E−04 | 3.2118E−03 | −8.7740E−02 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s6 | s8 | s9 | s10 | s11 |
|---|---|---|---|---|---|
| K | 2.2505E+00 | −1.0827E+02 | −9.1973E−01 | 0.0000E+00 | −4.3274E−02 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | −2.2576E−02 | 1.4636E−02 | −1.7186E−01 | −2.0556E−01 |
| AR4 | −5.1322E−02 | 3.5751E−01 | −3.5833E−01 | 1.5974E+00 | 1.9662E+00 |
| AR5 | 0.0000E+00 | −4.3356E−01 | 1.0978E+00 | −9.8529E+01 | −1.0051E+01 |
| AR6 | −2.0072E−01 | −3.2114E+00 | −4.0897E+00 | 3.2319E+01 | 2.9456E+01 |
| AR7 | 0.0000E+00 | 1.3942E+01 | 9.5171E+00 | −6.1645E+01 | 4.6494E+01 |
| AR8 | 1.7061E+00 | −2.7381E+01 | −1.5046E+01 | 6.8160E+01 | 3.7780E+01 |
| AR9 | 0.0000E+00 | 2.7105E+01 | 1.4200E+01 | −4.0348E+01 | −1.4242E+01 |
| AR10 | −3.8567E+00 | −1.1865E+01 | −6.4774E+00 | 9.9043E+00 | 1.7330E+00 |
| AR11 | 0.0000E+00 | 0.0000E+00 | 0.0000E+00 | 0.0000E+00 | 0.0000E+00 |
| AR12 | 2.4405E+00 | 0.0000E+00 | 0.0000E+00 | 0.0000E+00 | 0.0000E+00 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s12 | s13 | s14 | s15 | s16 | s17 |
|---|---|---|---|---|---|---|
| K | −9.5344E−01 | −6.6023E−01 | −1.3050E+00 | 0.0000E+00 | 0.0000E+00 | −7.3826E−01 |
| AR1 | 0.0000E+00 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 | 0.0000E+00 |
| AR4 | 1.2286E+00 | 5.0275E−01 | −2.9098E−01 | 2.1488E−03 | 1.0145E−02 | −9.3749E−02 |
| AR5 | 0.0000E+00 | 0.0000E+00 | 0.0000E+00 | 0.0000E+00 | 0.0000E+00 | 0.0000E+00 |
| AR6 | −1.3011E+00 | −3.7689E−01 | 1.3839E−01 | 2.9876E−03 | 1.8284E−04 | 2.2676E−02 |
| AR7 | 0.0000E+00 | 0.0000E+00 | 0.0000E+00 | 0.0000E+00 | 0.0000E+00 | 0.0000E+00 |
| AR8 | 7.4177E−02 | 1.3012E−01 | −6.3333E−02 | −1.6703E−05 | 2.6069E−04 | −4.8989E−03 |
| AR9 | 0.0000E+00 | 0.0000E+00 | 0.0000E+00 | 0.0000E+00 | 0.0000E+00 | 0.0000E+00 |
| AR10 | 6.4980E−01 | −1.1659E−02 | 1.8970E−02 | −2.9544E−05 | 6.6283E−05 | 6.3736E−04 |
| AR11 | 0.0000E+00 | 0.0000E+00 | 0.0000E+00 | 0.0000E+00 | 0.0000E+00 | 0.0000E+00 |
| AR12 | −4.7521E−01 | 4.3976E−03 | −2.9203E−03 | 3.5753E−06 | 6.3109E−06 | −4.6061E−05 |

TABLE 11-continued

| AR13 | 0.0000E+00 | 0.0000E+00 | 0.0000E+00 | 0.0000E+00 | 0.0000E+00 | 0.0000E+00 |
|------|------------|------------|------------|------------|------------|------------|
| AR14 | 1.0908E−01 | −2.1682E−03 | 2.6270E−04 | 1.1131E−05 | −3.5879E−06 | 1.7983E−06 |

TABLE 12

| f | 2.41 | (|R13| + |R16|)/(CT7 + T78 + CT8) | 3.593 |
|---|------|-------------------------------------|-------|
| HFOV | 75.0 | |R14/R15| | 0.924 |
| |f1/f2| | 2.312 | TL/f | 2.927 |
| |f12/f3| | 0.180 | |sag11/sag31| | 0.400 |
| T67/T34 | 0.379 | |DST1.0/FOV| | 0.428 |
| TL/ImagH | 2.181 | |DST1.0/DST0.7| | 7.403 |
| (R7 + R8)/(R7 − R8) | 0.422 | f/(CT7 + T78 + CT8) | 2.212 |
| T12/T23 | 1.596 | CT7/CT8 | 1.500 |
| T23/T34 | 0.904 | |f/f12| + |f/f3| | 0.855 |
| tan(HFOV) | 3.738 | f12/f6 | 1.079 |
| Fno | 2.56 | SD/TD | 0.565 |
| Y11/Y82 | 0.999 | Yc82/f | 0.617 |
| V6/V7 | 0.329 | CT1/CT8 | 1.196 |
| (f/f4) − (f/f5) | 0.645 | |f5/f12| | 1.272 |
| T67/CT7 | 0.231 | (T12 + T23 + T67 + T78)/(T34 + T45 + T56) | 1.059 |
| T78/CT8 | 0.218 | Nmax | 1.680 |

Relationships between each numerical value in Table 12 and the respective conditional formula of the present disclosure are as follow.

In Table 12, |f1/f2|=2.312, and it satisfies |f1/f2|<6.

In Table 12, |f12/f3|=0.180, and it satisfies |f12/f3|<0.5.

In Table 12, T67/T34=0.379, and it satisfies 0<T67/T34<1.0.

In Table 12, TL/ImgH=2.181, and it satisfies TL/ImgH<3.

In Table 12, (R7+R8)/(R7−R8)=0.422, and it satisfies 0<(R7+R8)/(R7−R8)<1.0.

In Table 12, T12/T23=1.596, and it satisfies 0<T12/T23<3.0.

In Table 12, T23/T34=0.904, and it satisfies 0<T23/T34<2.0.

In Table 12, tan(HFOV)=3.738, and it satisfies 2.0<tan(HFOV).

In Table 12, Fno=2.56, and it satisfies 1.4<Fno<3.0.

In Table 12, Y11/Y82=0.999, and it satisfies 0.8<Y11/Y82<1.5.

In Table 12, V6/V7=0.329, and it satisfies 0<V6/V7<0.50.

In Table 12, (f/f4)−(f/f5)=0.645, and it satisfies 0<(f/f4)−(f/f5)<2.0.

In Table 12, T67/CT7=0.231, and it satisfies T67/CT7<0.50.

In Table 12, T78/CT8=0.218, and it satisfies T78/CT8<0.70.

In Table 12, (|R13|+|R16|)/(CT7+T78+CT8)=3.593, and it satisfies 2.0<(|R13|+|R16|)/(CT7+T78+CT8)<4.5.

In Table 12, |R14/R15|=0.924, and it satisfies 0.6<|R14/R15|<1.3.

In Table 12, TL/f=2.927, and it satisfies 2.0<TL/f<4.0.

In Table 12, |Sag11/Sag31|=0.400, and it satisfies |Sag11/Sag31|<5.0.

In Table 12, |DST1.0/FOV|=0.428, and it satisfies |DST1.0/FOV+1<0.5.

In Table 12, |DST1.0/DST0.7|=7.403, and it satisfies |DST1.0/DST0.7|<10.

In Table 12, f/(CT7+T78+CT8)=2.212, and it satisfies 0.3<f/(CT7+T78+CT8)<3.5.

In Table 12, CT7/CT8=1.500, and it satisfies 1.0<CT7/CT8<2.0.

In Table 12, |f/f12|+|f/f3|=0.855, and it satisfies 0.3<|f/f12|+|f/f3|<1.5.

In Table 12, f12/f6=1.079, and it satisfies 0.5<f12/f6<1.5.

In Table 12, SD/TD=0.565, and it satisfies 0.45<SD/TD<0.65.

In Table 12, Yc82/f=0.617, and it satisfies 0.45<Yc82/f<0.75.

In Table 12, CT1/CT8=1.196, and it satisfies 0.5<CT1/CT8<1.5.

In Table 12, |f5/f12|=1.272, and it satisfies 0.8<|f5/f12|<2.5.

In Table 12, (T12+T23+T67+T78)/(T34+T45+T56)=1.059, and it satisfies (T12+T23+T67+T78)/(T34+T45+T56)<1.5.

In Table 12, Nmax=1.680, and it satisfies 1.60<Nmax<1.72.

Based on the above, it can be confirmed that each numerical value in Table 12 with respect to the optical system 40 of Example 4 satisfies the respective conditional formula of the present disclosure.

Example 5

Figure 15:
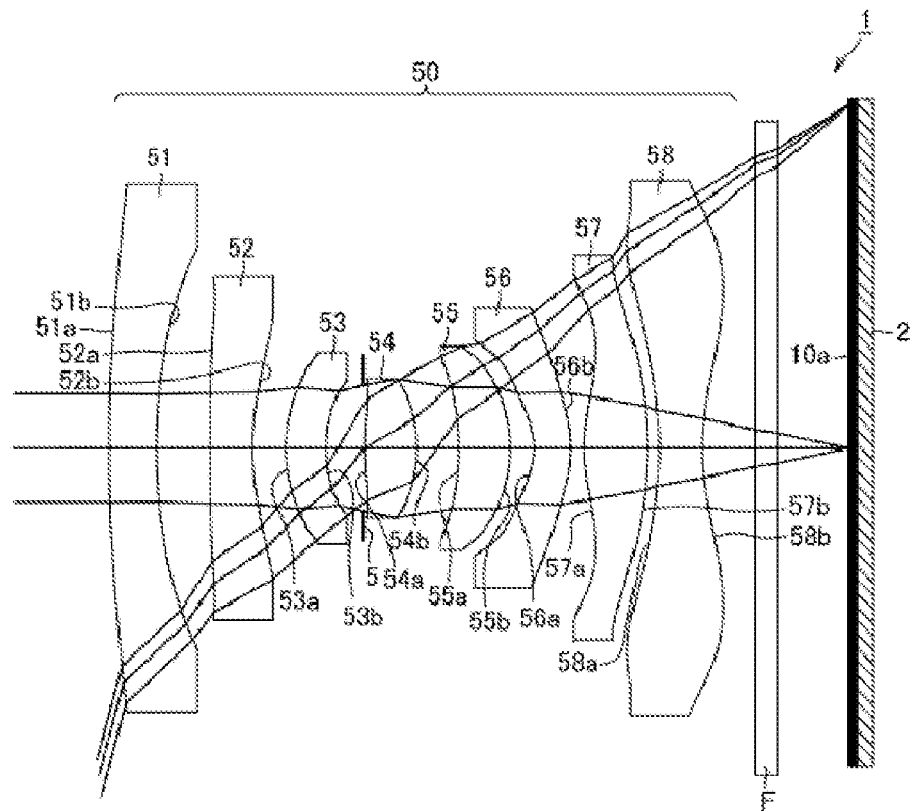
FIG. 15 is a schematic diagram illustrating an imaging optical device in Example 5 of the present disclosure.
Figure 16:
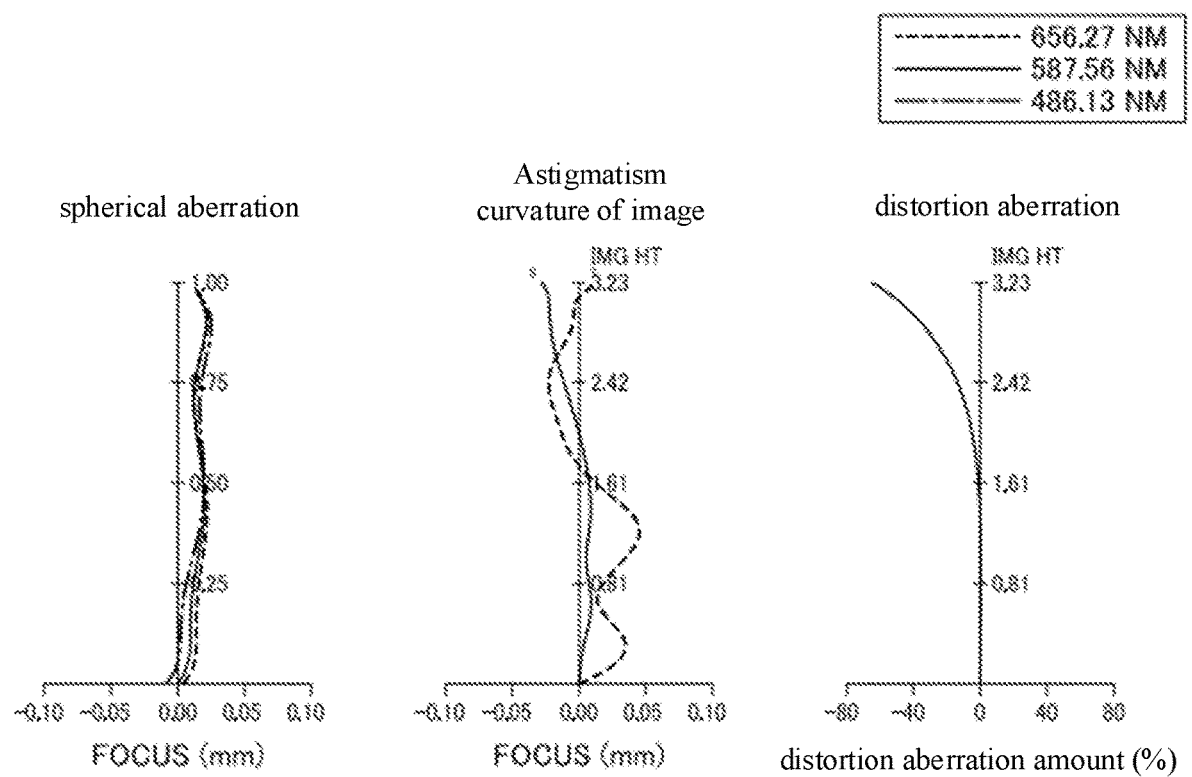
FIG. 16 is a schematic diagram illustrating spherical aberration, astigmatism, and distortion aberration of the imaging optical device in Example 5 of the present disclosure.

FIG. 15 is a schematic diagram illustrating an imaging optical device 1 in Example 5 of the present disclosure. FIG. 16 is a schematic diagram illustrating spherical aberration, astigmatism, and distortion (distortion aberration) of an optical system 50 of Example 5 in order from left to right.

The optical system 50 of Example 5 is described as follows.

The first lens 51 has a negative refractive power and is made of a plastic material. In the first lens 51, an object-side surface 51a is a convex surface, and an image-side surface 51b is a concave surface. Both the object-side surface 51a and the image-side surface 51b of the first lens 51 are aspherical surfaces.

The second lens 52 has a negative refractive power and is made of a plastic material. In the second lens 52, an object-side surface 52a is a convex surface, and an image-side surface 52b is a concave surface. Both the object-side surface 52a and the image-side surface 52b of the second lens 52 are aspherical surfaces.

The third lens 53 has a positive refractive power and is made of a plastic material. In the third lens 53, an object-side surface 53a is a convex surface, and an image-side surface 53b is a concave surface. Both the object-side surface 53a and the image-side surface 53b of the third lens 53 are aspherical surfaces.

The fourth lens 54 has a positive refractive power and is made of a plastic material. In the fourth lens 54, an object-side surface 54a is a convex surface, and an image-side surface 54b is a convex surface. Both the object-side surface 54a and the image-side surface 54b of the fourth lens 54 are aspherical surfaces.

The fifth lens 55 has a positive refractive power and is made of a plastic material. In the fifth lens 55, an object-side surface 55a is a concave surface, and an image-side surface 55b is a convex surface. Both the object-side surface 55a and the image-side surface 55b of the fifth lens 55 are aspherical surfaces.

The sixth lens 56 has a negative refractive power and is made of a plastic material. In the sixth lens 56, an object-side surface 56a is a concave surface, and an image-side surface 56b is a convex surface. Both the object-side surface 56a and the image-side surface 56b of the sixth lens 56 are aspherical surfaces.

The seventh lens 57 has a positive refractive power and is made of a plastic material. In the seventh lens 57, an object-side surface 57a is a convex surface, and an image-side surface 57b is a convex surface. Both the object-side surface 57a and the image-side surface 57b of the seventh lens 57 are aspherical surfaces.

The eighth lens 58 has a negative refractive power and is made of a plastic material. In the eighth lens 58, an object-side surface 58a is a concave surface, and an image-side surface 58b is a concave surface. Both the object-side surface 58a and the image-side surface 58b of the eighth lens 58 are aspherical surfaces.

An aspherical formula of the first lens 51 to the eighth lens 58 included in the optical system 50 of Example 5 is the same as the aspherical formula (1) in Example 1. In addition, in calculation of values in tables of Example 5, terms of the $15^{th}$ order or higher ($n \geq 15$) of the formula (1) are taken as 0.

In addition, Table 13 lists actual numerical values for the structure of each lens. Table 14 lists actual numerical values of aspheric coefficients of each lens. Table 15 lists actual numerical values of conditional formulas of the present disclosure.

TABLE 13

| | | | | | | | | |
|---|---|---|---|---|---|---|---|---|
| f = 2.42 mm, Fno = 2.4, HFOV = 75.1°, reference wavelength: 587.56 nm | | | | | | | | |
| surface number | name | radius of curvature | surface definition | thickness/ space | material | refractive index | dispersion value | focal length |
| 0 | object surface | plane | | Infinity | | | | |
| 1 | first lens | 15.434 | aspherical | 0.450 | resin | 1.544 | 55.9 | −15.52 |
| 2 | | 5.402 | aspherical | 0.500 | | | | |
| 3 | second lens | 160.525 | aspherical | 0.400 | resin | 1.544 | 55.9 | −4.51 |
| 4 | | 2.416 | aspherical | 0.312 | | | | |
| 5 | third lens | 1.337 | aspherical | 0.380 | resin | 1.661 | 20.4 | 18.73 |
| 6 | | 1.329 | aspherical | 0.360 | | | | |
| 7 | aperture stop | plane | | 0.000 | | | | |
| 8 | fourth lens | 3.748 | aspherical | 0.490 | resin | 1.544 | 55.9 | 2.00 |
| 9 | | −1.458 | aspherical | 0.401 | | | | |
| 10 | fifth lens | −2.794 | aspherical | 0.480 | resin | 1.544 | 55.9 | 4.13 |
| 11 | | −1.321 | aspherical | 0.224 | | | | |
| 12 | sixth lens | −0.625 | aspherical | 0.348 | resin | 1.680 | 18.4 | −3.10 |
| 13 | | −1.089 | aspherical | 0.117 | | | | |
| 14 | seventh lens | 1.603 | aspherical | 0.600 | resin | 1.544 | 55.9 | 2.12 |
| 15 | | −3.568 | aspherical | 0.113 | | | | |
| 16 | eighth lens | −3.785 | aspherical | 0.400 | resin | 1.544 | 55.9 | −2.57 |
| 17 | | 2.300 | aspherical | 0.500 | | | | |
| 18 | IR cutoff filter | plane | | 0.210 | glass | 1.517 | 64.2 | |
| 19 | | plane | | 0.672 | | | | |
| 20 | imaging surface | plane | | | | | | |

TABLE 14

| ASP coefficient | s1 | s2 | s3 | s4 | s5 |
|---|---|---|---|---|---|
| K | 0.0000E+00 | 2.5296E−01 | 5.8950E+01 | −7.0753E−01 | −2.7586E+00 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 |
| AR4 | −5.3149E−04 | −1.1075E−03 | 2.8850E−02 | −1.1740E−01 | −1.3384E−02 |
| AR5 | 0.0000E+00 | 0.0000E+00 | 0.0000E+00 | 0.0000E+00 | 0.0000E+00 |
| AR6 | −1.3773E−04 | 1.4877E−03 | −1.2977E−02 | 9.4224E−02 | 1.0505E−01 |
| AR7 | 0.0000E+00 | 0.0000E+00 | 0.0000E+00 | 0.0000E+00 | 0.0000E+00 |
| AR8 | 6.4766E−06 | −1.8818E−04 | 2.7224E−03 | −3.7816E−02 | 8.3641E−02 |
| AR9 | 0.0000E+00 | 0.0000E+00 | 0.0000E+00 | 0.0000E+00 | 0.0000E+00 |
| AR10 | 6.8484E−07 | 3.5968E−05 | −1.0059E−03 | −3.3789E−03 | −4.8235E−02 |
| AR11 | 0.0000E+00 | 0.0000E+00 | 0.0000E+00 | 0.0000E+00 | 0.0000E+00 |
| AR12 | 0.0000E+00 | 0.0000E+00 | 1.6670E−04 | 3.5051E−03 | −8.6723E−02 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

TABLE 14-continued

| ASP coefficient | s6 | s8 | s9 | s10 | s11 |
|---|---|---|---|---|---|
| K | 2.2505E+00 | −1.0827E+02 | −9.1973E−01 | 0.0000E+00 | −4.3274E−02 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | −2.6358E−02 | 1.4636E−02 | −1.7068E−01 | −2.0556E−01 |
| AR4 | −5.1322E−02 | 3.3843E−01 | −3.5833E−01 | 1.6024E+00 | 1.9662E+00 |
| AR5 | 0.0000E+00 | −4.4783E−01 | 1.0978E+00 | −9.8466E+00 | −1.0051E+01 |
| AR6 | −2.0072E−01 | −3.2003E+00 | −4.0897E+00 | 3.2322E+01 | 2.9456E+01 |
| AR7 | 0.0000E+00 | 1.3991E+01 | 9.5171E+00 | −6.1645E+01 | 4.6494E+01 |
| AR8 | 1.7061E+00 | −2.7310E+01 | −1.5046E+01 | 6.8159E+01 | 3.7780E+01 |
| AR9 | 0.0000E+00 | 2.7103E+01 | 1.4200E+01 | −4.0348E+01 | −1.4242E+01 |
| AR10 | −3.8567E+00 | −1.2216E+01 | −6.4774E+00 | 9.9089E+00 | 1.7330E+00 |
| AR11 | 0.0000E+00 | 0.0000E+00 | 0.0000E+00 | 0.0000E+00 | 0.0000E+00 |
| AR12 | 2.4405E+00 | 0.0000E+00 | 0.0000E+00 | 0.0000E+00 | 0.0000E+00 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s12 | s13 | s14 | s15 | s16 | s17 |
|---|---|---|---|---|---|---|
| K | −9.5202E−01 | −6.6023E−01 | −1.3050E+00 | 0.0000E+00 | 0.0000E+00 | −7.3446E−01 |
| AR1 | 0.0000E+00 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 | 0.0000E+00 |
| AR4 | 1.2277E+00 | 5.0275E−01 | −2.8333E−01 | 2.1488E−03 | 1.0269E−02 | −9.3963E−02 |
| AR5 | 0.0000E+00 | 0.0000E+00 | 0.0000E+00 | 0.0000E+00 | 0.0000E+00 | 0.0000E+00 |
| AR6 | −1.3071E+00 | −3.7689E−01 | 1.3759E−01 | 2.9876E−03 | 1.5464E−04 | 2.2821E−02 |
| AR7 | 0.0000E+00 | 0.0000E+00 | 0.0000E+00 | 0.0000E+00 | 0.0000E+00 | 0.0000E+00 |
| AR8 | 7.5735E−02 | 1.3012E−01 | −6.3476E−02 | −1.6703E−05 | 2.4742E−04 | −4.9090E−03 |
| AR9 | 0.0000E+00 | 0.0000E+00 | 0.0000E+00 | 0.0000E+00 | 0.0000E+00 | 0.0000E+00 |
| AR10 | 6.5496E−01 | −1.1659E−02 | 1.9035E−02 | −2.9544E−05 | 6.2692E−05 | 6.3339E−04 |
| AR11 | 0.0000E+00 | 0.0000E+00 | 0.0000E+00 | 0.0000E+00 | 0.0000E+00 | 0.0000E+00 |
| AR12 | −4.7426E−01 | 4.3976E−03 | −2.9107E−03 | 3.5753E−06 | 5.9336E−06 | −4.6359E−05 |
| AR13 | 0.0000E+00 | 0.0000E+00 | 0.0000E+00 | 0.0000E+00 | 0.0000E+00 | 0.0000E+00 |
| AR14 | 1.0164E−01 | −2.1682E−03 | 2.4268E−04 | 1.1131E−05 | −3.3000E−06 | 1.8869E−06 |

TABLE 15

| f | 2.42 | (|R13| + |R16|)/(CT7 + T78 + CT8) | 3.506 |
|---|---|---|---|
| HFOV | 75.1 | |R14/R15| | 0.943 |
| |f1/f2| | 3.439 | TL/f | 2.872 |
| |f12/f3| | 0.181 | |sag11/sag31| | 0.545 |
| T67/T34 | 0.324 | |DST1.0/FOV| | 0.430 |
| TL/ImagH | 2.156 | |DST1.0/DST0.7| | 6.983 |
| (R7 + R8)/(R7 − R8) | 0.440 | f/(CT7 + T78 + CT8) | 2.175 |
| T12/T23 | 1.604 | CT7/CT8 | 1.500 |
| T23/T34 | 0.866 | |f/f12| + |f/f3| | 0.843 |
| tan(HFOV) | 3.750 | f12/f6 | 1.096 |
| Fno | 2.38 | SD/TD | 0.569 |
| Y11/Y82 | 0.992 | Yc82/f | 0.614 |
| V6/V7 | 0.329 | CT1/CT8 | 1.125 |
| (f/f4) − (f/f5) | 0.628 | |f5/f12| | 1.217 |
| T67/CT7 | 0.195 | (T12 + T23 + T67 + T78)/(T34 + T45 + T56) | 1.057 |
| T78/CT8 | 0.284 | Nmax | 1.680 |

Relationships between each numerical value in Table 15 and the respective conditional formula of the present disclosure are as follow.

In Table 15, |f1/f2|=3.439, and it satisfies |f1/f2|<6.
In Table 15, |f12/f3|=0.181, and it satisfies |f12/f3|<0.5.
In Table 15, T67/T34=0.324, and it satisfies 0<T67/T34<1.0.
In Table 15, TL/ImgH=2.156, and it satisfies TL/ImgH<3.
In Table 15, (R7+R8)/(R7−R8)=0.440, and it satisfies 0<(R7+R8)/(R7−R8)<1.0.
In Table 15, T12/T23=1.604, and it satisfies 0<T12/T23<3.0.
In Table 15, T23/T34=0.866, and it satisfies 0<T23/T34<2.0.
In Table 15, tan(HFOV)=3.750, and it satisfies 2.0<tan(HFOV).

In Table 15, Fno=2.38, and it satisfies 1.4<Fno<3.0.
In Table 15, Y11/Y82=0.992, and it satisfies 0.8<Y11/Y82<1.5.
In Table 15, V6/V7=0.329, and it satisfies 0<V6/V7<0.50.
In Table 15, (f/f4)−(f/f5)=0.628, and it satisfies 0<(f/f4)−(f/f5)<2.0.
In Table 15, T67/CT7=0.195, and it satisfies T67/CT7<0.50.
In Table 15, T78/CT8=0.284, and it satisfies T78/CT8<0.70.
In Table 15, (|R13|+|R16|)/(CT7+T78+CT8)=3.506, and it satisfies 2.0<(|R13|+|R16|)/(CT7+T78+CT8)<4.5.
In Table 15, |R14/R15|=0.943, and it satisfies 0.6<|R14/R15|<1.3.
In Table 15, TL/f=2.872, and it satisfies 2.0<TL/f<4.0.
In Table 15, |Sag11/Sag31|=0.545, and it satisfies |Sag11/Sag31|<5.0.
In Table 15, |DST1.0/FOV|=0.430, and it satisfies |DST1.0/FOV|<0.5.
In Table 15, |DST1.0/DST0.7|=6.983, and it satisfies |DST1.0/DST0.7|<10.
In Table 15, f/(CT7+T78+CT8)=2.175, and it satisfies 0.3<f/(CT7+T78+CT8)<3.5.
In Table 15, CT7/CT8=1.500, and it satisfies 1.0<CT7/CT8<2.0.
In Table 15, |f/f12|+|f/f3|=0.843, and it satisfies 0.3<|f/f12|+|f/f3|<1.5.
In Table 15, f12/f6=1.096, and it satisfies 0.5<f12/f6<1.5.
In Table 15, SD/TD=0.569, and it satisfies 0.45<SD/TD<0.65.
In Table 15, Yc82/f=0.614, and it satisfies 0.45<Yc82/f<0.75.

In Table 15, CT1/CT8=1.125, and it satisfies 0.5<CT1/CT8<1.5.

In Table 15, |f5/f12|=1.217, and it satisfies 0.8<|f5/f12|<2.5.

In Table 15, (T12+T23+T67+T78)/(T34+T45+T56)= 1.057, and it satisfies (T12+T23+T67+T78)/(T34+T45+T56)<1.5.

In Table 15, Nmax=1.680, and it satisfies 1.60<Nmax<1.72.

Based on the above, it can be confirmed that each numerical value in Table 15 with respect to the optical system 50 of Example 5 satisfies the respective conditional formula of the present disclosure.

Example 6

Figure 17:
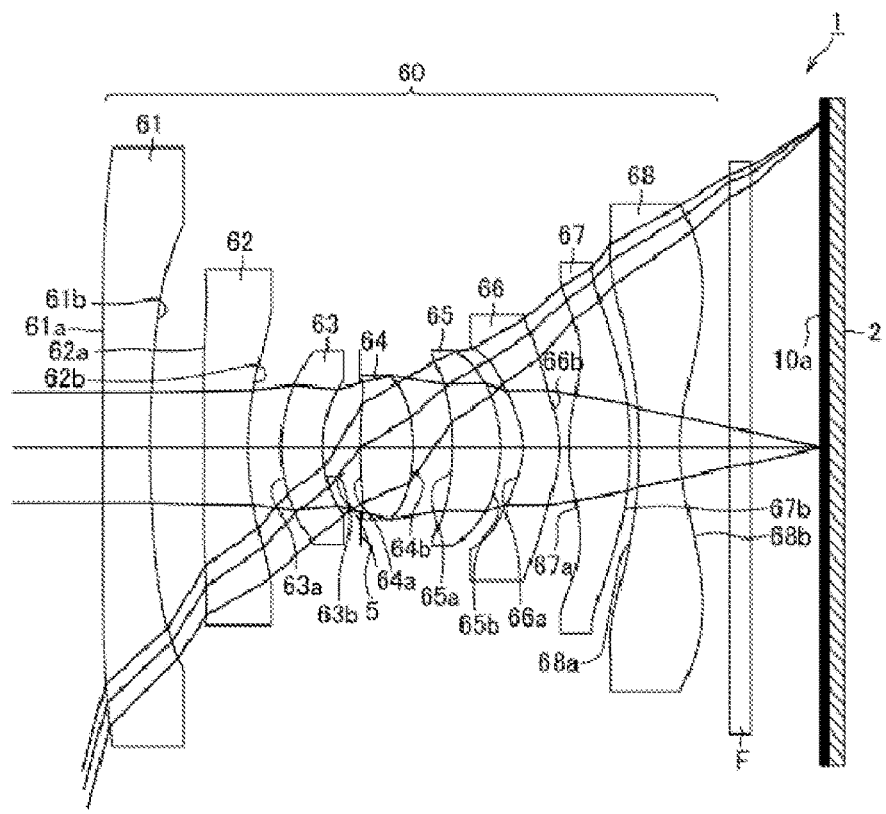
FIG. 17 is a schematic diagram illustrating an imaging optical device in Example 6 of the present disclosure.
Figure 18:
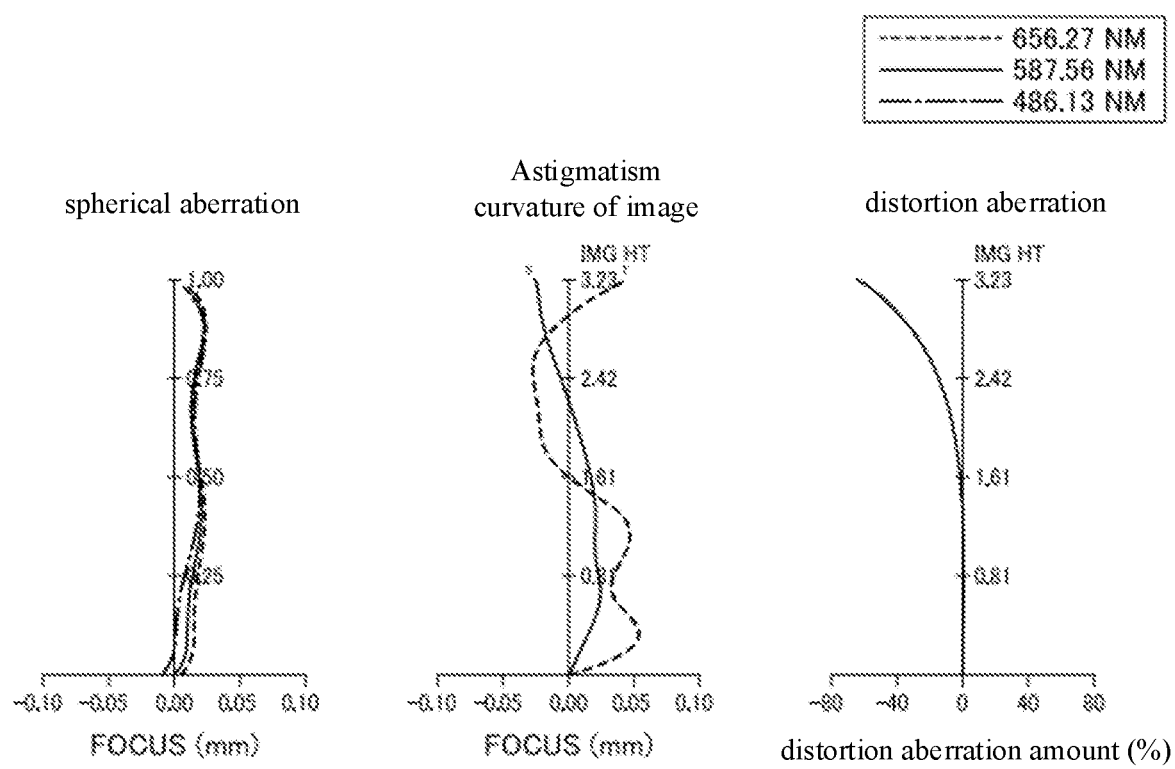
FIG. 18 is a schematic diagram illustrating spherical aberration, astigmatism, and distortion aberration of the imaging optical device in Example 6 of the present disclosure.

FIG. 17 is a schematic diagram illustrating an imaging optical device 1 in Example 6 of the present disclosure. FIG. 18 is a schematic diagram illustrating spherical aberration, astigmatism, and distortion (distortion aberration) of an optical system 60 of Example 6 in order from left to right.

The optical system 60 of Example 6 is described as follows.

The first lens 61 has a negative refractive power and is made of a plastic material. In the first lens 61, an object-side surface 61a is a convex surface, and an image-side surface 61b is a concave surface. Both the object-side surface 61a and the image-side surface 61b of the first lens 61 are aspherical surfaces.

The second lens 62 has a negative refractive power and is made of a plastic material. In the second lens 62, an object-side surface 62a is a concave surface, and an image-side surface 62b is a concave surface. Both the object-side surface 62a and the image-side surface 62b of the second lens 62 are aspherical surfaces.

The third lens 63 has a positive refractive power and is made of a plastic material. In the third lens 63, an object-side surface 63a is a convex surface, and an image-side surface 63b is a concave surface. Both the object-side surface 63a and the image-side surface 63b of the third lens 63 are aspherical surfaces.

The fourth lens 64 has a positive refractive power and is made of a plastic material. In the fourth lens 64, an object-side surface 64a is a convex surface, and an image-side surface 64b is a convex surface. Both the object-side surface 64a and the image-side surface 64b of the fourth lens 64 are aspherical surfaces.

The fifth lens 65 has a positive refractive power and is made of a plastic material. In the fifth lens 65, an object-side surface 65a is a concave surface, and an image-side surface 65b is a convex surface. Both the object-side surface 65a and the image-side surface 65b of the fifth lens 65 are aspherical surfaces.

The sixth lens 66 has a negative refractive power and is made of a plastic material. In the sixth lens 66, an object-side surface 66a is a concave surface, and an image-side surface 66b is a convex surface. Both the object-side surface 66a and the image-side surface 66b of the sixth lens 66 are aspherical surfaces.

The seventh lens 67 has a positive refractive power and is made of a plastic material. In the seventh lens 67, an object-side surface 67a is a convex surface, and an image-side surface 67b is a convex surface. Both the object-side surface 67a and the image-side surface 67b of the seventh lens 67 are aspherical surfaces.

The eighth lens 68 has a negative refractive power and is made of a plastic material. In the eighth lens 68, an object-side surface 68a is a concave surface, and an image-side surface 68b is a concave surface. Both the object-side surface 68a and the image-side surface 68b of the eighth lens 68 are aspherical surfaces.

An aspherical formula of the first lens 61 to the eighth lens 68 included in the optical system 60 of Example 6 is the same as the aspherical formula (1) in Example 1. In addition, in calculation of values in tables of Example 6, terms of the $15^{th}$ order or higher (n≥15) of the formula (1) are taken as 0.

In addition, Table 16 lists actual numerical values for the structure of each lens. Table 17 lists actual numerical values of aspheric coefficients of each lens. Table 18 lists actual numerical values of conditional formulas of the present disclosure.

TABLE 16

| f = 2.42 mm, Fno = 2.2, HFOV = 74.9 ✕ reference wavelength: 587.56 nm | | | | | | | |
|---|---|---|---|---|---|---|---|
| surface number | name | radius of curvature | surface definition | thickness/ space | material | refractive index | dispersion value | focal length |
| 0 | object surface | plane | | Infinity | | | | |
| 1 | first lens | 149.491 | aspherical | 0.482 | resin | 1.544 | 55.9 | −23.39 |
| 2 | | 11.712 | aspherical | 0.544 | | | | |
| 3 | second lens | −16.581 | aspherical | 0.430 | resin | 1.544 | 55.9 | −4.13 |
| 4 | | 2.624 | aspherical | 0.324 | | | | |
| 5 | third lens | 1.370 | aspherical | 0.420 | resin | 1.661 | 20.4 | 16.47 |
| 6 | | 1.375 | aspherical | 0.370 | | | | |
| 7 | aperture stop | plane | | 0.000 | | | | |
| 8 | fourth lens | 3.627 | aspherical | 0.530 | resin | 1.544 | 55.9 | 2.02 |
| 9 | | −1.496 | aspherical | 0.390 | | | | |
| 10 | fifth lens | −2.771 | aspherical | 0.480 | resin | 1.544 | 55.9 | 4.18 |
| 11 | | −1.324 | aspherical | 0.221 | | | | |
| 12 | sixth lens | −0.638 | aspherical | 0.356 | resin | 1.680 | 18.4 | −3.15 |
| 13 | | −1.113 | aspherical | 0.100 | | | | |

TABLE 16-continued f = 2.42 mm, Fno = 2.2, HFOV = 74.9 ✗ reference wavelength: 587.56 nm

| surface number | name | radius of curvature | surface definition | thickness/ space | material | refractive index | dispersion value | focal length |
|---|---|---|---|---|---|---|---|---|
| 14 | seventh lens | 1.647 | aspherical | 0.600 | resin | 1.544 | 55.9 | 2.12 |
| 15 | | −3.330 | aspherical | 0.100 | | | | |
| 16 | eighth lens | −4.209 | aspherical | 0.400 | resin | 1.544 | 55.9 | −2.51 |
| 17 | | 2.087 | aspherical | 0.500 | | | | |
| 18 | IR cutoff filter | | plane | 0.210 | glass | 1.517 | 64.2 | |
| 19 | | | plane | 0.696 | | | | |
| 20 | imaging surface | | plane | — | | | | |

TABLE 17

| ASP coefficient | s1 | s2 | s3 | s4 | s5 |
|---|---|---|---|---|---|
| K | 0.0000E+00 | 2.6048E+00 | 5.8950E+01 | 1.5251E−01 | −2.8663E+00 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 |
| AR4 | −3.3453E−04 | 2.8242E−04 | 4.3804E−02 | −1.1019E−01 | −1.8533E−02 |
| AR5 | 0.0000E+00 | 0.0000E+00 | 0.0000E+00 | 0.0000E+00 | 0.0000E+00 |
| AR6 | 6.6018E−05 | 1.4670E−03 | −1.3104E−02 | 1.0682E−01 | 9.6097E−02 |
| AR7 | 0.0000E+00 | 0.0000E+00 | 0.0000E+00 | 0.0000E+00 | 0.0000E+00 |
| AR8 | 2.8044E−05 | −2.7008E−04 | 2.6219E−03 | −4.6046E−02 | 9.4230E−02 |
| AR9 | 0.0000E+00 | 0.0000E+00 | 0.0000E+00 | 0.0000E+00 | 0.0000E+00 |
| AR10 | −2.0639E−06 | 3.5010E−05 | −1.1324E−03 | −2.7415E−03 | −1.1136E−01 |
| AR11 | 0.0000E+00 | 0.0000E+00 | 0.0000E+00 | 0.0000E+00 | 0.0000E+00 |
| AR12 | 0.0000E+00 | 0.0000E+00 | 2.0301E−04 | 3.7082E−03 | −1.6829E−02 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s6 | s8 | s9 | s10 | s11 |
|---|---|---|---|---|---|
| K | 2.2505E+00 | −1.0827E+02 | −9.1973E−01 | 0.0000E+00 | −4.3274E−02 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | −2.0704E−02 | 1.2159E−02 | −1.7490E−01 | −1.9706E−01 |
| AR4 | −5.1322E−02 | 3.5871E−01 | −3.4763E−01 | 1.6147E+00 | 1.9686E+00 |
| AR5 | 0.0000E+00 | −4.0465E−01 | 1.1526E+00 | −9.8384E+00 | −1.0046E+01 |
| AR6 | −2.0072E−01 | −3.2137E+00 | −4.0583E+00 | 3.2315E+01 | 2.9463E+01 |
| AR7 | 0.0000E+00 | 1.3933E+01 | 9.4733E+00 | −6.1664E+01 | −4.6495E+01 |
| AR8 | 1.7061E+00 | −2.7365E+01 | −1.5174E+01 | 6.8133E+01 | 3.7775E+01 |
| AR9 | 0.0000E+00 | 2.7216E+01 | 1.4153E+01 | −4.0348E+01 | −1.4253E+01 |
| AR10 | −3.8567E+00 | −1.1675E+01 | −5.9575E+00 | 9.9089E+00 | 1.7197E+00 |
| AR11 | 0.0000E+00 | 0.0000E+00 | 0.0000E+00 | 0.0000E+00 | 0.0000E+00 |
| AR12 | 2.4405E+00 | 0.0000E+00 | 0.0000E+00 | 0.0000E+00 | 0.0000E+00 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s12 | s13 | s14 | s15 | s16 | s17 |
|---|---|---|---|---|---|---|
| K | −9.5202E−01 | −6.6023E−01 | −1.3050E+00 | 0.0000E+00 | 0.0000E+00 | −8.2819E−01 |
| AR1 | 0.0000E+00 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 | 0.0000E+00 |
| AR4 | 1.2265E+00 | 5.0275E−01 | −2.8544E−01 | 2.1488E−03 | 9.2342E−03 | −9.9775E−02 |
| AR5 | 0.0000E+00 | 0.0000E+00 | 0.0000E+00 | 0.0000E+00 | 0.0000E+00 | 0.0000E+00 |
| AR6 | −1.2973E+00 | −3.7689E−01 | 1.3699E−01 | 2.9876E−03 | −9.6405E−04 | 2.3997E−02 |
| AR7 | 0.0000E+00 | 0.0000E+00 | 0.0000E+00 | 0.0000E+00 | 0.0000E+00 | 0.0000E+00 |
| AR8 | 8.6687E−02 | 1.3012E−01 | −6.2710E−02 | −1.6703E−05 | 2.5394E−04 | −4.8864E−03 |
| AR9 | 0.0000E+00 | 0.0000E+00 | 0.0000E+00 | 0.0000E+00 | 0.0000E+00 | 0.0000E+00 |
| AR10 | 6.4859E−01 | −1.1659E−02 | 1.9587E−02 | −2.9544E−05 | 8.1959E−05 | 6.3286E−04 |
| AR11 | 0.0000E+00 | 0.0000E+00 | 0.0000E+00 | 0.0000E+00 | 0.0000E+00 | 0.0000E+00 |

TABLE 17-continued

| AR12 | −4.9177E−01 | 4.3976E−03 | −2.8470E−03 | 3.5753E−06 | 8.3377E−06 | −4.8793E−05 |
| AR13 | 0.0000E+00 | 0.0000E+00 | 0.0000E+00 | 0.0000E+00 | 0.0000E+00 | 0.0000E+00 |
| AR14 | 1.2315E−01 | −2.1682E−03 | 1.5276E−04 | 1.1131E−05 | −3.5717E−06 | 1.9625E−06 |

TABLE 18

| f | 2.42 | (|R13| + |R16|)/(CT7 + T78 + CT8) | 3.394 |
|---|---|---|---|
| HFOV | 74.9 | |R14/R15| | 0.791 |
| |f1/f2| | 5.660 | TL/f | 2.953 |
| |f12/f3| | 0.208 | |sag11/sag31| | 0.333 |
| T67/T34 | 0.270 | |DST1.0/FOV| | 0.428 |
| TL/ImagH | 2.216 | |DST1.0/DST0.7| | 6.213 |
| (R7 + R8)/(R7 − R8) | 0.416 | f/(CT7 + T78 + CT8) | 2.202 |
| T12/T23 | 1.681 | CT7/CT8 | 1.500 |
| T23/T34 | 0.875 | |f/f12| + |f/f3| | 0.856 |
| tan(HFOV) | 3.700 | f12/f6 | 1.084 |
| Fno | 2.20 | SD/TD | 0.553 |
| Y11/Y82 | 1.232 | Yc82/f | 0.644 |
| V6/V7 | 0.329 | CT1/CT8 | 1.204 |
| (f/f4) − (f/f5) | 0.619 | |f5/f12| | 1.222 |
| T67/CT7 | 0.167 | (T12 + T23 + T67 + T78)/(T34 + T45 + T56) | 1.088 |
| T78/CT8 | 0.250 | Nmax | 1.680 |

Relationships between each numerical value in Table 18 and the respective conditional formula of the present disclosure are as follow.

In Table 18, |f1/f2|=5.660, and it satisfies |f1/f2|<6.

In Table 18, |f12/f3|=0.208, and it satisfies |f12/f3|<0.5.

In Table 18, T67/T34=0.270, and it satisfies 0<T67/T34<1.0.

In Table 18, TL/ImgH=2.216, and it satisfies TL/ImgH<3.

In Table 18, (R7+R8)/(R7−R8)=0.416, and it satisfies 0<(R7+R8)/(R7−R8)<1.0.

In Table 18, T12/T23=1.681, and it satisfies 0<T12/T23<3.0.

In Table 18, T23/T34=0.875, and it satisfies 0<T23/T34<2.0.

In Table 18, tan(HFOV)=3.700, and it satisfies 2.0<tan(HFOV).

In Table 18, Fno=2.20, and it satisfies 1.4<Fno<3.0.

In Table 18, Y11/Y82=1.232, and it satisfies 0.8<Y11/Y82<1.5.

In Table 18, V6/V7=0.329, and it satisfies 0<V6/V7<0.50.

In Table 18, (f/f4)−(f/f5)=0.619, and it satisfies 0<(f/f4)−(f/f5)<2.0.

In Table 18, T67/CT7=0.167, and it satisfies T67/CT7<0.50.

In Table 18, T78/CT8=0.250, and it satisfies T78/CT8<0.70.

In Table 18, (|R13|+|R16|)/(CT7+T78+CT8)=3.394, and it satisfies 2.0<(|R13|+|R16|)/(CT7+T78+CT8)<4.5.

In Table 18, |R14/R15|=0.791, and it satisfies 0.6<|R14/R15|<1.3.

In Table 18, TL/f=2.953, and it satisfies 2.0<TL/f<4.0.

In Table 18, |Sag11/Sag31|=0.333, and it satisfies |Sag11/Sag31|<5.0.

In Table 18, |DST1.0/FOV|=0.428, and it satisfies |DST1.0/FOV|<0.5.

In Table 18, |DST1.0/DST0.7|=6.213, and it satisfies |DST1.0/DST0.7|<10.

In Table 18, f/(CT7+T78+CT8)=2.202, and it satisfies 0.3<f/(CT7+T78+CT8)<3.5.

In Table 18, CT7/CT8=1.500, and it satisfies 1.0<CT7/CT8<2.0.

In Table 18, |f/f12|+|f/f3|=0.856, and it satisfies 0.3<|f/f12|+|f/f3|<1.5.

In Table 18, f12/f6=1.084, and it satisfies 0.5<f12/f6<1.5.

In Table 18, SD/TD=0.553, and it satisfies 0.45<SD/TD<0.65.

In Table 18, Yc82/f=0.644, and it satisfies 0.45<Yc82/f<0.75.

In Table 18, CT1/CT8=1.202, and it satisfies 0.5<CT1/CT8<1.5.

In Table 18, |f5/f12|=1.222, and it satisfies 0.8<|f5/f12|<2.5.

In Table 18, (T12+T23+T67+T78)/(T34+T45+T56)=1.088, and it satisfies (T12+T23+T67+T78)/(T34+T45+T56)<1.5.

In Table 18, Nmax=1.680, and it satisfies 1.60<Nmax<1.72.

Based on the above, it can be confirmed that each numerical value in Table 18 with respect to the optical system 60 of Example 6 satisfies the respective conditional formula of the present disclosure.

Example 7

Figure 19:
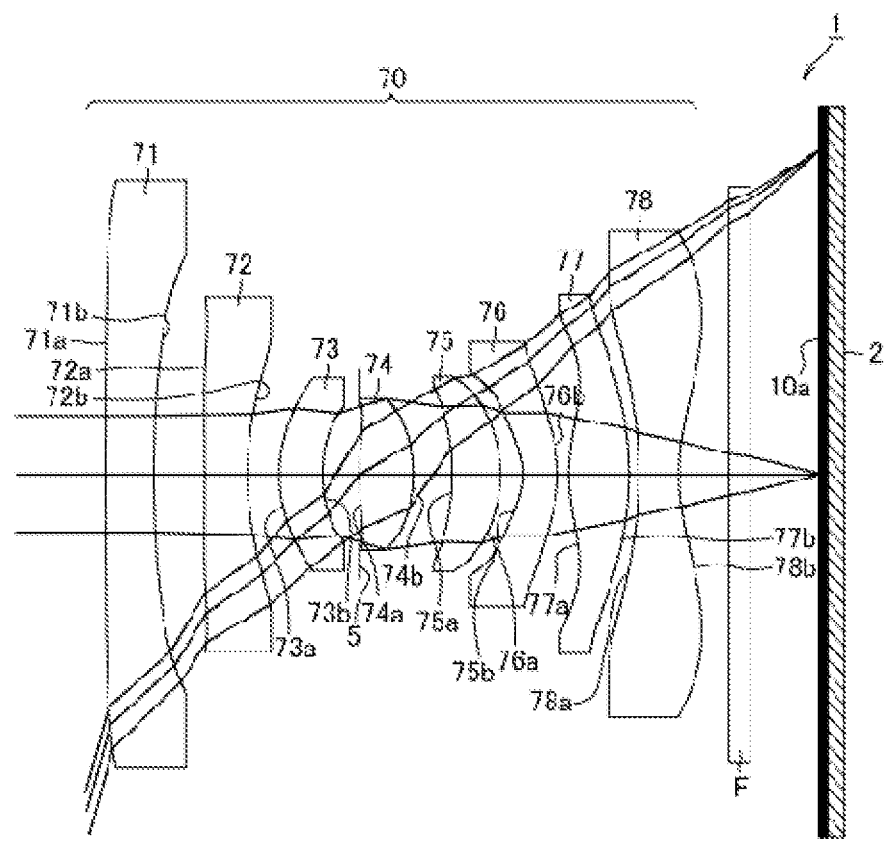
FIG. 19 is a schematic diagram illustrating an imaging optical device in Example 7 of the present disclosure.
Figure 20:
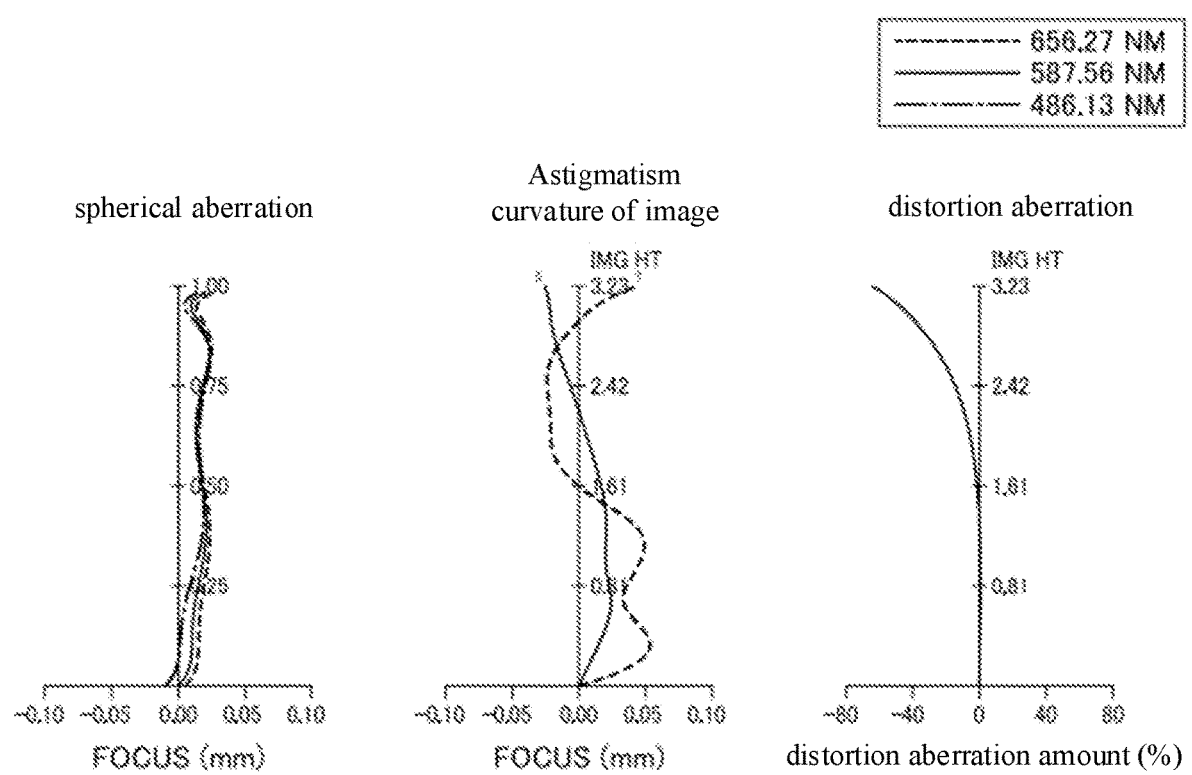
FIG. 20 is a schematic diagram illustrating spherical aberration, astigmatism, and distortion aberration of the imaging optical device in Example 7 of the present disclosure.

FIG. 19 is a schematic diagram illustrating an imaging optical device 1 in Example 7 of the present disclosure. FIG. 20 is a schematic diagram illustrating spherical aberration, astigmatism, and distortion (distortion aberration) of an optical system 70 of Example 7 in order from left to right.

The optical system 70 of Example 7 is described as follows.

The first lens 71 has a negative refractive power and is made of a plastic material. In the first lens 71, an object-side surface 71a is a convex surface, and an image-side surface 71b is a concave surface. Both the object-side surface 71a and the image-side surface 71b of the first lens 71 are aspherical surfaces.

The second lens 72 has a negative refractive power and is made of a plastic material. In the second lens 72, an object-side surface 72a is a concave surface, and an image-side surface 72b is a concave surface. Both the object-side surface 72a and the image-side surface 72b of the second lens 72 are aspherical surfaces.

The third lens 73 has a positive refractive power and is made of a plastic material. In the third lens 73, an object-side surface 73a is a convex surface, and an image-side surface 73b is a concave surface. Both the object-side surface 73a and the image-side surface 73b of the third lens 73 are aspherical surfaces.

The fourth lens 74 has a positive refractive power and is made of a plastic material. In the fourth lens 74, an object-side surface 74a is a convex surface, and an image-side surface 74b is a convex surface. Both the object-side surface 74a and the image-side surface 74b of the fourth lens 74 are aspherical surfaces.

The fifth lens 75 has a positive refractive power and is made of a plastic material. In the fifth lens 75, an object-side surface 75a is a concave surface, and an image-side surface 75b is a convex surface. Both the object-side surface 75a and the image-side surface 75b of the fifth lens 75 are aspherical surfaces.

The sixth lens 76 has a negative refractive power and is made of a plastic material. In the sixth lens 76, an object-side surface 76a is a concave surface, and an image-side surface 76b is a convex surface. Both the object-side surface 76a and the image-side surface 76b of the sixth lens 76 are aspherical surfaces.

The seventh lens 77 has a positive refractive power and is made of a plastic material. In the seventh lens 77, an object-side surface 77a is a convex surface, and an image-side surface 77b is a convex surface. Both the object-side surface 77a and the image-side surface 77b of the seventh lens 77 are aspherical surfaces.

The eighth lens 78 has a negative refractive power and is made of a plastic material. In the eighth lens 78, an object-side surface 78a is a concave surface, and an image-side surface 78b is a concave surface. Both the object-side surface 78a and the image-side surface 78b of the eighth lens 78 are aspherical surfaces.

An aspherical formula of the first lens 71 to the eighth lens 78 included in the optical system 70 of Example 7 is the same as the aspherical formula (1) in Example 1. In addition, in calculation of values in tables of Example 7, terms of the $15^{th}$ order or higher ($n \geq 15$) of the formula (1) are taken as 0.

In addition, Table 19 lists actual numerical values for the structure of each lens. Table 20 lists actual numerical values of aspheric coefficients of each lens. Table 21 lists actual numerical values of conditional formulas of the present disclosure.

TABLE 19

| surface number | name | radius of curvature | surface definition | thickness/ space | material | refractive index | dispersion value | focal length |
|---|---|---|---|---|---|---|---|---|
| \multicolumn{9}{c}{f = 2.41 mm, Fno = 2.1, HFOV = 74.9 X reference wavelength: 587.56 nm} |
| 0 | object surface | | plane | Infinity | | | | |
| 1 | first lens | 137.355 | aspherical | 0.482 | resin | 1.544 | 55.9 | −23.94 |
| 2 | | 11.877 | aspherical | 0.509 | | | | |
| 3 | second lens | −16.530 | aspherical | 0.422 | resin | 1.544 | 55.9 | −4.12 |
| 4 | | 2.619 | aspherical | 0.323 | | | | |
| 5 | third lens | 1.369 | aspherical | 0.425 | resin | 1.661 | 20.4 | 16.20 |
| 6 | | 1.376 | aspherical | 0.371 | | | | |
| 7 | aperture stop | | plane | 0.000 | | | | |
| 8 | fourth lens | 3.628 | aspherical | 0.529 | resin | 1.544 | 55.9 | 2.02 |
| 9 | | −1.499 | aspherical | 0.390 | | | | |
| 10 | fifth lens | −2.773 | aspherical | 0.480 | resin | 1.544 | 55.9 | 4.17 |
| 11 | | −1.324 | aspherical | 0.220 | | | | |
| 12 | sixth lens | −0.638 | aspherical | 0.355 | resin | 1.680 | 18.4 | −3.17 |
| 13 | | −1.111 | aspherical | 0.100 | | | | |
| 14 | seventh lens | 1.643 | aspherical | 0.600 | resin | 1.544 | 55.9 | 2.10 |
| 15 | | −3.282 | aspherical | 0.100 | | | | |
| 16 | eighth lens | −4.171 | aspherical | 0.400 | resin | 1.544 | 55.9 | −2.50 |
| 17 | | 2.080 | aspherical | 0.500 | | | | |
| 18 | IR cutoff filter | | plane | 0.210 | glass | 1.517 | 64.2 | |
| 19 | | | plane | 0.683 | | | | |
| 20 | imaging surface | | plane | — | | | | |

TABLE 20

| ASP coefficient | s1 | s2 | s3 | s4 | s5 |
|---|---|---|---|---|---|
| K | 0.0000E+00 | 2.6691E+00 | 5.8950E+01 | 1.5484E−01 | −2.8611E+00 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 |
| AR4 | −2.8097E−04 | 2.7810E−04 | 4.3785E−02 | −1.1018E−01 | −1.8345E−02 |
| AR5 | 0.0000E+00 | 0.0000E+00 | 0.0000E+00 | 0.0000E+00 | 0.0000E+00 |
| AR6 | 6.487 1E−05 | 1.4936E−03 | −1.3131E−02 | 1.0687E−01 | 9.6055E−02 |
| AR7 | 0.0000E+00 | 0.0000E+00 | 0.0000E+00 | 0.0000E+00 | 0.0000E+00 |
| AR8 | 2.8223E−05 | −2.6586E−04 | 2.6172E−03 | −4.6023E−02 | 9.4387E−02 |
| AR9 | 0.0000E+00 | 0.0000E+00 | 0.0000E+00 | 0.0000E+00 | 0.0000E+00 |
| AR10 | −2.0838E−06 | 3.4053E−05 | −1.1322E−03 | −2.7450E−03 | −1.1061E−01 |
| AR11 | 0.0000E+00 | 0.0000E+00 | 0.0000E+00 | 0.0000E+00 | 0.0000E+00 |
| AR12 | 0.0000E+00 | 0.0000E+00 | 2.0371E−04 | 3.6986E−03 | −1.5649E−02 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

TABLE 20-continued

| ASP coefficient | s6 | s8 | s9 | s10 | s11 |
|---|---|---|---|---|---|
| K | 2.2505E+00 | −1.0827E+02 | −9.1973E−01 | 0.0000E+00 | −4.3274E−02 |
| AR1 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 |
| AR3 | 0.0000E+00 | −2.0863E−02 | 1.2276E−02 | −1.7490E−01 | −1.9674E−01 |
| AR4 | −5.1322E−02 | 3.5840E−01 | −3.4749E−01 | 1.6147E+00 | 1.9689E+00 |
| AR5 | 0.0000E+00 | −4.0488E−01 | 1.1526E+00 | −9.8384E+00 | −1.0046E+01 |
| AR6 | −2.0072E−01 | −3.2139E+00 | −4.0581E+00 | 3.2315E+01 | 2.9463E+01 |
| AR7 | 0.0000E+00 | 1.3933E+01 | 9.4739E+00 | −6.1664E+01 | −4.6496E+01 |
| AR8 | 1.7061E+00 | −2.7365E+01 | −1.5173E+01 | 6.8133E+01 | 3.7775E+01 |
| AR9 | 0.0000E+00 | 2.7217E+01 | 1.4154E+01 | −4.0348E+01 | −1.4253E+01 |
| AR10 | −3.8567E+00 | −1.1670E+01 | −5.9579E+00 | 9.9089E+00 | 1.7201E+00 |
| AR11 | 0.0000E+00 | 0.0000E+00 | 0.0000E+00 | 0.0000E+00 | 0.0000E+00 |
| AR12 | 2.4405E+00 | 0.0000E+00 | 0.0000E+00 | 0.0000E+00 | 0.0000E+00 |
| AR13 | 0.0000E+00 | 0.0000E+00 | 0.0000E+00 | 0.0000E+00 | 0.0000E+00 |
| AR14 | 0.0000E+00 | 0.0000E+00 | 0.0000E+00 | 0.0000E+00 | 0.0000E+00 |

| ASP coefficient | s12 | s13 | s14 | s15 | s16 | s17 |
|---|---|---|---|---|---|---|
| K | −9.5202E−01 | −6.6023E−01 | −1.3050E+00 | 0.0000E+00 | 0.0000E+00 | −8.3168E−01 |
| AR1 | 0.0000E+00 | 0.0000E+00 | 0.0000E+00 | 0.0000E+00 | 0.0000E+00 | 0.0000E+00 |
| AR2 | 0.0000E+00 | 0.0000E+00 | 0.0000E+00 | 0.0000E+00 | 0.0000E+00 | 0.0000E+00 |
| AR3 | 0.0000E+00 | 0.0000E+00 | 0.0000E+00 | 0.0000E+00 | 0.0000E+00 | 0.0000E+00 |
| AR4 | 1.2270E+00 | 5.0275E−01 | −2.8585E−01 | 2.1197E−03 | 9.2266E−03 | −9.9861E−02 |
| AR5 | 0.0000E+00 | 0.0000E+00 | 0.0000E+00 | 0.0000E+00 | 0.0000E+00 | 0.0000E+00 |
| AR6 | −1.2970E+00 | −3.7689E−01 | 1.3680E−01 | 2.9812E−03 | −9.7397E−04 | 2.3982E−02 |
| AR7 | 0.0000E+00 | 0.0000E+00 | 0.0000E+00 | 0.0000E+00 | 0.0000E+00 | 0.0000E+00 |
| AR8 | 8.7198E−02 | 1.3012E−01 | −6.2773E−02 | −1.8698E−05 | 2.5034E−04 | −4.8879E−03 |
| AR9 | 0.0000E+00 | 0.0000E+00 | 0.0000E+00 | 0.0000E+00 | 0.0000E+00 | 0.0000E+00 |
| AR10 | 6.4914E−01 | −1.1659E−02 | 1.9582E−02 | −3.0235E−05 | 8.0651E−05 | 6.3246E−04 |
| AR11 | 0.0000E+00 | 0.0000E+00 | 0.0000E+00 | 0.0000E+00 | 0.0000E+00 | 0.0000E+00 |
| AR12 | −4.9131E−01 | 4.3976E−03 | −2.8456E−03 | 3.3390E−06 | 8.1399E−06 | −4.8849E−05 |
| AR13 | 0.0000E+00 | 0.0000E+00 | 0.0000E+00 | 0.0000E+00 | 0.0000E+00 | 0.0000E+00 |
| AR14 | 1.2370E−01 | −2.1682E−03 | 1.5244E−04 | 1.1053E−05 | −3.4718E−06 | 1.9812E−06 |

TABLE 21

| | | | |
|---|---|---|---|
| f | 2.41 | (|R13| + |R16|)/(CT7 + T78 + CT8) | 3.385 |
| HFOV | 74.9 | |R14/R15| | 0.787 |
| |f1/f2| | 5.803 | TL/f | 2.940 |
| |f12/f3| | 0.212 | |sag11/sag31| | 0.326 |
| T67/T34 | 0.270 | |DST1.0/FOV| | 0.427 |
| TL/ImagH | 2.200 | |DST1.0/DST0.7| | 6.346 |
| (R7 + R8)/(R7 − R8) | 0.415 | f/(CT7 + T78 + CT8) | 2.195 |
| T12/T23 | 1.578 | CT7/CT8 | 1.500 |
| T23/T34 | 0.869 | |f/f12| + |f/f3| | 0.853 |
| tan(HFOV) | 3.702 | f12/f6 | 1.082 |
| Fno | 2.08 | SD/TD | 0.556 |
| Y11/Y82 | 1.214 | Yc82/f | 0.645 |
| V6/V7 | 0.329 | CT1/CT8 | 1.205 |
| (f/f4) − (f/f5) | 0.615 | |f5/f12| | 1.216 |
| T67/CT7 | 0.167 | (T12 + T23 + T67 + T78)/(T34 + T45 + T56) | 1.051 |
| T78/CT8 | 0.250 | Nmax | 1.680 |

Relationships between each numerical value in Table 21 and the respective conditional formula of the present disclosure are as follow.

In Table 21, |f1/f2|=5.803, and it satisfies |f1/f2|<6.

In Table 21, |f12/f3|=0.212, and it satisfies |f12/f3|<0.5.

In Table 21, T67/T34=0.270, and it satisfies 0<T67/T34<1.0.

In Table 21, TL/ImgH=2.200, and it satisfies TL/ImgH<3.

In Table 21, (R7+R8)/(R7−R8)=0.415, and it satisfies 0<(R7+R8)/(R7−R8)<1.0.

In Table 21, T12/T23=1.578, and it satisfies 0<T12/T23<3.0.

In Table 21, T23/T34=0.869, and it satisfies 0<T23/T34<2.0.

In Table 21, tan(HFOV)=3.702, and it satisfies 2.0<tan(HFOV).

In Table 21, Fno=2.08, and it satisfies 1.4<Fno<3.0.

In Table 21, Y11/Y82=1.214, and it satisfies 0.8<Y11/Y82<1.5.

In Table 21, V6/V7=0.329, and it satisfies 0<V6/V7<0.50.

In Table 21, (f/f4)−(f/f5)=0.615, and it satisfies 0<(f/f4)−(f/f5)<2.0.

In Table 21, T67/CT7=0.167, and it satisfies T67/CT7<0.50.

In Table 21, T78/CT8=0.250, and it satisfies T78/CT8<0.70.

In Table 21, (|R13|+|R16|)/(CT7+T78+CT8)=3.385, and it satisfies 2.0<(|R13|+|R16|)/(CT7+T78+CT8)<4.5.

In Table 21, |R14/R15|=0.787, and it satisfies 0.6<|R14/R15|<1.3.

In Table 21, TL/f=2.940, and it satisfies 2.0<TL/f<4.0.

In Table 21, |Sag11/Sag31|=0.326, and it satisfies |Sag11/Sag31|<5.0.

In Table 21, |DST1.0/FOV|=0.427, and it satisfies |DST1.0/FOV|<0.5.

In Table 21, |DST1.0/DST0.7|=6.346, and it satisfies |DST1.0/DST0.7|<10.

In Table 21, f/(CT7+T78+CT8)=2.195, and it satisfies 0.3<f/(CT7+T78+CT8)<3.5.

In Table 18, CT7/CT8=1.500, and it satisfies 1.0<CT7/CT8<2.0.

In Table 21, |f/f12|+|f/f3|=0.853, and it satisfies 0.3<|f/f12|+|f/f3|<1.5.

In Table 21, f12/f6=1.082, and it satisfies 0.5<f12/f6<1.5.

In Table 21, SD/TD=0.556, and it satisfies 0.45<SD/TD<0.65.

In Table 21, Yc82/f=0.645, and it satisfies 0.45<Yc82/f<0.75.

In Table 21, CT1/CT8=1.205, and it satisfies 0.5<CT1/CT8<1.5.

In Table 21, |f5/f12|=1.216, and it satisfies 0.8<|f5/f12|<2.5.

In Table 21, (T12+T23+T67+T78)/(T34+T45+T56)= 1.051, and it satisfies (T12+T23+T67+T78)/(T34+T45+T56)<1.5.

In Table 21, Nmax=1.680, and it satisfies 1.60<Nmax<1.72.

Based on the above, it can be confirmed that each numerical value in Table 21 with respect to the optical system 70 of Example 7 satisfies the respective conditional formula of the present disclosure.

Although the present disclosure is appropriately and fully described above through examples with reference to the accompanying drawings, those skilled in the art will recognize that modifications and/or improvements to the above-described examples may be easily accomplished. Therefore, as long as the modifications or improvements implemented by those skilled in the art do not depart from the scope of the claims, the modifications or improvements may be interpreted as being included in the scope of the claims.

REFERENCE NUMERALS

1: imaging optical device
2: photoelectric conversion element
3: sensor holder
4: drive component
5: aperture stop
6: lens holding member
7: light-shielding member
8: light-shielding sheet
8a: spacer
9: lens clamp ring
F: IR cutoff filter
10, 20, 30, 40, 50, 60, 70: imaging optical system
10a: imaging surface
11, 21, 31, 41, 51, 61, 71: first lens
11a, 21a, 31a, 41a, 51a, 61a, 71a: object-side surface of a first lens
11b, 21b, 31b, 41b, 51b, 61b, 71b: image-side surface of a first lens
12, 22, 32, 42, 52, 62, 72: second lens
12a, 22a, 32a, 42a, 52a, 62a, 72a: object-side surface of a second lens
12b, 22b, 32b, 42b, 52b, 62b, 72b: image-side surface of a second lens
13, 23, 33, 42, 53, 63, 73: third lens
13a, 23a, 33a, 43a, 53a, 63a, 73a: object-side surface of a third lens
13b, 23b, 33b, 43b, 53b, 63b, 73b: image-side surface of a third lens
14, 24, 34, 44, 54, 64, 74: fourth lens
14a, 24a, 34a, 44a, 54a, 64a, 74a: object-side surface of a fourth lens
14b, 24b, 34b, 44b, 54b, 64b, 74b: image-side surface of a fourth lens
15, 25, 35, 45, 55, 65, 75: fifth lens
15a, 25a, 35a, 45a, 55a, 65a, 75a: object-side surface of a fifth lens
15b, 25b, 35b, 45b, 55b, 65b, 75b: image-side surface of a fifth lens
16, 26, 36, 46, 56, 66, 76: sixth lens
16a, 26a, 36a, 46a, 56a, 66a, 76a: object-side surface of a sixth lens
16b, 26b, 36b, 46b, 56b, 66b, 76b: image-side surface of a sixth lens
17, 27, 37, 47, 57, 67, 77: seventh lens
17a, 27a, 37a, 47a, 57a, 67a, 77a: object-side surface of a seventh lens
17b, 27b, 37b, 47b, 57b, 67b, 77b: image-side surface of a seventh lens
171a: center portion of an object-side surface of a seventh lens
172a: periphery portion of an object-side surface of a seventh lens
18a, 28a, 38a, 48a, 58a, 68a, 78a: object-side surface of an eighth lens
18b, 28b, 38b, 48b, 58b, 68b, 78b: image-side surface of an eighth lens
181b: center portion of an image-side surface of an eighth lens
182b: periphery portion of an image-side surface of an eighth lens
F: focal length of an entire optical system
Fno: aperture value
FOV: maximum field of view
HFOV: half of a maximum field of view
TL: distance along an optical axis from an object-side surface of a first lens to an imaging surface
ImgH: maximum image height of an optical system
f1: focal length of a first lens
f2: focal length of a second lens
f3: focal length of a third lens
f4: focal length of a fourth lens
f5: focal length of a fifth lens
f6: focal length of a sixth lens
f12: combined focal length of a first lens and a second lens
SD: distance along an optical axis from an aperture stop to an image-side surface of a seventh lens
TD: distance along an optical axis from an object-side surface of a first lens to an image-side surface of an eighth lens
CT1: central thickness of a first lens
CT7: central thickness of a seventh lens
CT8: central thickness of an eighth lens
T12: distance along an optical axis from an image-side surface of a first lens to an object-side surface of a second lens
T23: distance along an optical axis from an image-side surface of a second lens to an object-side surface of a third lens
T34: distance along an optical axis from an image-side surface of a third lens to an object-side surface of a fourth lens
T45: distance along an optical axis from an image-side surface of a fourth lens to an object-side surface of a fifth lens
T56: distance along an optical axis from an image-side surface of a fifth lens to an object-side surface of a sixth lens
T67: distance along an optical axis from an image-side surface of a sixth lens to an object-side surface of a seventh lens
T78: distance along an optical axis from an image-side surface of a seventh lens to an object-side surface of an eighth lens
R7: radius of curvature of an object-side surface of a fourth lens
R8: radius of curvature of an image-side surface of a fourth lens R13: radius of curvature of an object-side surface of a seventh lens
R14: radius of curvature of an image-side surface of a seventh lens
R15: radius of curvature of an object-side surface of an eighth lens
R16: radius of curvature of an image-side surface of an eighth lens
V6: dispersion coefficient of a sixth lens
V7: dispersion coefficient of a seventh lens
Y11: maximum effective radius of an object-side surface of a first lens
Y82: maximum effective radius of an image-side surface of an eighth lens
Yc82: distance between the maximum inflection point of an image-side surface of an eighth lens and an optical axis in a direction orthogonal to the optical axis
Sag11: displacement along an optical axis from an intersection of an object-side surface of a first lens with the optical axis to a position where the maximum effective radius of the object-side surface of the first lens is located
Sag31: displacement along an optical axis from an intersection of an object-side surface of a third lens with the optical axis to a position where the maximum effective radius of the object-side surface of the third lens is located
DST1.0: distortion aberration at a maximum image height
DST0.7: distortion aberration at 70% of a maximum image height
Nmax: maximum of refractive indices of a first lens, a second lens, a third lens, a fourth lens, a fifth lens, a sixth lens, a seventh lens, and an eighth lens

What is claimed is:

1. An imaging optical system, comprising:
a first lens of a negative refractive power having a concave image-side surface;
a second lens of a negative refractive power having a concave image-side surface;
a third lens of a positive refractive power having a concave image-side surface;
a fourth lens of a positive refractive power having a convex image-side surface;
a fifth lens of a positive refractive power having a concave object-side surface and a convex image-side surface;
a sixth lens of a negative refractive power having a concave object-side surface and a convex image-side surface;
a seventh lens having a convex image-side surface and an object-side surface, the object-side surface of the seventh lens being an aspherical surface having a convex center portion and at least one inflection point at a periphery of the convex center portion; and
an eighth lens having a concave object-side surface and an image-side surface, the image-side surface of the eighth lens being an aspherical surface having a concave center portion and at least one inflection point at a periphery of the concave center portion;
wherein the first lens, the second lens, the third lens, the fourth lens, the fifth lens, the sixth lens, the seventh lens and the eighth lens are arranged in order in a direction from an object side to an image side; and
wherein the imaging optical system satisfies:

$|f1/f2|<6;$ $|f12/f3|<0.5;$ $0<T67/T34<1.0;$ where f1 represents a focal length of the first lens, f2 represents a focal length of the second lens, f3 represents a focal length of the third lens, f12 represents a combined focal length of the first lens and the second lens, T34 represents a distance along an optical axis from the image-side surface of the third lens to an object-side surface of the fourth lens, and T67 represents a distance along the optical axis from the image-side surface of the sixth lens to the object-side surface of the seventh lens.

2. The imaging optical system according to claim 1, further comprising:
an aperture stop located between the third lens and the fourth lens;
wherein the imaging optical system satisfies:

$TL/ImgH<3,$ where TL represents a distance along the optical axis from an object-side surface of the first lens to an imaging surface, and ImgH represents a maximum image height.

3. The imaging optical system according to claim 1, wherein the imaging optical system satisfies:

$0<(R7+R8)/(R7-R8)<1.0,$ where R7 represents a radius of curvature of the object-side surface of the fourth lens, and R8 represents a radius of curvature of the image-side surface of the fourth lens.

4. The imaging optical system according to claim 1, wherein the imaging optical system satisfies:

$0<T12/T23<3.0,$ $0<T23/T34<2.0,$ where T12 represents a distance along the optical axis from the image-side surface of the first lens to an object-side surface of the second lens, T23 represents a distance along the optical axis from the image-side surface of the second lens to an object-side surface of the third lens, and T34 represents the distance along the optical axis from the image-side surface of the third lens to the object-side surface of the fourth lens.

5. The imaging optical system according to claim 1, wherein the imaging optical system satisfies:

$2.0<\tan(HFOV),$ $1.4<Fno<3.0,$ where HFOV represents a half of a maximum field of view, and Fno represents an aperture value.

6. The imaging optical system according to claim 1, wherein the imaging optical system satisfies:

$0.8<Y11/Y82<1.5,$ where Y11 represents a maximum effective radius of an object-side surface of the first lens, and Y82 represents a maximum effective radius of the image-side surface of the eighth lens.

7. The imaging optical system according to claim 1, wherein the imaging optical system satisfies:

$0<V6/V7<0.50,$ where V6 represents a dispersion coefficient of the sixth lens, and V7 represents a dispersion coefficient of the seventh lens.

8. The imaging optical system according to claim 1, wherein the imaging optical system satisfies:

$$0<(f/f4)-(f/f5)<2.0,$$

where f represents a focal length of the imaging optical system, f4 represents a focal length of the fourth lens, and f5 represents a focal length of the fifth lens.

9. The imaging optical system according to claim 1, wherein the imaging optical system satisfies:

$$T67/CT7<0.50,$$

$$T78/CT8<0.70,$$

where T67 represents the distance along the optical axis from the image-side surface of the sixth lens to the object-side surface of the seventh lens, CT7 represents a thickness of the seventh lens along the optical axis, T78 represents a distance along the optical axis from the image-side surface of the seventh lens to the object-side surface of the eighth lens, and CT8 represents a thickness of the eighth lens along the optical axis.

10. The imaging optical system according to claim 1, wherein the imaging optical system satisfies:

$$2.0<(|R13|+|R16|)/(CT7+T78+CT8)<4.5,$$

$$0.6<|R14/R15|<1.3,$$

$$2.0<TL/f<4.0,$$

where R13 represents a radius of curvature of the object-side surface of the seventh lens, R14 represents a radius of curvature of the image-side surface of the seventh lens, R15 represents a radius of curvature of the object-side surface of the eighth lens, R16 represents a radius of curvature of the image-side surface of the eighth lens, CT7 represents a thickness of the seventh lens along the optical axis, T78 represents a distance along the optical axis from the image-side surface of the seventh lens to the object-side surface of the eighth lens, CT8 represents a thickness of the eighth lens along the optical axis, TL represents a distance along the optical axis from an object-side surface of the first lens to an imaging surface, and f represents a focal length of the imaging optical system.

11. The imaging optical system according to claim 1, wherein the imaging optical system satisfies:

$$|Sag11/Sag31|<5.0,$$

where Sag11 represents a displacement along the optical axis from an intersection of an object-side surface of the first lens with the optical axis to a position where a maximum effective radius of the object-side surface of the first lens is located, and Sag31 represents a displacement along the optical axis from an intersection of an object-side surface of the third lens with the optical axis to a position where a maximum effective radius of the object-side surface of the third lens is located.

12. The imaging optical system according to claim 1, wherein the imaging optical system satisfies:

$$|DST1.0/FOV|<0.5(\%/degree),$$

$$|DST1.0/DST0.7|<10,$$

where DST1.0 represents a distortion aberration at a maximum image height, DST0.7 represents a distortion aberration at 70% of the maximum image height, and FOV represents a maximum field of view.

13. An imaging optical system, comprising:
a first lens of a negative refractive power;
a second lens having a concave image-side surface;
a third lens having a concave image-side surface;
a fourth lens having a convex image-side surface;
a fifth lens of a positive refractive power having a convex image-side surface;
a sixth lens of a negative refractive power having a concave object-side surface and a convex image-side surface;
a seventh lens of a positive refractive power having an object-side surface, the object-side surface of the seventh lens being an aspherical surface having a convex center portion and at least one inflection point at a periphery of the convex center portion; and
an eighth lens having an image-side surface being an aspherical surface having a concave center portion and at least one inflection point at a periphery of the concave center portion;
wherein the first lens, the second lens, the third lens, the fourth lens, the fifth lens, the sixth lens, the seventh lens and the eighth lens are arranged in order in a direction from an object side to an image side; and
wherein the imaging optical system satisfies:

$$0.3<f/(CT7+T78+CT8)<3.5,$$

$$1.0<CT7/CT8<2.0,$$

$$|f1/f2|<6,$$

$$|f12/f3|<0.5,$$

where f1 represents a focal length of the first lens, f2 represents a focal length of the second lens, f3 represents a focal length of the third lens, f12 represents a combined focal length of the first lens and the second lens, f represents a focal length of the imaging optical system comprising the first to eighth lenses, CT7 represents a thickness of the seventh lens along an optical axis, T78 represents a distance along the optical axis from an image-side surface of the seventh lens to an object-side surface of the eighth lens, and CT8 represents a thickness of the eighth lens along the optical axis.

14. The imaging optical system according to claim 13, wherein the first lens has a concave image-side surface, and the imaging optical system satisfies:

$$2.0<(|R13|+|R16|)/(CT7+T78+CT8)<4.5,$$

$$0.6<|R14/R15|</1.3,$$

where R13 represents a radius of curvature of the object-side surface of the seventh lens, R14 represents a radius of curvature of the image-side surface of the seventh lens, R15 represents a radius of curvature of the object-side surface of the eighth lens, R16 represents a radius of curvature of the image-side surface of the eighth lens, CT7 represents the thickness of the seventh lens along the optical axis, T78 represents the distance along the optical axis from the image-side surface of the seventh lens to the object-side surface of the eighth lens, and CT8 represents the thickness of the eighth lens along the optical axis.

15. The imaging optical system according to claim 13, wherein the imaging optical system satisfies at least one of:

$$0.3<|f/f12|+|f/f3|<1.5;$$

$$0.5<f12/f6<1.5; or$$

$$0.45<Yc82/f<0.75,$$

where f6 represents a focal length of the sixth lens, and Yc82 represents a distance between a maximum inflection point of the image-side surface of the eighth lens and the optical axis in a direction orthogonal to the optical axis.

16. The imaging optical system according to claim 13, further comprising an aperture stop;
wherein the imaging optical system satisfies:

$$0.45<SD/TD<0.65,$$

$$0.8<Y11/Y82<1.5,$$

where SD represents a distance along the optical axis from the aperture stop to the image-side surface of the eighth lens, TD represents a distance along the optical axis from an object-side surface of the first lens to the image-side surface of the eighth lens, Y11 represents a maximum effective radius of the object-side surface of the first lens, and Y82 represents a maximum effective radius of the image-side surface of the eighth lens.

17. The imaging optical system according to claim 13, wherein the imaging optical system satisfies:

$$|DST1.0/FOV|<0.5(\%/degree),$$

$$|DST1.0/DST0.7|<10,$$

where DST1.0 represents a distortion aberration at a maximum image height, DST0.7 represents a distortion aberration at 70% of the maximum image height, and FOV represents a maximum field of view.

18. An imaging optical system, comprising:
a first lens of a negative refractive power;
a second lens having a concave image-side surface;
a third lens having a convex object-side surface;
a fourth lens having a convex object-side surface;
a fifth lens of a positive refractive power;
a sixth lens of a negative refractive power having a concave object-side surface and a convex image-side surface;
a seventh lens of a positive refractive power having a convex image-side surface;
an eighth lens having an image-side surface being an aspherical surface having a concave center portion and at least one inflection point at a periphery of the concave center portion;
wherein the first lens, the second lens, the third lens, the fourth lens, the fifth lens, the sixth lens, the seventh lens and the eighth lens are arranged in order in a direction from an object side to an image side; and
wherein the imaging optical system satisfies:

$$0.5<CT1/CT8<1.5,$$

where CT1 represents a thickness of the first lens along an optical axis, and CT8 represents a thickness of the eighth lens along the optical axis.

19. The imaging optical system according to claim 18, wherein the imaging optical system satisfies at least one of:

$$0.8<|f5/f12|<2.5;$$

$$|Sag11/Sag31|<5.0;$$

$$(T12+T23+T67+T78)/(T34+T45+T56)<1.5; \text{ or}$$

$$1.60<N\text{max}<1.72,$$

where f12 represents a combined focal length of the first lens and the second lens, and f5 represents a focal length of the fifth lens,
Sag11 represents a displacement along the optical axis from an intersection of an object-side surface of the first lens with the optical axis to a position where a maximum effective radius of the object-side surface of the first lens is located,
Sag31 represents a displacement along the optical axis from an intersection of the object-side surface of the third lens with the optical axis to a position where a maximum effective radius of the object-side surface of the third lens is located,
T12 represents a distance along the optical axis from an image-side surface of the first lens to an object-side surface of the second lens,
T23 represents a distance along the optical axis from the image-side surface of the second lens to the object-side surface of the third lens,
T34 represents a distance along the optical axis from an image-side surface of the third lens to the object-side surface of the fourth lens,
T45 represents a distance along the optical axis from an image-side surface of the fourth lens to an object-side surface of the fifth lens,
T56 represents a distance along the optical axis from an image-side surface of the fifth lens to an object-side surface of the sixth lens,
T67 represents a distance along the optical axis from the image-side surface of the sixth lens to an object-side surface of the seventh lens,
T78 represents a distance along the optical axis from the image-side surface of the seventh lens to an object-side surface of the eighth lens, and
Nmax represents a maximum of refractive indices of the first lens, the second lens, the third lens, the fourth lens, the fifth lens, the sixth lens, the seventh lens and the eighth lens.

20. An imaging optical device, comprising:
the imaging optical system according to claim 1;
a drive component configured to drive all or some of the first lens, the second lens, the third lens, the fourth lens, the fifth lens, the sixth lens, the seventh lens and the eighth lens of the imaging optical system; and
a photoelectric conversion element located on an imaging surface of the imaging optical system.

* * * * *